(12) United States Patent
Nichols et al.

(10) Patent No.: US 12,545,642 B2
(45) Date of Patent: *Feb. 10, 2026

(54) PHARMACEUTICALLY ACCEPTABLE SALTS OF PSILOCIN AND USES THEREOF

(71) Applicant: Eleusis Therapeutics US, Inc., New York, NY (US)

(72) Inventors: David E. Nichols, Chapel Hill, NC (US); Graham Johnson, Sanbornton, NH (US); Hooshang S. Zavareh, Cambridge (GB); Claire Wombwell, Cambridge (GB); Daniel Rixson, Cambridge (GB); Peter Haddow, Cambridge (GB); Carrie Sheard, Cambridge (GB); Alexander Schwarz, Baltimore, MD (US)

(73) Assignee: Eleusis Therapeutics US, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,662

(22) Filed: May 3, 2023

(65) Prior Publication Data

US 2023/0357144 A1 Nov. 9, 2023

Related U.S. Application Data

(63) Continuation of application No. 17/708,264, filed on Mar. 30, 2022, now Pat. No. 11,680,043, which is a continuation of application No. 17/520,275, filed on Nov. 5, 2021, now Pat. No. 11,312,684.

(60) Provisional application No. 63/148,052, filed on Feb. 10, 2021.

(51) Int. Cl.
*C07D 209/16* (2006.01)
*A61K 31/4045* (2006.01)
*C07C 63/08* (2006.01)

(52) U.S. Cl.
CPC ........ *C07D 209/16* (2013.01); *A61K 31/4045* (2013.01); *C07C 63/08* (2013.01)

(58) Field of Classification Search
CPC .................................................. C07D 209/16
See application file for complete search history.

(56) References Cited

U.S. PATENT DOCUMENTS

| | | | |
|---|---|---|---|
| 4,176,182 A | 11/1979 | Ferrari et al. | |
| 4,180,581 A | 12/1979 | Stadler | |
| 4,348,391 A | 9/1982 | Stutz et al. | |
| 7,790,762 B2 | 9/2010 | Day et al. | |
| 10,183,001 B1 | 1/2019 | King et al. | |
| 10,478,429 B2 | 11/2019 | Hughey et al. | |
| 10,485,967 B2 | 11/2019 | Sameti et al. | |
| 10,519,175 B2 | 12/2019 | Londesbrough et al. | |
| 10,626,105 B2 | 4/2020 | Zhang | |
| 10,881,606 B2 | 1/2021 | Schmitz et al. | |
| 10,881,607 B2 | 1/2021 | Schmitz et al. | |
| 10,947,257 B2 | 3/2021 | Londesbrough et al. | |
| 10,954,259 B1 | 3/2021 | Londesbrough et al. | |
| 11,149,044 B2 | 10/2021 | Londesbrough et al. | |
| 11,180,517 B2 | 11/2021 | Londesbrough et al. | |
| 11,312,684 B1 | 4/2022 | Nichols et al. | |
| 11,447,510 B2 | 9/2022 | Londesbrough et al. | |
| 11,680,043 B2 | 6/2023 | Nichols et al. | |
| 11,773,063 B1 | 10/2023 | Gray et al. | |
| 2002/0037887 A1 | 3/2002 | Pintor et al. | |
| 2004/0092481 A1 | 5/2004 | Jerussi | |
| 2004/0110828 A1 | 6/2004 | Chowdhury et al. | |
| 2006/0135585 A1 | 6/2006 | Day et al. | |
| 2008/0293695 A1 | 11/2008 | Bristol et al. | |
| 2009/0258053 A1 | 10/2009 | Horvers | |
| 2011/0060037 A1 | 3/2011 | Woldbye et al. | |
| 2011/0104305 A1 | 5/2011 | Day et al. | |
| 2011/0111029 A1 | 5/2011 | Schmitz et al. | |
| 2012/0028960 A1 | 2/2012 | King et al. | |
| 2012/0108510 A1 | 5/2012 | Young et al. | |
| 2016/0303361 A1 | 10/2016 | Sameti et al. | |
| 2017/0348303 A1 | 12/2017 | Bosse et al. | |
| 2017/0360772 A1 | 12/2017 | Bosse et al. | |
| 2018/0021326 A1 | 1/2018 | Stamets | |
| 2018/0079742 A1 | 3/2018 | Zhang | |
| 2018/0147142 A1 | 5/2018 | Knight | |
| 2019/0105313 A1 | 4/2019 | Stamets | |
| 2019/0119310 A1 | 4/2019 | Londesbrough et al. | |
| 2019/0192498 A1 | 6/2019 | Stamets | |
| 2019/0225612 A1 | 7/2019 | Semple et al. | |

(Continued)

FOREIGN PATENT DOCUMENTS

| CA | 3103707 A1 | 6/2022 |
|---|---|---|
| CN | 102816103 A | 12/2012 |

(Continued)

OTHER PUBLICATIONS

Alzheimer's disease [online] retrieved from the internet on Mar. 25,2022 URL https://www.mayoclinic.org/diseases-conditions/alzheimers-disease/symptoms-causes/syc-.*
Chen,etal. Amyloid beta:structure, biology and structure-based therapeutic development. ActaPharmacologicaSinica 2017:1205-1235.*
Aghajanian et al., "Hallucinogenic indoleamines: Preferential action upon presynaptic serotonin receptors," Psychopharmacol Commun. 1(6):619-29 (1975).
Anonymous, "FDA mulls drug to slow late-stage Alzheimer's," Retrieved Sep. 24, 2003 from CNN.com, available <http://www.cnn.com/2003/HEALTH/conditions/09/24/alzheimers.drug.ap.index.html> (2 pages).
Damasio, "Alzheimer's disease and related dementias," Cecil Textbook of Medicine, 20th Edition, vol. 2. Bennett and Plum, Jun. 1992 (1996).
International Search Report and Written Opinion for International Application No. PCT/US2021/041321, mailed Oct. 26, 2021 (11 pages).

(Continued)

*Primary Examiner* — Shawquia Jackson
(74) *Attorney, Agent, or Firm* — Clark & Elbing LLP

(57) ABSTRACT

The present invention composition features pharmaceutically acceptable salts of psilocin and compositions thereof. The pharmaceutically acceptable salts of psilocin may be used to treat a disease or condition, such as a neurological injury, an inflammatory condition, chronic pain, or a psychological condition, in a subject in need thereof.

13 Claims, 15 Drawing Sheets

(56) References Cited

U.S. PATENT DOCUMENTS

| | | |
|---|---|---|
| 2019/0350949 A1 | 11/2019 | Kucuksen et al. |
| 2020/0046963 A1 | 2/2020 | Sameti et al. |
| 2020/0060997 A1 | 2/2020 | Goren et al. |
| 2020/0113819 A1 | 4/2020 | Schmitz et al. |
| 2020/0179349 A1 | 6/2020 | Yun et al. |
| 2020/0187777 A1 | 6/2020 | Luderer et al. |
| 2020/0290992 A1 | 9/2020 | Zhang |
| 2020/0330405 A1 | 10/2020 | Foster et al. |
| 2020/0370073 A1 | 11/2020 | Leo |
| 2020/0375967 A1 | 12/2020 | Stamets |
| 2020/0397752 A1 | 12/2020 | Perez Castillo et al. |
| 2021/0058956 A1 | 2/2021 | Chatterjee et al. |
| 2021/0322743 A1 | 10/2021 | Rinti et al. |
| 2022/0362237 A1 | 11/2022 | Barrow et al. |
| 2024/0415811 A1 | 12/2024 | Gray |

FOREIGN PATENT DOCUMENTS

| | | |
|---|---|---|
| CN | 103816150 A | 5/2014 |
| CN | 113288883 A | 8/2021 |
| EP | 0008802 A1 | 3/1980 |
| EP | 0131301 A2 | 1/1985 |
| EP | 2067780 A1 | 6/2009 |
| EP | 3868364 A1 | 8/2021 |
| EP | 3941583 A1 | 1/2022 |
| EP | 4159192 A1 | 4/2023 |
| EP | 4159201 A1 | 4/2023 |
| GB | 912715 A | 12/1962 |
| GB | 2588505 A | 4/2021 |
| KR | 20180103379 A | 9/2018 |
| WO | WO-02/38142 A2 | 5/2002 |
| WO | WO-02/083144 A1 | 10/2002 |
| WO | WO-2004/085392 A1 | 10/2004 |
| WO | WO-2004/089915 A1 | 10/2004 |
| WO | WO-2009/112033 A1 | 9/2009 |
| WO | WO-2009/153019 A1 | 12/2009 |
| WO | WO-2010/054202 A2 | 5/2010 |
| WO | WO-2013/191704 A1 | 12/2013 |
| WO | WO-2015/090583 A1 | 6/2015 |
| WO | WO-2015/127556 A1 | 9/2015 |
| WO | WO 2015/127558 A1 * | 9/2015 |
| WO | WO-2016/118541 A1 | 7/2016 |
| WO | WO-2016/145193 A1 | 9/2016 |
| WO | WO-2016/161138 A1 | 10/2016 |
| WO | WO-2018/057576 A1 | 3/2018 |
| WO | WO-2018/064465 A1 | 4/2018 |
| WO | WO-2018/195455 A1 | 10/2018 |
| WO | WO-2018/204354 A1 | 11/2018 |
| WO | WO-2019/073379 A1 | 4/2019 |
| WO | WO-2019/081764 A1 | 5/2019 |
| WO | WO-2019/081942 A1 | 5/2019 |
| WO | WO-2019/246532 A1 | 12/2019 |
| WO | WO-2020/023084 A1 | 1/2020 |
| WO | WO-2020/157569 A1 | 8/2020 |
| WO | WO-2020/169851 A1 | 8/2020 |
| WO | WO-2020/176597 A1 | 9/2020 |
| WO | WO-2020/212948 A1 | 10/2020 |
| WO | WO-2020/212951 A1 | 10/2020 |
| WO | WO-2020/212952 A1 | 10/2020 |
| WO | WO-2021/030571 A1 | 2/2021 |
| WO | WO-2021/076572 A1 | 4/2021 |
| WO | WO-2021/089872 A1 | 5/2021 |
| WO | WO-2021/155470 A1 | 8/2021 |
| WO | WO-2021/168082 A1 | 8/2021 |
| WO | WO-2021/175816 A1 | 9/2021 |
| WO | WO-2021/179091 A1 | 9/2021 |
| WO | WO-2021/209815 A1 | 10/2021 |
| WO | WO-2021/222885 A1 | 11/2021 |
| WO | WO-2021/225796 A1 | 11/2021 |
| WO | WO-2021/250434 A1 | 12/2021 |
| WO | WO-2021253116 A1 | 12/2021 |
| WO | WO-2022/000091 A1 | 1/2022 |
| WO | WO-2022/008627 A2 | 1/2022 |
| WO | WO-2022/011350 A1 | 1/2022 |
| WO | WO-2022/016289 A1 | 1/2022 |
| WO | WO-2022038299 A1 | 2/2022 |
| WO | WO-2022/094719 A1 | 5/2022 |
| WO | WO-2022/104475 A1 | 5/2022 |
| WO | WO-2022/125616 A1 | 6/2022 |
| WO | WO-2022/133314 A1 | 6/2022 |
| WO | WO-2022/153266 A1 | 7/2022 |
| WO | WO-2022/153268 A1 | 7/2022 |
| WO | WO-2022/170438 A1 | 8/2022 |
| WO | WO-2022/175821 A1 | 8/2022 |
| WO | WO-2022/189662 A1 | 9/2022 |
| WO | WO-2022/195489 A2 | 9/2022 |
| WO | WO-2022207746 A1 | 10/2022 |
| WO | WO-2022/246572 A1 | 12/2022 |
| WO | WO-2023/002005 A1 | 1/2023 |
| WO | WO-2023/028086 A1 | 3/2023 |
| WO | WO-2023/186797 A1 | 10/2023 |
| WO | WO-2023/186798 A1 | 10/2023 |
| WO | WO-2023/186806 A1 | 10/2023 |
| WO | WO-2023/186808 A1 | 10/2023 |
| WO | WO-2023/186816 A1 | 10/2023 |
| WO | WO-2023/186820 A1 | 10/2023 |
| WO | WO-2023/186821 A1 | 10/2023 |
| WO | WO-2023/186823 A1 | 10/2023 |
| WO | WO-2023/186824 A1 | 10/2023 |
| WO | WO-2023/186826 A1 | 10/2023 |
| WO | WO-2023/186827 A1 | 10/2023 |
| WO | WO-2023/186828 A1 | 10/2023 |
| WO | WO-2023/186829 A1 | 10/2023 |
| WO | WO-2023/186830 A1 | 10/2023 |
| WO | WO-2023/186832 A1 | 10/2023 |
| WO | WO-2023/186834 A1 | 10/2023 |
| WO | WO-2023/186835 A1 | 10/2023 |
| WO | WO-2023/186837 A1 | 10/2023 |
| WO | WO-2023186831 A1 | 10/2023 |
| WO | WO-2024/010537 A1 | 1/2024 |
| WO | WO-2024/020361 A2 | 1/2024 |
| WO | WO-2024/146917 A1 | 7/2024 |
| WO | WO-2024/160389 A1 | 8/2024 |
| WO | WO-2024/160390 A1 | 8/2024 |
| WO | WO-2024/160391 A1 | 8/2024 |
| WO | WO-2024/160392 A1 | 8/2024 |
| WO | WO-2024/173954 A2 | 8/2024 |
| WO | WO-2025/068714 A1 | 4/2025 |

OTHER PUBLICATIONS

International Search Report and Written Opinion for International Application No. PCT/US2022/015897, mailed May 4, 2022 (11 pages).

Layzer, "Degenerative Diseases of the Nervous System," *Cecil Textbook of Medicine, 20th Edition, vol. 2.* J. Claude Bennett and Fred Plum, p. 2050-2057 (1996) (9 pages).

Sherwood et al., "Synthesis and Characterization of 5-MeO-DMT Succinate for Clinical Use," ACS Omega. 5(49):32067-32075 (2020).

International Preliminary Report on Patentability for International Patent Application No. PCT/US2022/015897, issued Aug. 15, 2023 (7 pages).

Amsterdam et al., "Harm potential of magic mushroom use: A review," Regul Toxicol Pharmacol. 59(3): 423-429 (Apr. 2011).

Courtecuisse et al., (Mycology and toxicology of hallucinogenic mushrooms in Europe and Americas, Annales de Toxicologie Analytique. 16(1): 36-64 (Feb. 2004).

Uthaug et al., "Prospective examination of synthetic 5-methoxy-N,N-dimethyltryptamine inhalation: effects on salivary IL-6, cortisol levels, affect, and non-judgment," Psychopharmacology (Berl). 237(3):773-85 (Mar. 2020).

Carhart-Harris et al., "Psilocybin with psychological support for treatment-resistant depression: six-month follow-up," Psychopharmacology (Berl). 235(2):399-408 (Feb. 2018).

Griffiths et al., "Psilocybin produces substantial and sustained decreases in depression and anxiety in patients with life-threatening cancer: A randomized double-blind trial," J Psychopharmacol. 30(12):1181-97 (Dec. 2016).

Roseman et al., "Increased amygdala responses to emotional faces after psilocybin for treatment-resistant depression," Neuropharmacology 142:263-9 (Nov. 2018).

(56) References Cited

OTHER PUBLICATIONS

Family et al., "Safety, tolerability, pharmacokinetics, and pharmacodynamics of low dose lysergic acid diethylamide (LSD) in healthy older volunteers," Psychopharmacology. 237(3):841-853 (13 pages) (Dec. 2019).
Passie et al., "The pharmacology of lysergic acid diethylamide: a review," CNS Neurosci Ther. 14(4):295-314 (Nov. 2008) (20 pages).
Monte et al., "Stereoselective LSD-like activity in a series of d-lysergic acid amides of (R)- and (S)-2-aminoalkanes," J Med Chem. 38(6):958-66 (Mar. 17, 1995).
Monson et al., "MDMA-facilitated cognitive-behavioural conjoint therapy for posttraumatic stress disorder: an uncontrolled trial," Eur J Psychotraumatol. 11(1):1840123 (Dec. 7, 2020).
Wolfson et al., "MDMA-assisted psychotherapy for treatment of anxiety and other psychological distress related to life-threatening illnesses: a randomized pilot study," Sci Rep. 10(1):20442 (15 pages) (Nov. 24, 2020).
Yazar-Klosinski et al., "Potential Psychiatric Uses for MDMA," Clin Pharmacol Ther. 101(2):194-6 (Feb. 2017).
PharmaTher Holdings Ltd. Dec. 14, 2021. PharmaTher Announces Positive Research Results for LSD Microneedle Patch. Press Release. <URL: https://psychedelicinvest.com/pharmather-announces-positive-research-results-for-lsd-microneedle-patch/> (6 pages).
Szabo et al., "Psychedelic N,N-dimethyltryptamine and 5-methoxy-N,N-dimethyltryptamine modulate innate and adaptive inflammatory responses through the sigma-1 receptor of human monocyte-derived dendritic cells," PLoS One 9(8):e106533 (12 pages) (Aug. 29, 2014).
Sherwood et al., "Psilocybin: crystal structure solutions enable phase analysis of prior art and recently patented examples," Acta Crystallogr C Struct Chem. 78(Pt 1):36-55 (Jan. 2022).
Kargbo et al., "Psilocybin: Characterization of the Metastable Zone Width (MSZW), Control of Anhydrous Polymorphs, and Particle Size Distribution (PSD)," ACS Omega. 7(6): 5429-5436 (Feb. 2022) with supporting information.
Kargbo et al., "Direct Phosphorylation of Psilocin Enables Optimized cGMP Kilogram-Scale Manufacture of Psilocybin," ACS Omega. 5(27): 16959-16966 (Jul. 2020).
"Quiet! Seed Crystals Growing," Flinn Scientific Inc, <https://www.flinnsci.com/api/library/Download/fcd83e5a579b470f9c0acc678ac6564c>, (6 pages) (2017).
"Seed crystal," <https://web.archive.org/web/20201209202659/https://en.wikipedia.org/wiki/Seed_crystal>, last modified Mar. 29, 2020 (2 pages).
Marek et al., "The selective 5-HT2A receptor antagonist M100907 enhances antidepressant-like behavioral effects of the SSRI fluoxetine," Neuropsychopharmacology. 30(12):2205-2015 (Dec. 2005).
"Clomipramine," <https://www.drugs.com/monograph/clomipramine.html>, medically reviewed on May 22, 2024 (16 pages).
"Psychedelic Compounds Chemical and Physical Properties," <https://wiki.dmt-nexus.me/Psychedelic_Compounds_Chemical_and_Physical_Properties>, last modified on May 19, 2023 (18 pages).
Kooijman et al., "Are psychedelics the answer to chronic pain: A review of current literature," Pain Pract. 23(4): 447-458 (Apr. 2023).
Akai et al., "Anxiolytic effects of lisuride and its agonistic action to central 5-HT1A receptors," Nihon Yakurigaku Zasshi. 97(4):209-20 (English Abstract Included) (Apr. 1991).
Reckweg et al., "A Phase 1, Dose-Ranging Study to Assess Safety and Psychoactive Effects of a Vaporized 5-Methoxy-N,N-Dimethyltryptamine Formulation (GH001) in Healthy Volunteers," Front Pharmacol. 12 (760671) (12 pages) (Nov. 2021).
Reckweg et al., "A phase 1/2 trial to assess safety and efficacy of a vaporized 5-methoxy-N,N-dimethyltryptamine formulation (GH001) in patients with treatment-resistant depression," Front Psychiatry. (8 pages) (Jun. 2023).
Tyles et al., "Psilocybin—summary of knowledge and new perspectives," Eur Neuropsychopharmacol. 24(3): 342-56 (Mar. 2014).
Turton et al., "A qualitative report on the subjective experience of intravenous psilocybin administered in an FMRI environment," Curr Drug Abuse Rev. 7(2):117-127 (2014).
"Global Investors Back Psychedelic Medicine Start-Up With $3.8m Series a Round," Beckley Psytech Press Release Jun. 30, 2020 (9 pages).
"Meet our new Scientific Advisory Board!," Beckley Psytech Press Release Sep. 10, 2020 (6 pages).
"Psychedelics breakthroughs—why now?," Beckley Psytech Press Release Sep. 10, 2020 (6 pages).
"Learning from 50 years of psychedelic progress," Psytech Press Release Oct. 19, 2020 (6 pages).
"Meet our new scientific advisors," Psytech Press Release Nov. 6, 2020 (4 pages).
"This psychedelic medicine company wants to treat psychiatric and neurological disorders," Psytech Press Release Dec. 21, 2020 (5 pages).
"Beckley Psytech announces £14m raise to conduct clinical trials on psychedelic medicine pipeline," Beckley Psytech Press Release Dec. 22, 2020 (5 pages).
"Beckley Psytech receives approval for clinical trial using psychedelic agent to treat severe headache condition," Beckley Psytech Press Release Jan. 27, 2021 (4 pages).
"Understanding 5-MeO-DMT: Historical use," Beckley Psytech Press Release Mar. 11, 2021 (5 pages).
"New psychedelic medicine COO looks to boost pharma and biotech collaborations," Beckley Psytech Press Release Feb. 22, 2021 (4 pages).
"European companies set to dominate psychedelics market," Beckley Psytech Press Release Mar. 1, 2021 (12 pages).
"Woman who has suffered with a non-stop headache for eight years fulfils dream of becoming a mum," Beckley Psytech Press Release Mar. 2, 2021 (8 pages).
"Wearable technology can revolutionise our clinical research," Beckley Psytech Press Release Mar. 2, 2021 (5 pages).
"Spotlight on Beckley Psytech and psilocybin," Beckley Psytech Press Release Mar. 22, 2021 (5 pages).
"Cosmo Feilding Mellen on Beckley Psytech's plans for 2021," Beckley Psytech Press Release Apr. 12, 2021 (6 pages).
"Former GW Pharmaceuticals CFO joins Beckley Psytech's Board," Beckley Psytech Press Release Apr. 13, 2021 (4 pages).
"Researchers in Europe, U.S. Team Up to Produce First Ever 5-MeO-DMT Psychedelic Training Program," Beckley Psytech Press Release Apr. 19, 2021 (8 pages).
"Investors think mind-bending drug DMT could rival psilocybin as a cost-effective psychedelic treatment for conditions like depression. 3 VCs explain why its fast-acting properties are appealing," Beckley Psytech Press Release May 30, 2021 (3 pages).
"Spotlight on the psychedelic experience," Beckley Psytech Press Release Jun. 9, 2021 (5 pages).
"Prescribe Software for Mental Health Treatment," Beckley Psytech Press Release Jun. 16, 2021 (6 pages).
"Beckley Psytech completes oversubscribed $80m (£58m) fundraise to develop portfolio of psychedelic medicine breakthroughs," Beckley Psytech Press Release Aug. 15, 2021 (3 pages).
"Beckley Psytech announces first patient has received low-dose psilocybin in world-first clinical trial for rare headache disorder," Beckley Psytech Press Release Sep. 14, 2021 (5 pages).
"Enhancing the accessibility of psychedelic healthcare," Beckley Psytech Press Release Nov. 23, 2021 (7 pages).
"Brunch with Sifted: Amanda Feilding and Cosmo Feilding-Mellen on the psychedelic renaissance," Beckley Psytech Press Release Nov. 24, 2021 (13 pages).
"Beckley Psytech applies for B Corporation status as part of its commitment to have a positive impact on society," Beckley Psytech Press Release Dec. 21, 2021 (5 pages).
"Beckley Psytech publishes peer-reviewed paper on 5-MeO-DMT in Journal of Psychopharmacology," Beckley Psytech Press Release Feb. 22, 2022 (4 pages).
"Beckley Psytech grows team with new Clinical Operations and Communications hires," Beckley Psytech Press Release Oct. 18, 2022 (4 pages).

(56) References Cited

OTHER PUBLICATIONS

"Beckley Psytech to participate in Canaccord Genuity's Symposium on New Paradigms and Treatment Approaches in Mental Health—Dec. 13, 2022," Beckley Psytech Press Release Dec. 7, 2022 (4 pages).
"Beckley Psytech to present data from Phase I study of BPL-003, a novel synthetic formulation of 5-MeO-DMT (Mebufotenin), at upcoming scientific conference," Beckley Psytech Press Release Apr. 24, 2023 (5 pages).
"First patient dosed in Beckley Psytech's international Phase IIb study of BPL-003, a novel synthetic intranasal formulation of 5-MeO-DMT, for Treatment Resistant Depression (TRD)," Beckley Psytech Press Release Oct. 24, 2023 (6 pages).
"Beckley Psytech announces strategic investment from atai Life Sciences to accelerate the clinical development of short-duration psychedelics," Beckley Psytech Press Release Jan. 4, 2024 (10 pages).
"Beckley Psytech's Phase I study results of novel 5-MeO-DMT formulation BPL-003 published in The Journal of Psychopharmacology," Beckley Psytech Press Release Apr. 17, 2024 (6 pages).
"First patient dosed in Beckley Psytech's Phase IIa study of BPL-003 in combination with SSRIs for Treatment Resistant Depression," Beckley Psytech Press Release Apr. 24, 2024 (6 pages).
"First participant dosed in research study investigating the effects of BPL-003, a novel formulation of 5-MeO-DMT, on the human brain," Beckley Psytech Press Release Jun. 3, 2024 (6 pages).
"Beckley Psytech and PsyPAN launch Participant Impact Report and Peer Support Pilot Program," Beckley Psytech Press Release Jun. 14, 2024 (7 pages).
"Beckley Psytech announces initial results from Phase I study and first patients dosed in Phase IIa study of ELE-101 (IV psilocin benzoate) for Major Depressive Disorder," Beckley Psytech Press Release Jun. 20, 2024 (7 pages).
"Beckley Psytech appoints Dr Rob Hershberg to its Board of Directors," Beckley Psytech Press Release Jun. 24, 2024 (6 pages).
"Beckley Psytech Announces First Cohort Dosed in Phase 1 Clinical Trial Assessing Safety and Tolerability of Intranasal 5-MeO-DMT," Oct. 25, 2021. https://www.businesswire.com/news/home/20211024005026/en/Beckley-Psytech-Announces-First-Cohort-Dosed-in-Phase-1-Clinical-Trial-Assessing-Safety-and-Tolerability-of-Intranasal-5-MeO-DMT. (2 pages).
"Beckley Psytech to present at Jefferies 2021 London Healthcare Conference," Nov. 2, 2021. https://www.businesswire.com/news/home/20211102005131/en/Beckley-Psytech-to-present-at-Jefferies-2021-London-Healthcare-Conference. (2 pages).
"Dr Frank Wiegand, Experienced Neuroscience Leader Joins Beckley Psytech as Chief Medical Officer," Nov. 3, 2021. https://www.businesswire.com/news/home/20211103005056/en/Dr-Frank-Wiegand-Experienced-Neuroscience-Leader-Joins-Beckley-Psytech-as-Chief-Medical-Officer. (2 pages).
"Beckley Psytech to present at H.C. Wainwright 2nd Annual Psychedelics Conference and Stifel 2nd Annual Conference "The Future of Healthcare"," Dec. 2, 2021. https://www.businesswire.com/news/home/20211201006018/en/Beckley-Psytech-to-present-at-H.C.-Wainwright-2nd-Annual-Psychedelics-Conference-and-Stifel-2nd-Annual-Conference-%E2%80%9CThe-Future-of-Healthcare%E2%80%9D. (2 pages).
"Beckley Psytech to attend 11th Annual LifeSci Partners Virtual Corporate Access Event," Dec. 8, 2021. https://www.businesswire.com/news/home/20211207006217/en/Beckley-Psytech-to-attend-11th-Annual-LifeSci-Partners-Virtual-Corporate-Access-Event. (2 pages).
"Beckley Psytech Announces First Cohort of Psychotherapists Have Begun Training for Treatment Resistant Depression Phase 2 Trials," Jan. 24, 2022. https://www.businesswire.com/news/home/20220123005101/en/Beckley-Psytech-Announces-First-Cohort-of-Psychotherapists-Have-Begun-Training-for-Treatment-Resistant-Depression-Phase-2-Trials. (3 pages).
"Beckley Psytech to Present at 32nd Annual Oppenheimer Healthcare Conference," Mar. 10, 2022 https://www.businesswire.com/news/home/20220309005837/en/Beckley-Psytech-to-Present-at-32nd-Annual-Oppenheimer-Healthcare-Conference. (2 pages).
"Beckley Psytech Announces Dosing of First Healthy Volunteers in Phase 1 Clinical Trial Assessing Safety and Pharmacokinetics of Second Innovative Formulation of 5-MeO-DMT," Apr. 5, 2022. https://www.businesswire.com/news/home/20220404005960/en/Beckley-Psytech-Announces-Dosing-of-First-Healthy-Volunteers-in-Phase-1-Clinical-Trial-Assessing-Safety-and-Pharmacokinetics-of-Second-Innovative-Formulation-of-5-MeO-DMT. (2 pages).
"Beckley Psytech to Attend and Present at 8th Annual LSX World Congress 2022," Apr. 13, 2022. https://www.businesswire.com/news/home/20220412005773/en/Beckley-Psytech-to-Attend-and-Present-at-8th-Annual-LSX-World-Congress-2022. (2 pages).
"Beckley Psytech Announces Partnership With Empatica in Latest Step of Digital Strategy, Designed to Deliver Personalised Patient Care," May 19, 2022. https://www.businesswire.com/news/home/20220518006041/en/Beckley-Psytech-Announces-Partnership-With-Empatica-in-Latest-Step-of-Digital-Strategy-Designed-to-Deliver-Personalised-Patient-Care. (4 pages).
"Beckley Psytech Strengthens Senior Leadership Team With Appointment of Dr. Laura Trespidi as Chief Development Officer," May 24, 2022. https://www.businesswire.com/news/home/20220523005870/en/Beckley-Psytech-Strengthens-Senior-Leadership-Team-With-Appointment-of-Dr.-Laura-Trespidi-as-Chief-Development-Officer. (4 pages).
"Beckley Psytech Announces Partnership With Ksana Health, Building on Digital Strategy to Deliver Optimised Patient Outcomes," Jun. 14, 2022. https://www.businesswire.com/news/home/20220613005701/en/Beckley-Psytech-Announces-Partnership-With-Ksana-Health-Building-on-Digital-Strategy-to-Deliver-Optimised-Patient-Outcomes. (3 pages).
"Beckley Psytech Strengthens Pipeline and Development Team With Acquisition of Eleusis Therapeutics Limited," Oct. 24, 2022. https://www.businesswire.com/news/home/20221023005029/en/Beckley-Psytech-Strengthens-Pipeline-and-Development-Team-With-Acquisition-of-Eleusis-Therapeutics-Limited. (3 pages).
"Beckley Psytech to Attend and Present at the Jefferies London Healthcare Conference—Nov. 15-17, 2022," Nov. 4, 2022. https://www.businesswire.com/news/home/20221104005095/en/Beckley-Psytech-to-Attend-and-Present-at-the-Jefferies-London-Healthcare-Conference-%E2%80%93-November-15-17-2022. (2 pages).
"Beckley Psytech Announces First Participant Dosed in Phase I Trial of ELE-101, A Novel Intravenous Formulation of Psilocin," Nov. 9, 2022. https://www.businesswire.com/news/home/20221108005986/en/Beckley-Psytech-Announces-First-Participant-Dosed-in-Phase-I-Trial-of-ELE-101-A-Novel-Intravenous-Formulation-of-Psilocin. (2 pages).
"Beckley Psytech Successfully Completes Phase I Clinical Study of Lead Candidate BPL-003, a Novel Benzoate Formulation of 5-MeO-DMT," Nov. 15, 2022. https://www.businesswire.com/news/home/20221114005907/en/Beckley-Psytech-Successfully-Completes-Phase-I-Clinical-Study-of-Lead-Candidate-BPL-003-a-Novel-Benzoate-Formulation-Of-5-MeO-DMT. (2 pages).
"Beckley Psytech Launches Phase IIa Study of Lead Candidate BPL-003, a Novel Benzoate Formulation of 5-MeO-DMT, for Treatment Resistant Depression," Dec. 21, 2022. https://www.businesswire.com/news/home/20221221005221/en/Beckley-Psytech-Launches-Phase-IIa-Study-of-Lead-Candidate-BPL-003-a-Novel-Benzoate-Formulation-of-5-MeO-DMT-for-Treatment-Resistant-Depression. (2 pages).
"Beckley Psytech receives FDA Investigational New Drug (IND) approval for Phase IIb study of BPL-003, a novel synthetic formulation of 5-MeO-DMT (Mebufotenin)," Feb. 21, 2023. https://www.businesswire.com/news/home/20230221005523/en/Beckley-Psytech-receives-FDA-Investigational-New-Drug-IND-approval-for-Phase-IIb-study-of-BPL-003-a-novel-synthetic-formulation-of-5-MeO-DMT-Mebufotenin. (2 pages).
"Beckley Psytech initiates Phase IIa study of 5-MeO-DMT candidate BPL-003 for Alcohol Use Disorder," Apr. 5, 2023. https://www.businesswire.com/news/home/20230405005132/en/Beckley-Psytech-initiates-Phase-IIa-study-of-5-MeO-DMT-candidate-BPL-003-for-Alcohol-Use-Disorder. (2 pages).

(56) References Cited

OTHER PUBLICATIONS

"First Patient Dosed in Beckley Psytech's Phase IIa Study of BPL-003 for Treatment Resistant Depression," May 4, 2023. https://www.businesswire.com/news/home/20230504005020/en/First-Patient-Dosed-in-Beckley-Psytech%E2%80%99s-Phase-IIa-Study-of-BPL-003-for-Treatment-Resistant-Depression. (2 pages).
"Beckley Psytech announces positive initial data from Phase IIa study of novel 5-MeO-DMT formulation BPL-003 for Treatment Resistant Depression," Mar. 27, 2024. https://www.businesswire.com/news/home/20240326357401/en/Beckley-Psytech-announces-positive-initial-data-from-Phase-IIa-study-of-novel-5-MeO-DMT-formulation-BPL-003-for-Treatment-Resistant-Depression. (3 pages).
"Clinical Practice Guideline: Intranasal Medication Administration," Emergency Nurses Association. (36 pages) (2016).
Rucker et al., "Phase 1, placebo-controlled, single ascending dose trial to evaluate the safety, pharmacokinetics and effect on altered states of consciousness of intranasal BPL-003 (5-methoxy- N,N-dimethyltryptamine benzoate) in healthy participants," J. Psychopharmacol. Clinical Trial 38(8): 712-723 (Aug. 2024).
"Vacuum for Laboratories: Vacuu-Lan Local Vacuum Networks," Vacuubrand (2019) (16 pages).
"Cimarec+ stirrers, hotplates, and stirring hotplates: Operating Manual and Parts List," Thermo Scientific (Feb. 2017) (31 pages).
Greenan et al., "Preparation and Characterization of Novel Crystalline Solvates and Polymorphs of Psilocybin and Identification of Solid Forms Suitable for Clinical Development," ResearchGate (Feb. 2020) (29 pages).
"Thermal Applications Note: Purge Gas Recommendations for use in Modulated DSC," TA Instruments: Thermal Analysis & Rheology (3 pages).
Robertson, Dr. Donald L., "Supersaturated Solution," modified Oct. 18, 2010 (1 page).
Lieberman et al., "Lisuride in Parkinson disease: efficacy of lisuride compared to levodopa," Neurology. 31(8):961-5. Abstract (Aug. 1981).
Nakamura et al., "Effects in animal models of depression of lisuride alone and upon coadministration with antidepressants," Folia pharmacol japon. 94(1):81-9 (English language abstract) (Jul. 1989).
Katzman, Martin A., "Aripiprazole: A clinical review of its use for the treatment of anxiety disorders and anxiety as a comorbidity in mental illness," Journal of Affective Disorders. 128S1:S11-20 (Jan. 2011).
Haridy, Rich, "The start-up behind a magic mushroom nose spray for psychedelic microdosing," New Atlas. Dec. 5, 2019 (12 pages).
"Spravato (esketamine) nasal spray, CIII." Janssen Pharmaceuticals, prescribing information. Jul. 2020 (15 pages).
"Beckley Psytech Bolsters Pipeline of Next-Generation Psychedelic Medicines With Research Collaboration and Strengthening of Relationship With Lophora ApS," May 11, 2022. https://www.beckleypsytech.com/posts/beckley-psytech-bolsters-pipeline-of-next-generation-psychedelic-medicines-with-research-collaboration-and-strengthening-of-relationship-with-lophora-aps (6 pages).
Henriques et al., "Spray dried powders for nasal delivery: Process and formulation considerations," Eur J Pharm Biopharm. 176:1-20 (May 2022).
Rucker et al., "Intranasal 5-MeO-DMT (BPL-003) Safety, PK, and effect on altered states of consciousness in healthy volunteers," Beckley Psytech. Poster No. T152. Presented: SOBP Annual Meeting, San Diego, California, Apr. 27-29, 2023 (1 page).
Malik et al., "Phase 1 Study Results on the Effects of 5-MeO-DMT Benzoate on Facial Emotion Processing in Psychedelic-Naïve Healthy Subjects," Neuroscience Applied 2. P.0097:45-46 (Dec. 2023) (2 pages).
Malik et al., "Phase 1 study results on the effects of 5-MeO-DMT. benzoate (BPL-003) on facial emotion processing in psychedelic-naïve healthy subjects," Beckley Psytech. Poster No. P.0097. Presented: Sep. 30, 2023 (1 page).
Roberts et al., "Intranasal 5-MeO-DMT (BPL-003) safety, pharmacokinetics and psychedelic effects in healthy volunteers," Beckley Psytech. Poster No. P.0639. Presented: 6th ECNP Congress, Barcelona, Spain, Oct. 7-10, 2023 (1 page).
Roberts et al., "Intranasal 5-Methoxy-N, N-Dimethyltryptamine Safety, Pharmacokinetics and Psychedelic Effects in Healthy Volunteers," Neuroscience Applied 2. P.0639:6-7 (Dec. 2023) (2 pages).
"5-MEO and suddenly I quit smoking," Reddit. Retrieved Nov. 27, 2023. Available <https://www.reddit.com/r/5MeODMT/comments/bzcn8v/5meo_and_suddenly_i_quit_smoking/> (Jun. 2019) (3 pages).
"A phase 1/2 study of GH001 in patients with treatment-resistant depression," EU Clincal Trials Register. EudraCT No. 2018-004208-20, Sponsor's Protocol Code No. GH001-MDD-102. Available Jul. 1, 2019. Accessed 2024 (5 pages).
"A Quadruple Masked, Dose-Finding Study to Evaluate the Efficacy and Safety of Intranasal BPL-003, with Open Label Extension, in Patients with Treatment Resistant Depression," EU Clinical Trials Register. EudraCT No. 2022-003743-10, Sponsor's Protocol Code No. BPL-003-201. Available May 16, 2023. Accessed 2025 (8 pages).
"Addictions helped by 5meoDMT?," Reddit. Retrieved Nov. 27, 2023. Available <https://www.reddit.com/r/5MeODMT/comments/kwov0n/addictions_helped_by_5meodmt/?utm_source=share&utm_medium=web2x&context=3> (Jan. 2021) (2 pages).
"Atai Life Sciences Announces Closing of Public Offering and Full Exercise of Option to Purchase Additional Common Shares," Feb. 20, 2025. Available <https://ir.atai.life/news-releases/news-release-details/atai-life-sciences-announces-closing-public-offering-and-full> (2 pages).
"Atai Life Sciences Announces Completion of Enrollment in Phase 2b Clinical Trial Evaluating BPL-003 for Treatment-Resistant Depression," Mar. 5, 2025. Available <https://ir.atai.life/news-releases/news-release-details/atai-life-sciences-announces-completion-enrollment-phase-2b> (2 pages).
"Atai Life Sciences Announces Dosing of First Patient in Part 2 of Beckley Psytech's Phase 2a Study Exploring BPL-003 Adjunctive to SSRIs in Patients with Treatment Resistant Depression," Apr. 24, 2024. Available <https://ir.atai.life/news-releases/news-release-details/atai-life-sciences-announces-dosing-first-patient-part-2-beckley> (2 pages).
"Atai Life Sciences Announces First Participant Dosed in Phase 1b Trial of VLS-01," Mar. 4, 2024. Available <https://ir.atai.life/news-releases/news-release-details/atai-life-sciences-announces-first-participant-dosed-phase-1b> (2 pages).
"Atai Life Sciences Announces First Patient Dosed in Elumina, the Phase 2 Clinical Trial of VLS- 01 for Treatment-Resistant Depression," Mar. 11, 2025. Available <https://ir.atai.life/news-releases/news-release-details/atai-life-sciences-announces-first-patient-dosed-elumina-phase-2> (2 pages).
"Atai Life Sciences Announces Key Leadership Appointments as it Advances its Pipeline of Novel Psychedelic Therapeutics for Mental Health," Jan. 10, 2025. Available <https://ir.atai.life/news-releases/news-release-details/atai-life-sciences-announces-key-leadership-appointments-it> (2 pages).
"Atai Life Sciences Announces Positive Preliminary Results from Phase 1b Trial of VLS-01 (Buccal Film DMT)," Aug. 13, 2024. Available <https://ir.atai.life/news-releases/news-release-details/atai-life-sciences-announces-positive-preliminary-results-phase> (2 pages).
"Atai Life Sciences Announces Positive Topline Results from Beckley Psytech's BPL-003 (intranasal 5-MeO-DMT benzoate) Phase 2a Open-Label Study for Alcohol Use Disorder," Jan. 28, 2025. Available <https://ir.atai.life/news-releases/news-release-details/atai-life-sciences-announces-positive-topline-results-beckley> (2 pages).
"Atai Life Sciences Announces Positive Topline Results from Beckley Psytech's BPL-003 (intranasal 5-MeO-DMT benzoate) Phase 2a Open-Label Study for Alcohol Use Disorder,"Jan. 28, 2025. Available <https://ir.atai.life/news-releases/news-release-details/atai-life-sciences-announces-positive-to line-results-beckley> (2 pages).
"Atai Life Sciences Announces Positive Topline Results from Single Ascending Dose Phase 1 Study with EMP-01 (R-MDMA)," Jan. 2, 2024. Available <https://ir.atai.life/news-releases/news-release-details/atai-life-sciences-announces-positive-topline-results-single> (2 pages).
"Atai Life Sciences Announces Pricing of Public Offering of Common Shares," Feb. 12, 2025. Available <https://ir.atai.life/news-

(56) References Cited

OTHER PUBLICATIONS releases/news-release-details/atai-life-sciences-announces-pricing-public-offering-common> (1 page).
"Atai Life Sciences Announces Proposed Public Offering of Common Shares," Feb. 12, 2025. Available <https://ir.atai.life/news-releases/news-release-details/atai-life-sciences-announces-proposed-public-offering-common> (1 page).
"Atai Life Sciences Announces Strategic Investment in Beckley Psytech to Accelerate the Clinical Development of Short-Duration Psychedelics," Jan. 4, 2024. Available <https://ir.atai.life/news-releases/news-release-details/atai-life-sciences-announces-strategic-investment-beckley> (2 pages).
"Atai Life Sciences Announces the Publication of Beckley Psytech's Phase 1 Study of BPL-003 in the Journal of Psychopharmacology," Apr. 17, 2024. Available <https://ir.atai.life/news-releases/news-release-details/atai-life-sciences-announces-publication-beckley-psytechs-phase> (2 pages).
"Atai Life Sciences Announces Update on Beckley Psytech's Phase 1/2a Trial of ELE-101 (IV Psilocin) for Major Depressive Disorder, with Initial Results from Phase 1 and First Patients Dosed in Phase 2a," Jun. 20, 2024. Available <https://ir.atai.life/news-releases/news-release-details/atai-life-sciences-announces-update-beckley-psytechs-phase-12a> (2 pages).
"Atai Life Sciences Appoints Anne Johnson as Chief Financial Officer," Feb. 6, 2024. Available <https://ir.atai.life/news-releases/news-release-details/atai-life-sciences-appoints-anne-johnson-chief-financial-officer> (1 page).
"Atai Life Sciences Reports First Quarter 2024 Financial Results and Corporate Updates," May 15, 2024. Available <https://ir.atai.life/news-releases/news-release-details/atai-life-sciences-reports-first-quarter-2024-financial-results> (pages).
"Atai Life Sciences Reports Fourth Quarter and Full Year 2023 Financial Results and Provides Corporate and Clinical Highlights," Mar. 28, 2024. Available <https://ir.atai.life/news-releases/news-release-details/atai-life-sciences-reports-fourth-quarter-and-full-year-2023> (4 pages).
"Atai Life Sciences Reports Fourth Quarter and Full Year 2024 Financial Results and Recent Corporate Highlights," Mar. 17, 2025. Available <https://ir.atai.life/news-releases/news-release-details/atai-life-sciences-reports-fourth-quarter-and-full-year-2024> (4 pages).
"Atai Life Sciences Reports Second Quarter 2024 Financial Results and Provides Corporate Updates," Aug. 13, 2024. Available <https://ir.atai.life/news-releases/news-release-details/atai-life-sciences-reports-second-quarter-2024-financial-results> (4 pages).
"Atai Life Sciences Reports Third Quarter 2024 Financial Results and Provides Corporate Updates," Nov. 13, 2024. Available <https://ir.atai.life/news-releases/news-release-details/atai-life-sciences-reports-third-quarter-2024-financial-results> (4 pages).
"Atai Life Sciences Strengthens Board with Appointment of Two New Independent Directors," May 23, 2024. Available <https://ir.atai.life/news-releases/news-release-details/atai-life-sciences-strengthens-board-appointment-two-new> (1 page).
"Atai Life Sciences to Participate in the 2024 Maxim Healthcare Virtual Summit," Oct. 15, 2024. Available <https://ir.atai.life/news-releases/news-release-details/atai-life-sciences-participate-2024-maxim-healthcare-virtual> (1 page).
"Atai Life Sciences to Participate in the Canaccord Genuity 44th Annual Growth Conference," Aug. 7, 2024. Available <https://ir.atai.life/news-releases/news-release-details/atai-life-sciences-participate-canaccord-genuity-44th-annual> (1 page).
"Atai Life Sciences to Participate in the H.C. Wainwright 26th Annual Global Investment Conference," Sep. 4, 2024. Available <https://ir.atai.life/news-releases/news-release-details/atai-life-sciences-participate-hc-wainwright-26th-annual-global> (1 page).
"Atai Life Sciences to Participate in the H.C. Wainwright 5th Annual Neuro Perspectives Conference," Jun. 26, 2024. Available <https://ir.atai.life/news-releases/news-release-details/atai-life-sciences-participate-hc-wainwright-5th-annual-neuro> (1 page).
"Atai Life Sciences to Participate in the Jefferies 2024 Global Healthcare Conference," May 31, 2024. Available <https://ir.atai.life/news-releases/news-release-details/atai-life-sciences-participate-jefferies-2024-global-healthcare> (1 page).
"Atai Life Sciences to Participate in the TD Cowen 45th Annual Health Care Conference," Feb. 24, 2025. Available <https://ir.atai.life/news-releases/news-release-details/atai-life-sciences-participate-td-cowen-45th-annual-health-care> (1 page).
"Atai Life Sciences to Participate in the Upcoming TD Cowen 44th Annual Health Care Conference," Feb. 28, 2024. Available <https://ir.atai.life/news-releases/news-release-details/atai-life-sciences-participate-upcoming-td-cowen-44th-annual> (1 page).
"Beckley Psytech announces positive topline data from Phase IIa study of BPL-003 (intranasal 5-MeO-DMT benzoate) for Alcohol Use Disorder," Jan. 28, 2025. Available <https://www.beckleypsytech.com/posts/beckley-psytech-announces-positive-topline-data-from-phase-iia-study-of-bpl-003-for-alcohol-use-disorder> (7 pages).
"Beckley Psytech announces positive topline results from Phase IIa study of ELE-101 (IV psilocin benzoate) for Major Depressive Disorder," Dec. 16, 2024. Available <https://www.beckleypsytech.com/posts/beckley-psytech-announces-positive-topline-results-from-phase-iia-study-of-ele-101-for-major-depressive-disorder> (7 pages).
"Beckley Psytech Completes Enrolment in Phase IIb study of BPL-003 for Treatment Resistant Depression," Mar. 5, 2025. Available <https://www.beckleypsytech.com/posts/beckley-psytech-completes-enrolment-in-phase-iib-study-of-bpl-003-for-treatment-resistant-depression> (6 pages).
"Beckley Psytech to present data on BPL-003, a novel synthetic intranasal formulation of 5-MeO-DMT benzoate, at ECNP 2024," Sep. 16, 2024. Available <https://www.beckleypsytech.com/posts/beckley-psytech-to-present-data-on-bpl-003-at-ecnp-2024> (5 pages).
"BUFO 5-MEO-DMT has practically cured me of my anxiety, insomnia and of childhood traumas," Reddit. Available <https://www.reddit.com/r/5MeODMT/comments/nvi049/bufo_5meodmt_has_practically_cured_me_of_my/> (Jun. 2021) (15 pages).
"Intro," 5 Hive Forum. Available <https://forums.5meodmt.org/index.php/topic,50868.msg55861.html#msg55861> (Feb. 2019) (2 pages).
"Introduction of me andy my 5-MeO movie," 5 Hive Forum. Retrieved Nov. 27, 2023. Available <https://forums.5meodmt.org/index.php/topic,50738.msg55435.html#msg55435> (May 2018) (2 pages).
"My first 5MeODMT Experience—12mg (vaporized)," Reddit. Available <https://www.reddit.com/r/5MeODMT/comments/dai2dp/my_first_5meodmt_experience_12mg_vaporized/?share_id=2OegQvv7bxUmdqaFM0in_&utm_content=2&utm_medium=ios_app&utm_name=ioscss&utm_source=share&utm_term=10> (Sep. 2019) (8 pages).
"My journey with 5MEODMT," Reddit. Available <https://www.reddit.com/r/5MeODMT/comments/t592jk/my_journey_with_5meodmt/> (Mar. 2022) (2 pages).
"Opinion on 5MeODMT+Ketamine therapy," Reddit. Retrieved Nov. 27, 2023. Available <https://www.reddit.com/r/5MeODMT/comments/epukgs/comment/femkolp/?utm_source=share&utm_medium=web2x&context=3> (Jan. 2020) (2 pages).
"Pioneering the development of highly effective mental health treatments to transform patient outcomes," atai Life Sciences Corporate Presentation. Mar. 2025. Available <https://ir.atai.com/static-files/93ac20a9-2c59-4ce6-b69d-3add22e34fc3> (36 pages).
"Strategic Investment in Beckley Psytech," atai Life Sciences Investor Deck. Conference call, Thursday, Jan. 4, 2024 (17 pages).
"Toads Poison Use Is Not an Ancient Indigenous Tradition," 5 Hive Forum. Retrieved Nov. 27, 2023. Available <https://forums.5meodmt.org/index.php/topic,50611.msg54941.html#msg54941> (Nov. 2017) (5 pages).
"Will 5meo help my addiction issues?," Reddit. Available <https://www.reddit.com/r/5MeODMT/comments/q3v3bt/comment/hfuxvjo/?utm_source=share&utm_medium=web2x&context=3> (Oct. 2021) (1 page).
Agin-Liebes et al., "Long-term follow-up of psilocybin-assisted psychotherapy for psychiatric and existential distress in patients with life-threatening cancer," J Psychopharmacol. 34(2):155-166 (Feb. 2020).
Agurell et al., "Metabolism of 5-methoxy-N, -N dimethyltryptamine-14C in the rat," Biochemical Pharmacology. 18:2771-2781 (1969).

(56) References Cited

OTHER PUBLICATIONS

Akerman et al. "Animal models for trigeminal autonomic cephalalgias," In 'Cluster Headache and other Trigeminal Autonomic Cephalalgias', Chapter 9, eds. Leone M, May A. Springer Nature Switzerland AG (2020).
Akerman et al., "Oxygen inhibits neuronal activation in the trigeminocervical complex after stimulation of trigeminal autonomic reflex, but not during direct dural activation of trigeminal afferents," Headache. 49(8):1131-43 (Sep. 2009).
Al-Harbi, K. S., "Treatment-resistant depression: therapeutic trends, challenges, and future directions," Patient Preference and Adherence. 6:369-88 (Apr. 2012) (20 pages).
Anderson et al., "Microdosing psychedelics: personality, mental health, and creativity differences in microdosers," Psychopharmacology (Berl). 236(2):731-740 (Feb. 2019).
Andersson et al., "Psychoactive substances as a last resort—a qualitative study of self-treatment of migraine and cluster headaches," Harm Reduct J. 14(1):60 (Sep. 2017) (10 pages).
Arias-de la Torre et al., "Prevalence and variability of current depressive disorder in 27 European countries: a population-based study," Lancet Public Health. 6(10):e729-e738 (Oct. 2021).
Bacqué-Cazenave et al., "Serotonin in Animal Cognition and Behavior," Int J Mol Sci. 21(5):1649 (Feb. 2020) (23 pages).
Baggott et al., "Abnormal visual experiences in individuals with histories of hallucinogen use: a Web-based questionnaire," Drug Alcohol Depend. 114(1):61-7 (Mar. 2011).
Bannister et al., "What the brain tells the spinal cord," Pain. 157(10):2148-2151 (Oct. 2016).
Barbut Siva et al., "Interactions between classic psychedelics and serotonergic antidepressants: Effects on the acute psychedelic subjective experience, well-being and depressive symptoms from a prospective survey study," Journal of Psychopharmacology. 38(2):145-155 (Jan. 2024).
Barker et al., "A critical review of reports of endogenous psychedelic N, N-dimethyltryptamines in humans: 1955-2010," Drug Test Analysis. (Feb. 2012) (19 pages).
Barker et al., "Distribution of the hallucinogens N, N-dimethyltryptamine and 5-methoxy-N,N-dimethyltryptamine in rat brain following intraperitoneal injection: application of a new solid-phase extraction LC-APcI-MS-MS-isotope dilution method," J Chromatogr B. 751:37-47 (2001).
Barker, "N, N-Dimethyltryptamine (DMT), an Endogenous Hallucinogen: Past, Present, and Future Research to Determine Its Role and Function," Front Neurosci. 12(536) (Aug. 2018) (17 pages).
Barrett et al., "Emotions and brain function are altered up to one month after a single high dose of psilocybin," Sci Rep. 10(1):2214 (Feb. 2020) (14 pages).
Barrett et al., "Validation of the revised Mystical Experience Questionnaire in experimental sessions with psilocybin," J Psychopharmacol. 29(11):1182-90 (Nov. 2015) (20 pages).
Barry et al., "GC/MS comparison of the West Indian aphrodisiac 'Love Stone' to the Chinese medication 'chan su': bufotenine and related bufadienolides," J Forensic Sci. 41(6):1068-1073 (1996).
Barsuglia et al., "A case report SPECT study and theoretical rationale for the sequential administration of ibogaine and 5-MeO-DMT in the treatment of alcohol use disorder," Prog Brain Res. 242:121-158 (2018).
Barsuglia et al., "Intensity of mystical experiences occasioned by 5-MeO-DMT and comparison with a prior psilocybin study," Frontiers in Psycology. 9(2459) (Dec. 2018) (6 pages).
Bartsch et al., "Deep brain stimulation of the posterior hypothalamic area in intractable short-lasting unilateral neuralgiform headache with conjunctival injection and tearing (SUNCT)," Cephalalgia. 31(13):1405-8 (Oct. 2011).
Becker et al., "Acute effects of psilocybin after escitalopram or placebo pretreatment in a randomized, double-blind, placebo-controlled, crossover study in healthy subjects," Clinical Pharmacology & Therapeutics. 111(4):886-895 (Nov. 2021).
Beemster et al., "Test-Retest Reliability, Agreement and Responsiveness of Productivity Loss (iPCQ-VR) and Healthcare Utilization (TiCP-VR) Questionnaires for Sick Workers with Chronic Musculoskeletal Pain," J Occup Rehabil. 29(1):91-103 (Mar. 2018).
Belouin et al., "Psychedelics: Where we are now, why we got here, what we must do," Neuropharmacology. 142:7-19 (Nov. 2018).
Benington et al., "5-methoxy-N, N-dimethyltryptamine, a possible endogenous psychotoxin," The Alabama Journal of Medical Sciences. 2(4):397-403 (1965) (8 pages).
Bennabi et al., "Clinical guidelines for the management of treatment-resistant depression: French recommendations from experts, the French Association for Biological Psychiatry and Neuropsychopharmacology and the fondation FondaMental," BMC Psychiatry. 19(1):262 (Aug. 2019) (12 pages).
Berendsen et al., "Selective activation of 5HT1A receptors induces lower lip retraction in the rat," Pharmacology Biochemistry & Behavior. 33(4):821-7 (1989).
Berger et al, "Carbon 11 labeling of the psychoactive drug o-methyl-bufotenine and its distribution in the animal organism," Eur J Nucl Med. 3:101-4 (1978).
Blair et al. "Effect of ring fluorination on the pharmacology of hallucinogenic tryptamines," J Med Chem. 43(24):4701-10 (Nov. 2000).
Bogenschutz et al., "Classic hallucinogens in the treatment of addictions," Prog Neuropsychopharmacol Biol Psychiatry. 64:250-8 (Jan. 2016).
Bogenschutz et al., "Psilocybin-assisted treatment for alcohol dependence: a proof-of-concept study," Journal of Psycopharmacology. 29(3):289-99 (2015).
Bonson et al., "Alterations in responses to LSD in humans associated with chronic administration of tricyclic antidepressants, monoamine oxidase inhibitors or lithium," Behavioural Brain Research. 73:229-233 (1996).
Bonson et al., "Chronic administration of serotonergic antidepressants attenuates the subjective effects of LSD in humans," Neuropsychopharmacology. 14(6):425-36 (1996).
Borissova et al., "The development of psilocybin therapy for treatment-resistant depression: an update," BJPsych Bulletin. 48:38-44 (Feb. 2024).
Borowiak et al., "Psilocin multiple intake resulted and in cardiotoxic effects," Acta Toxicologica. 14(1-2):23-30 (Jan. 2006) (9 pages).
Borowiak et al., "Psilocybin mushroom (Psilocybe semilanceata) intoxication with myocardial infarction," J Toxicol Clin Toxicol. 36(1-2):47-9 (1998).
Breeksema et al., "Patient perspectives and experiences with psilocybin treatment for treatment-resistant depression: a qualitative study," Scientific Reports. 14(2929) (Feb. 2024) (12 pages).
Brouwer et al., "Pivotal mental states," J Psychopharmacol. 35(4):319-352 (Apr. 2021).
Brown et al., "Pharmacokinetics of Escalating Doses of Oral Psilocybin in Healthy Adults," Clin Pharmacokinet. 56(12):1543-1554 (Dec. 2017).
Brummett et al., "Cortisol responses to emotional stress in men: association with a functional polymorphism in the 5HTR2C gene," Biol Psychol. 89(1):94-8 (Jan. 2012) (11 pages).
Brush et al., "Monoamine oxidase inhibitor poisoning resulting from Internet misinformation on illicit substances," J Toxicol Clin Toxicol. 42(2):191-5 (2004) (6 pages).
Buckholtz et al., "Lysergic acid diethylamide (LSD) administration selectively downregulates serotonin(2) receptors in rat brain," Neuropsychopharmacology. 3(2):137-148 (1990).
Buckley, "Serotonin syndrome," BMJ. 348:g1626. (Feb. 2014) (4 pages).
Callaway et al., "Pharmacokinetics of Hoasca alkaloids in healthy humans," J Ethnopharmacol. 65(3):243-56 (Jun. 1999).
Canal et al., "Head-twitch response in rodents induced by the hallucinogen 2,5-dimethoxy-4-iodoamphetamine: a comprehensive history, a re-evaluation of mechanisms, and its utility as a model," Drug Test Anal. 4(0):556-76 (Jul.-Aug. 2012) (41 pages).
Cao et al., "Secondary Short-Lasting Unilateral Neuralgiform Headache with Conjunctival Injection and Tearing: A New Case and a Literature Review," J Clin Neurol. 14(4):433-443 (Oct. 2018).
Carbonaro et al., "Neuropharmacology of N, N-dimethyltryptamine," Brain Res Bull. 126(Pt 1):74-88 (Sep. 2016).

(56) References Cited

OTHER PUBLICATIONS

Carbonaro et al., "Survey study of challenging experiences after ingesting psilocybin mushrooms: Acute and enduring positive and negative consequences," Journal of Psychopharmacology. 30(12) (Aug. 2016) (11 pages).
Carhart-Harris et al., "Implications for psychedelic-assisted psychotherapy: functional magnetic resonance imaging study with psilocybin," Br J Psychiatry. 200(3):238-44 (Mar. 2012).
Carhart-Harris et al., "Neural correlates of the psychedelic state as determined by fMRI studies with psilocybin," Proc Natl Acad Sci USA.109(6):2138-43 (Feb. 2012).
Carhart-Harris et al., "Psilocybin for treatment-resistant depression: fMRI-measured brain mechanisms," Scientific Reports. 7:13187 (Oct. 2017) (11 pages).
Carhart-Harris et al., "Psychedelics and connectedness," Psychopharmacology (Berl). 235(2):547-550 (Feb. 2018).
Carhart-Harris et al., "Psychedelics and the essential importance of context," J Psychopharmacol. 32(7):725-731 (Jul. 2018).
Carhart-Harris et al., "Serotonin and brain function: a tale of two receptors," Journal of Psychopharmacology. 31(9):1091-1120 (Aug. 2017).
Carhart-Harris et al., "The administration of psilocybin to healthy, hallucinogen-experienced volunteers in a mock-functional magnetic resonance imaging environment: a preliminary investigation of tolerability," J Psychopharmacol. 25(11):1562-7 (Nov. 2011).
Carhart-Harris et al., "The entropic brain: a theory of conscious states informed by neuroimaging research with psychedelic drugs," Front Hum Neurosci. 8:20 (Feb. 2014) (22 pages).
Carhart-Harris et al., "The Therapeutic Potential of Psychedelic Drugs: Past, Present, and Future," Neuropsychopharmacology. 42(11):2105-2113 (Oct. 2017).
Carhart-Harris et al., "Trial of Psilocybin versus Escitalopram for Depression," N Engl J Med. 384(15):1402-11 (Apr. 2021).
Carhart-Harris et al., "User perceptions of the benefits and harms of hallucinogenic drug use: A web-based questionnaire study," Journal of Substance Use. 15(4):283-300 (Jul. 2010).
Carter et al., "Using psilocybin to investigate the relationship between attention, working memory, and the serotonin 1A and 2A receptors," J Cogn Neurosci. 17(10):1497-508 (Oct. 2005) (13 pages).
Cartwright et al., "Long-term antidepressant use: patient perspectives of benefits and adverse effects," Patient Prefer Adherence. 10:1401-7 (Jul. 2016).
Castellanos et al., "Chronic pain and psychedelics: a review and proposed mechanism of action," Reg Anesth Pain Med. 45(7):486-494 (Jul. 2020) (9 pages).
Catlow et al., "Effects of psilocybin on hippocampal neurogenesis and extinction of trace fear conditioning," Exp Brain Res. 228(4):481-91 (Jun. 2013).
Chadeayne et al., "Active Metabolite of Aeruginascin (4-Hydroxy-N,N,N-trimethyltryptamine): Synthesis, Structure, and Serotonergic Binding Affinity," ACS Omega. 5(27):16940-16943 (Jul. 2020).
Chagraoui et al., "5-HT2C receptors in psychiatric disorders: A review," Prog Neuropsychopharmacol Biol Psychiatry. 66:120-135 (Apr. 2016).
Chen et al. "Determining the pharmacokinetics of psilocin in rat plasma using ultra-performance liquid chromatography coupled with a photodiode array detector after orally administering an extract of Gymnopilus spectabilis," J Chromatogr B Analyt Technol Biomed Life Sci. 879(25):2669-2672 (Sep. 2011).
Cleare et al. "Neuroendocrine and hypothermic effects of 5-HT1A receptor stimulation with ipsapirone in healthy men: a placebo-controlled study," Int Clin Psychopharmacol. 13(1):23-32 (Jan. 1998).
Cohen, A.S. "Short-lasting unilateral neuralgiform headache attacks with conjunctival injection and tearing," Cephalalgia. 27(7):824-832 (Jul. 2007).
Cohen, Sidney, "LSD and the Anguish of Dying," Harper's Magazine. 231(1384):69-78 (Sep. 1965).

Conway et al. "Toward an Evidence-Based, Operational Definition of Treatment-Resistant Depression: When Enough Is Enough," JAMA Psychiatry. 74(1):9-10 (Jan. 2017).
Cornelisse et al., "Reduced 5-HT1A- and GABAB Receptor Function in Dorsal Raphé Neurons Upon Chronic Fluoxetine Treatment of Socially Stressed Rats," J Neurophysiol. 98:196-204 (Jul. 2007).
Cortes-Altamirano et al. "Review: 5-HT1, 5-HT2, 5-HT3 and 5-HT7 Receptors and their Role in the Modulation of Pain Response in the Central Nervous System," Curr Neuropharmacol. 16(2):210-221 (Jan. 2018).
Costa et al. "The Neuropharmacology of Cluster Headache and other Trigeminal Autonomic Cephalalgias," Curr Neuropharmacol. 13(3):304-323 (2015).
Cowen et al., "What has serotonin to do with depression?," World Psychiatry. 14(2):158-60 (Jun. 2015).
Cowen, Phil. "Altered states: psilocybin for treatment-resistant depression," Lancet Psychiatry. 3(7):592-593 (Jul. 2016).
Critchley et al. "Effects in the X-maze anxiety model of agents acting at 5-HT1 and 5-HT2 receptors," Psychopharmacology (Berl). 93(4):502-506 (1987).
Cumming et al. "Molecular and Functional Imaging Studies of Psychedelic Drug Action in Animals and Humans," Molecules. 26(9):2451 (Apr. 2021) (26 pages).
Dabire et al. "Comparison of effects of some 5-HT1 agonists on blood pressure and heart rate of normotensive anaesthetized rats," Eur J Pharmacol. 140(3):259-266 (Aug. 1987).
Dabire et al. "Vascular postsynaptic effects of some 5-HT1-like receptor agonists in the pithed rat," Eur J Pharmacol. 150(1-2):143-148 (May 1988).
Dabire, Hubert, "Central 5-hydroxytryptamine (5-HT) receptors in blood pressure regulation," Therapie. 46:421-9 (Nov. 1991) (10 pages).
Dahmane et al. "Exposure-Response Analysis to Assess the Concentration-QTc Relationship of Psilocybin/Psilocin," Clin Pharmacol Drug Dev. 10(1):78-85 (Jan. 2021).
Dakic et al. "Short term changes in the proteome of human cerebral organoids induced by 5-MeO-DMT," Sci Rep. 7(1):12863 (Oct. 2017) (13 pages).
Davies et al., "Binding affinity and biological activity of oxygen and sulfur isosteres at melatonin receptors as a function of their hydrogen bonding capability," Bioorganic Chemistry. 32(1):1-12 (Feb. 2004) (6 pages).
Davis et al. "Psychedelic Treatment for Trauma-Related Psychological and Cognitive Impairment Among US Special Operations Forces Veterans," Chronic Stress. vol. 4 (Jul. 2020) (11 pages).
Davis et al. "The epidemiology of 5-methoxy- N, N-dimethyltryptamine (5-MeO-DMT) use: Benefits, consequences, patterns of use, subjective effects, and reasons for consumption," J Psychopharmacol. 32(7):779-792 (Jul. 2018) (29 pages).
Davis et al., "Effects of psilocybin-assisted therapy on major depressive disorder: a randomized clinical trial," JAMA Psychiatry. 78(5):481-489 (May 2021).
Davis et al., "The healing potential of 5-MeO-DMT: Results from two survey studies," Conference: Midwest Psychedelic Therapy Symposium at: Madison, Wisconsin, Apr. 2018 (2 pages).
De Coo et al. "Increased use of illicit drugs in a Dutch cluster headache population," Cephalalgia. 39(5):626-634 (Apr. 2019).
Deakin et al., "5-HT and mechanisms of defence," Journal of Psychopharmacology. 5(4):305-15 (Jul. 1991).
Delay et al. "[The psychophysiological effects of psilocybine]," C R Hebd Seances Acad Sci. 247(16):1235-1238 (Oct. 1958).
Delva et al. "Effects of short-term administration of valproate on serotonin-1A and dopamine receptor function in healthy human subjects," J Psychiatry Neurosci. 27(6):429-437 (Nov. 2002).
Deodhar et al., "Assessing the Mechanism of Fluoxetine-Mediated CYP2D6 Inhibition," Pharmaceutics. 13(148) (Jan. 2021) (10 pages).
Di Lorenzo et al. "The use of illicit drugs as self-medication in the treatment of cluster headache: Results from an Italian online survey," Cephalalgia. 36(2):194-198 (Feb. 2016).
Di Sciullo et al., "Changes in anterior pituitary hormone levels after serotonin 1A receptor stimulation." Endocrinology. 127(2):567-72 (Aug. 1990).

(56) References Cited

OTHER PUBLICATIONS

Dinis-Oliveira, Ricardo Jorge, "Metabolism of psilocybin and psilocin: clinical and forensic toxicological relevance," Drug Metabolism Reviews. 49(1):84-91 (Jan. 2017) (22 pages).
Donovan et al., "Effects of a single dose of psilocybin on behaviour, brain 5-HT2A receptor occupancy and gene expression in the pig." European Neuropsychopharmacology. 42: 1-11 (Jan. 2021).
Drug Enforcement Administration (DEA), Department of Justice, "Schedules of controlled substances: placement of 5-methoxy-N,N-dimethyltryptamine into Schedule I of the Controlled Substances Act. Final rule," Fed Regist. 75(243):79296-300 (Dec. 2010).
D'Souza et al., "Exploratory study of the dose-related safety, tolerability, and efficacy of dimethyltryptamine (DMT) in healthy volunteers and major depressive disorder," Neuropsychopharmacology. 47:1854-62 (Jun. 2022).
Dunkley et al., "The Hunter Serotonin Toxicity Criteria: simple and accurate diagnostic decision rules for serotonin toxicity." Q J Med. 96(9): 635-42 (Sep. 2003).
Dupuis et al. "Actions of novel agonists, antagonists and antipsychotic agents at recombinant rat 5-HT6 receptors: a comparative study of coupling to G alpha s," Eur J Pharmacol. 588(2-3):170-177 (Jul. 2008).
Duvvuri et al. "5-HT1A receptor activation is necessary for 5-MeODMT-dependent potentiation of feeding inhibition," Pharmacol Biochem Behav. 93(3): 349-353 (Sep. 2009).
Egashira et al., "Involvement of 5-hydroxytryptamine neuronal system in Delta(9)-tetrahydrocannabinol-induced impairment of spatial memory," Eur J Pharmacol. 445(3):221-9 (Jun. 2002) (1 page).
Eide et al. "Subsensitivity of serotonin and substance P receptors involved in nociception after repeated administration of a serotonin receptor agonist," J Neural Transm. 77(1):1-10 (1989).
Eison et al., "5-HT1A and 5-HT2 receptors mediate discrete behaviors in the Mongolian Gerbil," Pharmacology Biochemistry and Behavior. 43(1):131-137 (Sep. 1992).
El Mansari et al., "Responsiveness of 5-HT1A and 5-HT2 receptors in the rat orbitofrontal cortex after long-term serotonin reuptake inhibition," Rev Psychiatr Neurosci. 30(4):268-74 (Jul. 2005).
Ellahi, R., "Serotonin syndrome: A spectrum of toxicity," BJPsych Advances. 21:324-332 (2015).
Emami et al. "Toxicology Evaluation of Drugs Administered via Uncommon Routes: Intranasal, Intraocular, Intrathecal/Intraspinal, and Intra-Articular," Int J Toxicol. 37(1):4-27 (Jan.-Feb. 2018) (49 pages).
Ermakova et al. "A narrative synthesis of research with 5-MeO-DMT," J Psychopharmacol. 36(3):273-294 (Mar. 2022).
Fabing et al. "Intravenous bufotenine injection in the human being," Science. 123(3203):886-887 (May 1956).
Fanciullacci et al. "Hypersensitivity to lysergic acid diethylamide (LSD-25) and psilocybin in essential headache," Experientia. 30(12):1441-1443 (Dec. 1974).
Fantegrossi et al. "Hallucinogen-like actions of 2,5-dimethoxy-4-(n)-propylthiophenethylamine (2C-T-7) in mice and rats," Psychopharmacology (Berl). 181(3):496-503 (Jun. 2005).
Fantegrossi et al. "Transient reinforcing effects of phenylisopropylamine and indolealkylamine hallucinogens in rhesus monkeys," Behav Pharmacol. 15(2):149-157 (Mar. 2004).
Fedgchin et al. "Efficacy and Safety of Fixed-Dose Esketamine Nasal Spray Combined With a New Oral Antidepressant in Treatment-Resistant Depression: Results of a Randomized, Double-Blind, Active-Controlled Study (Transform-1)," Int J Neuropsychopharmacol. 22(10):616-630 (Oct. 2019).
Fiorella et al. "Potentiation of LSD-induced stimulus control by fluoxetine in the rat," Life Sci. 59(18):PL283-287 (1996).
Fitzgerald et al. "Selective serotonin reuptake inhibitor exposure," Top Companion Anim Med. 28(1):13-17 (Feb. 2013).
Fontanilla et al., "The hallucinogen N, N-dimethyltryptamine (DMT) is an endogenous sigma-1 receptor regulator," Science. 323(5916):934-937 (Feb. 2009) (9 pages).
Franzini et al. "Deep brain stimulation of the posteromedial hypothalamus: indications, long-term results, and neurophysiological considerations," Neurosurg Focus. 29(2):E13 (Aug. 2010) (13 pages).
Fuentes et al. "Therapeutic Use of LSD in Psychiatry: A Systematic Review of Randomized-Controlled Clinical Trials," Front Psychiatry. 10:943 (Jan. 2020) (14 pages).
Fuller, R.W. "Serotonergic stimulation of pituitary-adrenocortical function in rats," Neuroendocrinology. 32(2):118-127 (Feb. 1981).
Fuller, R.W. "Tissue distribution, metabolism and effects of bufotenine administered to rats," Neuropharmacology. 34(7):799-804 (Jul. 1995).
Gable, R.S. "Comparison of acute lethal toxicity of commonly abused psychoactive substances," Addiction. 99(6):686-696 (Jun. 2004).
Galvao et al. "Cortisol Modulation by Ayahuasca in Patients With Treatment Resistant Depression and Healthy Controls," Front Psychiatry. 9:185 (May 2018) (10 pages).
Garcia-Romeu et al. "Clinical applications of hallucinogens: A review," Exp Clin Psychopharmacol. 24(4):229-268 (Aug. 2016).
Garcia-Romeu et al. "Current perspectives on psychedelic therapy: use of serotonergic hallucinogens in clinical interventions," Int Rev Psychiatry. 30(4):291-316 (Nov. 2018) (27 pages).
Garcia-Romeu et al., "Psilocybin-occasioned mystical experiences in the treatment of tobacco addiction," Current Drug Abuse Reviews. 7(3):157-64 (2014).
Gasser et al., "Safety and efficacy of lysergic acid diethylamide-assisted psychotherapy for anxiety associated with life-threatening diseases," J Nerv Ment Dis. 202(7):513-20 (Jul. 2014).
Geiger et al. "DARK Classics in Chemical Neuroscience: Psilocybin," ACS Chem Neurosci. 9(10):2438-2447 (Oct. 2018).
Gessner et al. "Pharmacological actions of some methoxyindolealkylamines," Nature. 190(4771):179-180 (Apr. 1961).
Geyer et al. "A characteristic effect of hallucinogens on investigatory responding in rats," Psychopharmacology (Berl). 65(1):35-40 (Sep. 1979).
Geyer et al. "Opposite effects of intraventricular serotonin and bufotenin on rat startle responses," Pharmacol Biochem Behav. 3(4):687-691 (Jul.-Aug. 1975).
Ghuran et al. "The cardiac complications of recreational drug use," West J Med. 173(6):412-415 (Dec. 2000).
Glennon et al. "Hallucinogens as a discriminative stimuli: generalization of DOM to a 5-methoxy-N, N-dimethyltryptamine stimulus," Life Sci. 24(11):993-997 (Mar. 1979).
Glennon et al., "Influence of amine substituents on 5-HT2A versus 5-HT2C binding of phenylalkyl- and indolylalkylamines," J Med Chem. 37(13):1929-35 (1994).
Goethe et al. "Selective serotonin reuptake inhibitor discontinuation: side effects and other factors that influence medication adherence," J Clin Psychopharmacol. 27(5):451-458 (Oct. 2007).
Gonzalez-Maeso et al. "Hallucinogens recruit specific cortical 5-HT(2A) receptor-mediated signaling pathways to affect behavior," Neuron. 53(3):439-452 (Feb. 2007).
Goodwin et al., "Psilocybin for treatment resistant depression in patients taking a concomitant SSRI medication," Neuropsychopharmacology. 48:1492-1499 (Jul. 2023).
Goodwin et al., "Single-dose psilocybin for a treatment-resistant episode of major depression," N Engl J Med. 387(18):1637-48 (Nov. 2022).
Gouzoulis-Mayfrank et al. "Neurometabolic effects of psilocybin, 3,4-methylenedioxyethylamphetamine (MDE) and d-methamphetamine in healthy volunteers. A double-blind, placebo-controlled PET study with [18F]FDG," Neuropsychopharmacology. 20(6):565-581 (Jun. 1999).
Gouzoulis-Mayfrank et al. "Psychopathological, neuroendocrine and autonomic effects of 3,4-methylenedioxyethylamphetamine (MDE), psilocybin and d-methamphetamine in healthy volunteers. Results of an experimental double-blind placebo-controlled study," Psychopharmacology (Berl). 142(1):41-50 (Feb. 1999).
Graeff et al. "The dual role of serotonin in defense and the mode of action of antidepressants on generalized anxiety and panic disorders," Cent Nerv Syst Agents Med Chem. 10(3):207-217 (Sep. 2010).

(56) References Cited

OTHER PUBLICATIONS

Grahame-Smith. "Inhibitory effect of chlorpromazine on the syndrome of hyperactivity produced by L-tryptophan or 5-methoxy-N,N-dimethyltryptamine in rats treated with a monoamine oxidase inhibitor," Br J Pharmacol. 43(4):856-864 (Dec. 1971).
Grandjean et al. "Psilocybin exerts distinct effects on resting state networks associated with serotonin and dopamine in mice," Neuroimage. 225:117456 (Jan. 2021) (8 pages).
Gray et al.,"Antidepressant Treatment Reduces Serotonin-1A Autoreceptor Binding in Major Depressive Disorder," Biol Psychiatry. 74(1):26-31 (2013) (13 pages).
Grieshaber et al., "The detection of psilocin in human urine," J Forensic Sci. 46(3):627-30 (2001).
Griffiths et al. "Psilocybin can occasion mystical-type experiences having substantial and sustained personal meaning and spiritual significance," Psychopharmacology (Berl). 187(3):268-283 (Aug. 2006) (17 pages).
Griffiths et al., "Mystical-type experiences occasioned by psilocybin mediate the attribution of personal meaning and spiritual significance 14 months later," Journal of Psychopharmacology. 22(6):621-32 (2008).
Griffiths et al., "Psilocybin occasioned mystical-type experiences: immediate and persisting dose-related effects," Psychopharmacology (Berl). 218(4):649-665 (Dec. 2011) (27 pages).
Griffiths et al., "Psilocybin-occasioned mystical-type experience in combination with meditation and other spiritual practices produces enduring positive changes in psychological functioning and in trait measures of prosocial attitudes and behaviors," Journal of Psychopharmacology. 32(1):49-69 (Oct. 2017).
Grob et al., "Pilot study of psilocybin treatment for anxiety in patients with advanced-stage cancer," Arch Gen Psychiatry. 68(1):71-78 (Jan. 2011).
Guchhait, R. B., "Biogenesis of 5-methoxy-N, N-dimethyltryptamine in human pineal gland," Journal of Neurochemistry. 26:187-90 (1976).
Gudelsky et al. "Suppression of the hypo- and hyperthermic responses to 5-HT agonists following the repeated administration of monoamine oxidase inhibitors," Psychopharmacology (Berl). 90(3):403-407 (1986).
Guest, "Electroencephalographic and behavioral effects of 4-phosphoryloxy N, N-dimethyltryptamine (psilocybin) on the New Zealand albino rabbit," Thesis. 1977 (50 pages).
Gukasyan et al., "Attenuation of psilocybin mushroom effects during and after SSRI/SNRI antidepressant use," Journal of Psychopharmacology. 37(7):707-716 (Jun. 2023).
Haberzettl et al. "Animal models of the serotonin syndrome: A systematic review," Behav Brain Res. 256:328-345 (Nov. 2013).
Hackl et al. "Psilocybin Therapy of Psychiatric Disorders Is Not Hampered by hERG Potassium Channel-Mediated Cardiotoxicity," Int J Neuropsychopharmacol. 25(4):280-282 (Dec. 2021).
Halberstadt et al. "Differential contributions of serotonin receptors to the behavioral effects of indoleamine hallucinogens in mice," J Psychopharmacol. 25(11):1548-1561 (Nov. 2011).
Halberstadt et al. "Multiple receptors contribute to the behavioral effects of indoleamine hallucinogens," Neuropharmacology. 61(3):364-381 (Sep. 2011) (42 pages).
Halberstadt et al., "Behavioral effects of alpha, alpha, beta,beta-tetradeutero-5-MeO-DMT in rats: comparison with 5-MeO-DMT administered in combination with a monoamine oxidase inhibitor," Psychopharmacology (Berl). 221(4):709-718 (Jun. 2012) (17 pages).
Halberstadt et al., "LSD but not lisuride disrupts prepulse inhibition in rats by activating the 5-HT2A receptor," Psychopharmacology. 208:179-89 (Nov. 2009).
Halberstadt et al., "Modification of the effects of 5-methoxy-N, N-dimethyltryptamine on exploratory behavior in rats by monoamine oxidase inhibitors," Psychopharmacology. 201:55-66 (Jul. 2008).
Halberstadt, Adam L., "Behavioral and pharmacokinetic interactions between monoamine oxidase inhibitors and the hallucinogen 5-methoxy-N, N-dimethyltryptamine," Pharmacol Biochem Behav. 143:1-10 (Apr. 2016) (29 pages).
Halberstadt. "Recent advances in the neuropsychopharmacology of serotonergic hallucinogens," Behav Brain Res. 277:99-120 (Jan. 2015).
Halpern et al. "A Review of Hallucinogen Persisting Perception Disorder (HPPD) and an Exploratory Study of Subjects Claiming Symptoms of HPPD," Curr Top Behav Neurosci. 36:333-360 (2018) (28 pages).
Hanks et al. "Animal models of serotonergic psychedelics," ACS Chem Neurosci. 4(1):33-42 (Jan. 2013).
Hartogsohn. "Set and setting, psychedelics and the placebo response: An extra-pharmacological perspective on psychopharmacology," J Psychopharmacol. 30(12):1259-1267 (Dec. 2016).
Hasler et al. "Acute psychological and physiological effects of psilocybin in healthy humans: a double-blind, placebo-controlled dose-effect study," Psychopharmacology (Berl). 172(2):145-156 (Mar. 2004).
Hasler et al. "Determination of psilocin and 4-hydroxyindole-3-acetic acid in plasma by HPLC-ECD and pharmacokinetic profiles of oral and intravenous psilocybin in man," Pharma Acta Helv. 72(3):175-184 (Jun. 1997).
Hasler et al. "Renal excretion profiles of psilocin following oral administration of psilocybin: a controlled study in man," J Pharm Biomed Anal. 30(2):331-339 (Sep. 2002).
Heal et al. "Evaluating the abuse potential of psychedelic drugs as part of the safety pharmacology assessment for medical use in humans," Neuropharmacology. 142:89-115 (Nov. 2018).
Heinze et al. "The comparative behavioral effects of N,N-dimethyltryptamine and N,N-diethyltryptamine in primate dyads," Biol Psychiatry. 18(7):829-836 (Jul. 1983).
Helsley et al. "A comparison of N,N-dimethyltryptamine, harmaline, and selected congeners in rats trained with LSD as a discriminative stimulus," Prog Neuropsychopharmacol Biol Psychiatry. 22(4):649-663 (May 1998).
Hendricks et al., "Classic psychedelic use is associated with reduced psychological distress and suicidality in the United States adult population," Journal of Psychopharmacology. 29(3):280-8 (Jan. 2015).
Hesselink, "Transformative Psychopharmacology: the Case of 5-Methoxy-N,N-Dimethyltryptamine," International Journal of Psychotherapy Practice and Research. 1(3):9-15 (Jan. 2019).
Hibicke et al., "Psychedelics, but Not Ketamine, Produce Persistent Antidepressant-like Effects in a Rodent Experimental System for the Study of Depression," ACS Chem Neurosci. 11(6):864-871 (Mar. 2020).
Hicks et al., "Clinical Pharmacogenetics Implementation Consortium (CPIC) Guideline for CYP2D6 and CYP2C19 Genotypes and Dosing of Selective Serotonin Reuptake Inhibitors," Clincal Pharmacology & Therapeutics. 98(2):127-134 (Aug. 2015).
Hintzen et al., "The pharmacology of LSD: a critical review," ISBN 13: 9780199589821 (2009) (225 pages).
Hirschfeld et al. "Dose-response relationships of psilocybin-induced subjective experiences in humans," J Psychopharmacol. 35(4):384-397 (Apr. 2021) (14 pages).
Hitt et al. "Toad toxicity," N Engl J Med. 314(23):1517-1518 (Jun. 1986) (3 pages).
Hollister et al. "Comparison of three psychotropic drugs (psilocybin, JB-329, and IT-290) in volunteer subjects," J Nerv Ment Dis. 131:428-434 (Nov. 1960).
Hollister. "Clinical, biochemical and psychologic effects of psilocybin," Arch Int Pharmacodyn Ther. 130:42-52 (Feb. 1961).
Holmstedt et al. "Chemical constituents and pharmacology of South American snuffs," Psychopharmacol Bull. 4(3):16 (Dec. 1967).
Hopf et al. "Autoradiographic studies on the distribution of psychoactive drugs in the rat brain. 3. 14C-psilocin," Psychopharmacologia. 16(3):201-222 (1969).
Hopf et al. "Distribution patterns of 14-C-psilocin in the brains of various animals," Act Nerv Super (Praha). 16(1):64-66 (Mar. 1974).
Horita et al. "Dephosphorylation of psilocybin in the intact mouse," Toxicol Appl Pharmacol. 4:730-737 (Nov. 1962).
Horita et al. "The enzymic dephosphorylation and oxidation of psilocybin and psilocin by mammalian tissue homogenates," Biochem Pharmacol. 7:47-54 (Jul. 1961).

(56) References Cited

OTHER PUBLICATIONS

Hoshino et al., "Über Die Synthese Des Bufotenin-Methyl-äthers (5-Methoxy-N-Dimethyl-Tryptamin) Und Bufotenins (Synthesen in Der Indol-Gruppe. XV)," Bulletin of the Chemical Society of Japan. 11(3):221-224 (Mar. 1936) (8 pages).
Illum et al. "The effect of blood sampling site and physicochemical characteristics of drugs on bioavailability after nasal administration in the sheep model," Pharm Res. 20(9):1474-1484 (Sep. 2003).
Inserra et al. "Psychedelics in Psychiatry: Neuroplastic, Immunomodulatory, and Neurotransmitter Mechanisms," Pharmacol Rev. 73(1):202-277 (Jan. 2021).
Irwin, "Comprehensive observational assessment: la. A systematic, quantitative procedure for assessing the behavioral and physiologic state of the mouse," Psychopharmacologia. 13(3):222-57 (Sep. 1968).
Isaac et al., "The God Molecule: 5-MeO-DMT and the Spiritual Path to Divine Light," Divine Arts. Back cover, pp. 99-100, 120 (Nov. 2016) (3 pages).
Isbell et al. "Studies on lysergic acid diethylamide (LSD-25). I. Effects in former morphine addicts and development of tolerance during chronic intoxication," AMA Arch Neurol Psychiatry. 76(5):468-478 (Nov. 1956).
Isbister et al. "The pathophysiology of serotonin toxicity in animals and humans: implications for diagnosis and treatment," Clin Neuropharmacol. 28(5):205-214 (Sep.-Oct. 2005).
Jaffe et al. "The humanistic and economic burden of treatment-resistant depression in Europe: a cross-sectional study," BMC Psychiatry. 19(1):247 (Aug. 2019) (11 pages).
Jann, "Psilocybin Revisited: The Science Behind the Drug and Its Surprising Therapeutic Potential," Psychiatric Times. 38(3). Available <https://www.psychiatrictimes.com/view/psilocybin-revisited-science-behind-drug-surprising-therapeutic-potential> Accessed Apr. 17, 2025 (Mar. 2021) (17 pages).
Jiang et al. "Development of a mechanism-based pharmacokinetic/pharmacodynamic model to characterize the thermoregulatory effects of serotonergic drugs in mice," Acta Pharm Sin B. 6(5):492-503 (Sep. 2016).
Jiang et al. "Pharmacokinetic interactions between monoamine oxidase A inhibitor harmaline and 5-methoxy-N,N-dimethyltryptamine, and the impact of CYP2D6 status," Drug Metab Dispos. 41(5):975-986 (May 2013).
Jiang et al. "Potentiation of 5-methoxy-N,N-dimethyltryptamine-induced hyperthermia by harmaline and the involvement of activation of 5-HT1A and 5-HT2A receptors," Neuropharmacology. 89:342-351 (Feb. 2015) (24 pages).
Jiang et al., "Modification of 5-methoxy-N,N-dimethyltryptamine-induced hyperactivity by monoamine oxidase A inhibitor harmaline in mice and the underlying serotonergic mechanisms," Pharmacol Rep. 68(3):608-15 (Jun. 2016).
Jo et al. "Toxicological profiles of poisonous, edible, and medicinal mushrooms," Mycobiology. 42(3):215-220 (Sep. 2014) (7 pages).
Johansen et al. "Psychedelics not linked to mental health problems or suicidal behavior: a population study," J Psychopharmacol. 29(3):270-279 (Mar. 2015) (10 pages).
Johnson et al. "Psilocybin dose-dependently causes delayed, transient headaches in healthy volunteers," Drug Alcohol Depend. 123(1-3):132-140 (Jun. 2012) (20 pages).
Johnson et al. "Psychometric Properties of the General Anxiety Disorder 7-Item (GAD-7) Scale in a Heterogeneous Psychiatric Sample," Front Psychol. 10:1713 (Aug. 2019) (8 pages).
Johnson et al. "The abuse potential of medical psilocybin according to the 8 factors of the Controlled Substances Act," Neuropharmacology. 142:143-166 (Nov. 2018).
Johnson et al., "Pilot study of the 5-HT2AR agonist psilocybin in the treatment of tobacco addiction," J Psychopharmacol. 28(11):983-92 (Nov. 2014).
Johnson et al., "Classic psychedelics: An integrative review of epidemiology, therapeutics, mystical experience, and brain network function," Pharmacol Ther. 197:83-102 (May 2019).
Johnson et al., "Human hallucinogen research: guidelines for safety," J Psychopharmacol. 22(6):603-20 (Jul. 2008).
Johnson et al., "Long-term follow-up of psilocybin-facilitated smoking cessation," Am J Drug Alcohol Abuse. 43(1):55-60 (Jul. 2016) (7 pages).
Johnson, Matthew W., "Psychiatry might need some psychedelic therapy," Int Rev Psychiatry. 30(4):285-290 (Dec. 2018) (7 pages).
Johnstad, "Powerful substances in tiny amounts: An interview study of psychedelic microdosing." Nordic Studies on Alcohol and Drugs. 35(1):39-51 (Feb. 2018).
Johnston et al., "The burden of treatment-resistant depression: A systematic review of the economic and quality of life literature," J Affect Disord. 242:195-210 (Jan. 2019).
Jones et al. "The ever-changing roles of serotonin." The International Journal of Biochemistry & Cell Biology. 125:105776 (May 2020) (5 pages).
Jørgensen, "Studies on the neuroendocrine role of serotonin," Dan Med Bull. 54(4):266-88 (Nov. 2007).
Kalberer et al., "The fate of psilocin in the rat," Biochem Pharmacol. 11:261-9 (Apr.-May 1962).
Kalfas et al., "Psychedelics for treatment resistant depression: are they game changers?," Expert Opin Pharmacother. 24(18):2117-2132 (Nov. 2023) (17 pages).
Kargbo, "Improved 5-HT2 Selective Receptor Modulators for the Treatment of Psychological Disorders," ACS Med Chem Lett. 12(12):1876-1878 (Nov. 2021).
Kast et al., "Study of Lysergic Acid Diethylamide as an Analgesic Agent," Anesth Analg. 43(3):285-91 (May-Jun. 1964).
Kast, "Attenuation of anticipation: a therapeutic use of lysergic acid diethylamide," Psychiatr Q. 41(4):646-57 (Oct. 1967).
Kaufman et al. "The 5-HT1A receptor in Major Depressive Disorder," Eur Neuropsychopharmacol. 26(3):397-410 (Mar. 2016) (30 pages).
Kaumann et al., "5-hydroxytryptamine receptors in the human cardiovascular system," Pharmacol Ther. 111(3):674-706 (Sep. 2006).
Keenan et al., "Standard morphologic evaluation of the heart in the laboratory dog and monkey," Toxicol Pathol. 34(1):67-74 (2006).
Kennedy, "Core symptoms of major depressive disorder: relevance to diagnosis and treatment," Dialogues Clin Neurosci. 10(3):271-7 (2008).
Kennett et al. "Single administration of 5-HT1A agonists decreases 5-HT1A presynaptic, but not postsynaptic receptor-mediated responses: relationship to antidepressant-like action," Eur J Pharmacol. 138(1):53-60 (Jun. 1987).
Klaassen et al., "Neuroendocrine response to meta-chlorophenylpiperazine and ipsapirone in relation to anxiety and aggression," Psychiatry Res. 113(1-2):29-40 (Dec. 2002).
Knoth et al., "Effect of inadequate response to treatment in patients with depression," Am J Manag Care. 16(8):e188-96 (Aug. 2010).
Knudsen, "Sustained effects of single doses of classical psychedelics in humans," Neuropsychopharmacology. 48(1):145-150 (Jun. 2022) (6 pages).
Ko et al., "Lethal ingestion of Chinese herbal tea containing ch'an su," West J Med. 164(1):71-5 (Jan. 1996).
Kolaczynska et al., "Development and validation of an LC-MS/MS method for the bioanalysis of psilocybin's main metabolites, psilocin and 4-hydroxyindole-3-acetic acid, in human plasma," J Chromatogr B Analyt Technol Biomed Life Sci. 1164:122486 (Feb. 2021) (10 pages).
Kometer et al., "Activation of serotonin 2A receptors underlies the psilocybin-induced effects on alpha oscillations, N170 visual-evoked potentials, and visual hallucinations," J Neurosci. 33(25):10544-51 (Jun. 2013).
Kometer et al., "Psilocybin-induced spiritual experiences and insightfulness are associated with synchronization of neuronal oscillations," Psychopharmacology (Berl). 232(19):3663-76 (Aug. 2015) (14 pages).
Kostakis et al., "Sudden death associated with intravenous injection of toad extract," Forensic Sci Int. 188(1-3):e1-5 (Jul. 2009).
Kraehenmann et al., "Dreamlike effects of LSD on waking imagery in humans depend on serotonin 2A receptor activation," Psychopharmacology (Berl). 234(13):2031-2046 (Apr. 2017 (16 pages).

(56) References Cited

OTHER PUBLICATIONS

Kraehenmann et al., "Psilocybin-Induced Decrease in Amygdala Reactivity Correlates with Enhanced Positive Mood in Healthy Volunteers," Biol Psychiatry. 78(8):572-81 (Oct. 2015).
Krebs et al., "Lysergic acid diethylamide (LSD) for alcoholism: meta-analysis of randomized controlled trials," J Psychopharmacol. 26(7):994-1002 (Jul. 2012) (10 pages).
Krebs et al., "Over 30 million psychedelic users in the United States," F1000Res. 2:98 (Mar. 2013).
Krebs et al., "Psychedelics and mental health: a population study," PLoS One. 8(8):e63972 (Aug. 2013) (9 pages).
Krebs-Thomson et al., "The roles of 5-HT1A and 5-HT2 receptors in the effects of 5-MeO-DMT on locomotor activity and prepulse inhibition in rats," Psychopharmacology (Berl). 189(3):319-29 (Dec. 2006).
Kruszewski et al., "Cluster headache and SUNCT: similarities and differences," J Headache Pain. 2(2):57-66 (Nov. 2001).
Kurland et al., "Psychedelic drug assisted psychotherapy in patients with terminal cancer," Journal of Thanatology. 2(1-2):644-691 (1972) (48 pages).
Kurland, "LSD in the supportive care of the terminally ill cancer patient," J Psychoactive Drugs. 17(4):279-90 (Oct.-Dec. 1985).
Kuypers et al., "Ayahuasca enhances creative divergent thinking while decreasing conventional convergent thinking, " Psychopharmacology (Berl). 233(18):3395-403 (Jul. 2016) (9 pages).
Kyzar et al., "Psychedelic Drugs in Biomedicine," Trends Pharmacol Sci. 38(11):992-1005 (Nov. 2017).
Lalley, "Inhibition of phrenic and sympathetic vasomotor neurons in cats by the serotonin analog 5-methoxy-N,N-dimethyltryptamine," J Pharmacol Exp Ther. 220(1):39-48 (Jan. 1982).
Lambru et al., "SUNCT and SUNA: medical and surgical treatments," Neurol Sci. 34 Suppl 1:S75-81 (May 2013).
Lancelotta et al., "Use of Benefit Enhancement Strategies among 5-Methoxy-N,N-Dimethyltryptamine (5-MeO-DMT) Users: Associations with Mystical, Challenging, and Enduring Effects," J Psychoactive Drugs. 52(3):273-281 (Mar. 2020) (10 pages).
Lanzenberger et al., "Reduced serotonin-1A receptor binding in social anxiety disorder," Biol Psychiatry. 61(9):1081-9 (May 2007).
Larson, "Acute and chronic effects of LSD and 5-MeODMT on raphe-evoked dorsal root potentials in the cat," Life Sci. 34(12):1193-201 (Mar. 1984).
Law et al., "14C-Psilocin tissue distribution in pregnant rats after intravenous administration," Functional Foods in Health and Disease. 4(6):232-244 (Jun. 2014).
Lebedev et al., "LSD-induced entropic brain activity predicts subsequent personality change," Hum Brain Mapp. 37(9):3203-13 (May 2016).
Lee et al., "Examining cognitive function across the lifespan using a mobile application," Computers in Human Behavior. 28(5):1934-1946 (2012) (14 pages).
Leonard et al., "Does getting high hurt? Characterization of cases of LSD and psilocybin-containing mushroom exposures to national poison centers between 2000 and 2016," J Psychopharmacol. 32(12):1286-1294 (Dec. 2018).
Leone et al., "Deep brain stimulation to relieve drug-resistant SUNCT," Ann Neurol. 57(6):924-7 (Jun. 2005).
Lerer et al., "Variability of 5-HT2C receptor cys23ser polymorphism among European populations and vulnerability to affective disorder," Mol Psychiatry. 6(5):579-85. (Sep. 2001).
Li et al., "Association between antidepressant resistance in unipolar depression and subsequent bipolar disorder: cohort study," Br J Psychiatry. 200(1):45-51 (Jan. 2012).
Lim et al., "A fatal case of 'magic mushroom' ingestion in a heart transplant recipient," Intern Med J. 42(11):1268-9 (Nov. 2012).
Lima da Cruz et al. "A Single Dose of 5-MeO-DMT Stimulates Cell Proliferation, Neuronal Survivability, Morphological and Functional Changes in Adult Mice Ventral Dentate Gyrus," Front Mol Neurosci. 11(312) (Sep. 2018) (11 pages).
Lindenblatt et al., "Quantitation of psilocin in human plasma by high-performance liquid chromatography and electrochemical detection: comparison of liquid-liquid extraction with automated on-line solid-phase extraction," J Chromatogr B Biomed Sci Appl. 709(2):255-63 (May 1998).
Liu et al., "Decrease in the descending inhibitory 5-HT system in rats with spinal nerve ligation," Brain Res. 1330:45-60 (Mar. 2010).
Liu et al., "Roles of 5-hydroxytryptamine (5-HT) receptor subtypes in the inhibitory effects of 5-HT on C-fiber responses of spinal wide dynamic range neurons in rats," J Pharmacol Exp Ther. 321(3):1046-53 (Jun. 2007).
Löscher et al., "Pharmacodynamic effects of serotonin (5-HT) receptor ligands in pigs: stimulation of 5-HT2 receptors induces malignant hyperthermia," Naunyn Schmiedebergs Arch Pharmacol. 341(6):483-93 (Jun. 1990).
Lowe et al., "The Therapeutic Potential of Psilocybin," Molecules. 26(10):2948 (May 2021) (33 pages).
Loyd et al., "Serotonergic neuromodulation of peripheral nociceptors," Semin Cell Dev Biol. 24(1):51-7 (Jan. 2013) (15 pages).
Lucki et al., "Differential actions of serotonin antagonists on two behavioral models of serotonin receptor activation in the rat," J Pharmacol Exp Ther. 228(1):133-9 (Jan. 1984).
Luethi et al. "Monoamine receptor interaction profiles of 4-aryl-substituted 2,5-dimethoxyphenethylamines (2C-BI derivatives)," Eur J Pharmacol. 855:103-111 (Jul. 2019) (36 pages).
Luethi et al., "Cytochrome P450 enzymes contribute to the metabolism of LSD to nor-LSD and 2-oxo-3-hydroxy-LSD: Implications for clinical LSD use," Biochem Pharmacol. 164:129-138 (Apr. 2019).
Ly et al., "Psychedelics Promote Structural and Functional Neural Plasticity," Cell Rep. 23(11):3170-3182 (Jun. 2018) (25 pages).
Lyness et al. "The relationship of medical comorbidity and depression in older, primary care patients," Psychosomatics. 47(5):435-439 (Sep.-Oct. 2006).
Lyons et al., "Increased nature relatedness and decreased authoritarian political views after psilocybin for treatment-resistant depression," J Psychopharmacol. 32(7):811-819 (Jul. 2018) (9 pages).
Lyttle et al. "Bufo toads and bufotenine: fact and fiction surrounding an alleged psychedelic," J Psychoactive Drugs. 28(3):267-290 (Jul.-Sep. 1996).
Machado-Vieira et al. "The Timing of Antidepressant Effects: A Comparison of Diverse Pharmacological and Somatic Treatments," Pharmaceuticals (Basel). 3(1):19-41 (Jan. 2010).
MacLean et al., "Mystical experiences occasioned by the hallucinogen psilocybin lead to increases in the personality domain of openness," J Psychopharmacol. 25(11):1453-61 (Nov. 2011) (16 pages).
Madsen et al. "A single psilocybin dose is associated with long-term increased mindfulness, preceded by a proportional change in neocortical 5-HT2A receptor binding," Eur Neuropsychopharmacol. 33:71-80 (Apr. 2020).
Madsen et al. "Psilocybin-induced changes in brain network integrity and segregation correlate with plasma psilocin level and psychedelic experience," Eur Neuropsychopharmacol. 50:121-132 (Sep. 2021) (12 pages).
Madsen et al. "Psychedelic effects of psilocybin correlate with serotonin 2A receptor occupancy and plasma psilocin levels," Neuropsychopharmacology. 44(7):1328-1334 (Jun. 2019).
Malcolm et al., "Serotonin toxicity of serotonergic psychedelics," Psychopharmacology (Berl). 239(6):1881-1891 (Jul. 2021) (11 pages).
Malitz et al. "Some observations on psilocybin, a new hallucinogen, in volunteer subjects," Compr Psychiatry. 1:8-17 (Feb. 1960).
Manevski et al. "Glucuronidation of psilocin and 4-hydroxyindole by the human UDP-glucuronosyltransferases," Drug Metab Dispos. 38(3):386-395 (Mar. 2010).
Markel et al. "LSD flashback syndrome exacerbated by selective serotonin reuptake inhibitor antidepressants in adolescents," J Pediatr. 125(5):817-819 (Nov. 1994).
Martinotti et al. "Hallucinogen Persisting Perception Disorder: Etiology, Clinical Features, and Therapeutic Perspectives," Brain Sci. 8(3):47 (Mar. 2018) (18 pages).
Mason et al. "Alcohol Use Disorder: The Role of Medication in Recovery," Alcohol Res. 41(1):07 (Jun. 2021) (17 pages).
Matharu et al., "SUNCT syndrome responsive to intravenous lidocaine," Cephalalgia. 24(11):985-92 (Nov. 2004).

(56) References Cited

OTHER PUBLICATIONS

Matsumoto et al., "Suppressive effect of mitragynine on the 5-methoxy-N,N-dimethyltryptamine-induced head-twitch response in mice," Pharmacol Biochem Behav. 57(1-2):319-23 (May-Jun. 1997).
Matsushima et al., "Historical overview of psychoactive mushrooms," Inflammation and Regeneration. 29(1):47-58 (2009).
May et al., "Functional magnetic resonance imaging in spontaneous attacks of SUNCT: short-lasting neuralgiform headache with conjunctival injection and tearing," Ann Neurol. 46(5):791-4 (Nov. 1999).
May et al., "Hypothalamic activation in cluster headache attacks," Lancet. 352(9124):275-8 (Jul. 1998).
McAllister-Williams et al., "Multiple-therapy-resistant major depressive disorder: a clinically important concept," Br J Psychiatry. 212(5):274-278 (May 2018).
McBride, "Bufotenine: toward an understanding of possible psychoactive mechanisms," J Psychoactive Drugs. 32(3):321-31 (2000) (12 pages).
McCabe et al., "The relationship between working memory capacity and executive functioning: evidence for a common executive attention construct," Neuropsychology. 24(2):222-243 (Mar. 2010) (38 pages).
McCrone et al., "The economic cost of treatment-resistant depression in patients referred to a specialist service," J Ment Health. 27(6):567-573 (Dec. 2017).
McIntyre, "Serotonin 5-HT2B receptor agonism and valvular heart disease: implications for the development of psilocybin and related agents," Expert Opin Drug Saf. 22(10):881-883 (Jul.-Dec. 2023).
McLeod et al., "Bufotenine reconsidered." Acta psychiatrica Scandinavica. 72(5): 447-50 (Nov. 1985).
Meccia et al., "Treatment of major depressive disorder and treatment resistant depression with 5-MeO-DMT: impact of 25 years of non-traditional public scientific communication and education on clinical development and commercialization," Published online Nov. 12, 2024 (15 pages).
Meltzer et al., "Effects of pirenperone and ketanserin on rat prolactin secretion in vivo and in vitro." European journal of pharmacology. 92(1-2): 83-9 (Aug. 1983).
Meltzer et al., "Stimulation of rat prolactin secretion by indolealkylamine hallucinogens." Psychopharmacology. 56(3): 255-9 (Apr. 1978).
Mertens et al., "Therapeutic mechanisms of psilocybin: Changes in amygdala and prefrontal functional connectivity during emotional processing after psilocybin for treatment-resistant depression." Journal of psychopharmacology (Oxford, England). 34(2): 167-180 (Feb. 2020) (14 pages).
Messa et al., "5-HT(2A) receptor binding is reduced in drug-naive and unchanged in SSRI-responder depressed patients compared to healthy controls: a PET study," Psychopharmacology (Berl). 167(1):72-8 (Mar. 2003) (8 pages).
Metzner, Ralph, "The Toad and the Jaguar: A Field Report of Underground Research on a Visionary Medicine: Bufo Alvarius and 5-Methoxy-Dimethyltryptamine." Regent Press for Green Earth Foundation (2013) (84 pages).
Meyer et al., "The effect of paroxetine on 5-HT(2A) receptors in depression: an [(18)F]setoperone PET imaging study," Am J Psychiatry. 158(1):78-85 (Jan. 2001).
Migliaccio et al., "Comparison of solution conformational preferences for the hallucinogens bufotenin and psilocin using 360-MHz proton NMR spectroscopy," J Med Chem. 24(2):206-9 (Feb. 1981).
Mitsuma et al., "Effects of serotonergic system on hypothalamic-pituitary-thyroid axis in rats," Horm Metab Res. 15(7):346-349 (Jul. 1983).
Moldavan et al. "The effect of Psilocybe cubensis extract on hippocampal neurons in vitro," Fiziol Zh (1994). 47(6):15-23 (2001).
Mor et al., "Melatonin receptor ligands: synthesis of new melatonin derivatives and comprehensive comparative molecular field analysis (CoMFA) study," J Med Chem. 41:3831-3844 (Sep. 1998).
Moreno et al. "Safety, tolerability, and efficacy of psilocybin in 9 patients with obsessive- compulsive disorder," J Clin Psychiatry. 67(11):1735-1740 (Nov. 2006).
Morley et al. "New approved and emerging pharmacological approaches to alcohol use disorder: a review of clinical studies," Expert Opin Pharmacother. 22(10):1291-1303 (Jul. 2021) (14 pages).
Moser et al. "The effect of benzodiazepines on the 5-HT agonist-induced head-twitch response in mice," Eur J Pharmacol. 151(2):223-231 (Jul. 1988).
Moser, P.C. "The effect of putative 5-HT1A receptor antagonists on 8-OH-DPAT-induced hypothermia in rats and mice," Eur J Pharmacol. 193(2):165-172 (Feb. 1991).
Murphy-Beiner et al. "Ayahuasca's 'afterglow': improved mindfulness and cognitive flexibility in ayahuasca drinkers," Psychopharmacology (Berl). 237(4):1161-1169 (Jan. 2020).
Muthukumaraswamy et al. "Broadband cortical desynchronization underlies the human psychedelic state," J Neurosci. 33(38):15171-15183 (Sep. 2013).
Muttoni et al. "Classical psychedelics for the treatment of depression and anxiety: A systematic review," J Affect Disord. 258:11-24 (Nov. 2019).
Nagai et al., "The effects of non-medically used psychoactive drugs on monoamine neurotransmission in rat brain," Eur J Pharmacol. 559(2-3):132-7 (Dec. 2006).
Narasimhachari et al., "Urinary studies of schizophrenics and controls," Biol Psychiatry. 3(1):9-20 (1971) (13 pages).
Nau Jr. et al. "Serotonin 5-HT$_2$ receptor activation prevents allergic asthma in a mouse model," Am J Physiol Lung Cell Mol Physiol. 308(2):L191-198 (Jan. 2015).
Nau Jr. et al. "Serotonin 5-HT2A receptor activation blocks TNF-alpha mediated inflammation in vivo," PLoS One. 8(10):e75426 (Oct. 2013) (8 pages).
Neumeister et al. "Reduced serotonin type 1A receptor binding in panic disorder," J Neurosci. 24(3):589-591 (Jan. 2004).
Nguyen et al., "Epidemiology and Economic Burden of Serotonin Syndrome With Concomitant Use of Serotonergic Agents: A Retrospective Study Utilizing Two Large US Claims Databases," Prim Care Companion CNS Disord. 19(6):17m02200 (Dec. 2017) (9 pages).
Nichols et al. "Molecular genetic responses to lysergic acid diethylamide include transcriptional activation of MAP kinase phosphatase-1, C/EBP-beta and ILAD-1, a novel gene with homology to arrestins," J Neurochem. 90(3):576-584 (Aug. 2004).
Nichols et al. "Psychedelics as Medicines: An Emerging New Paradigm," Clin Pharmacol Ther. 101(2):209-219 (Feb. 2017).
Nichols, "Hallucinogens," Pharmacol Ther. 101(2):131-81 (Feb. 2004).
Nichols, "Psychedelics," Pharmacol Rev. 68(2):264-355 (Apr. 2016).
Nonaka et al., "In vitro screening of psychoactive drugs by [(35)S]GTPgammaS binding in rat brain membranes," Biol Pharm Bull. 30(12):2328-33 (Dec. 2007).
Nutt et al. "Drug harms in the UK: a multicriteria decision analysis," Lancet. 376(9752):1558-1565 (Nov. 2010) (9 pages).
Nutt et al. "Psychedelic Psychiatry's Brave New World," Cell. 181(1):24-28 (Apr. 2020).
Nutt et al., "The Current Status of Psychedelics in Psychiatry," JAMA Psychiatry. 78(2):121-122 (Jul. 2020) (2 pages).
Obreshkova, Danka et al., "Pharmaco-toxicological aspects and analysis of phenylalkylamine and indolylallkylamine hallucinogens (Review)." Pharmacia. 64(1): 32-47 (Mar. 2017) (17 pages).
Orsolini et al. "The 'Endless Trip' among the NPS Users: Psychopathology and Psychopharmacology in the Hallucinogen-Persisting Perception Disorder. A Systematic Review." Front Psychiatry. 8(240) (Nov. 2017) (10 pages).
Ortiz Bernal et al., "Reactivations after 5-methoxy-N,N-dimethyltryptamine use in naturalistic settings: An initial exploratory analysis of the phenomenon's predictors and its emotional valence," Front Psychiatry. 13:1049643 (Nov. 2022) (13 pages).
Osório et al., "Antidepressant effects of a single dose of ayahuasca in patients with recurrent depression: a preliminary report." Rev Bras Psiquiatr. 37(1):13-20 (Jan.-Mar. 2015).

(56) References Cited

OTHER PUBLICATIONS

Pahnke et al., "Implications of LSD and experimental mysticism," Journal of Psychedelic Drugs Drugs. 3(1):92-108 (Sep. 1970) (18 pages).
Palamar et al., "Self-reported use of novel psychoactive substances in a US nationally representative survey: Prevalence, correlates, and a call for new survey methods to prevent underreporting." Drug Alcohol Depend. 156:112-119 (Nov. 2015) (21 pages).
Palamar et al., "Use of new and uncommon synthetic psychoactive drugs among a nationally representative sample in the United States, 2005-2017." Human psychopharmacology. 34(2):e2690 (Mar. 2019)(22 pages).
Palhano-Fontes et al., "Rapid antidepressant effects of the psychedelic ayahuasca in treatment-resistant depression: a randomized placebo-controlled trial," Psycho Med. 49(4):655-663 (Mar. 2019) (9 pages).
Pandey et al., "Regional distribution and relative abundance of serotonin(2c) receptors in human brain: effect of suicide." Neurochemical research. 31(2):167-76 (Feb. 2006).
Papoian et al., "Regulatory Forum Review: Utility of in vitro secondary pharmacology data to assess risk of drug-induced valvular heart disease in humans: regulatory considerations." Toxicol. Pathol 45(3):381-388 (Apr. 2017).
Pardo et al., "Localization of a human system for sustained attention by positron emission tomography," Nature. 349(6304):61-4 (Jan. 1991) (5 pages).
Passie et al., "The pharmacology of psilocybin." Addiction biology 7(4):357-364 (Oct. 2002) (9 pages).
Patocka et al., "Chemistry and toxicology of major bioactive substances in Inocybe mushrooms." Int J Mol Sci 22:2218 (Feb. 2021) (13 pages).
Pei et al., "Uncoupling the dopamine D1-D2 receptor complex exerts antidepressant-like effects." Nature medicine 16(12):1393-1395 (Dec. 2010) (4 pages).
Peill et al., "Validation of the Psychological Insight Scale: A new scale to assess psychological insight following a psychedelic experience," J Psychopharmacol. 36(1):31-45 (Jan. 2022) (15 pages).
Penn et al., "The drugs don't work? antidepressants and the current and future pharmacological management of depression," Ther Adv Psychopharmacol. 2(5):179-88 (Oct. 2012).
Pokorny et al., "Effect of Psilocybin on Empathy and Moral Decision-Making," Int J Neuropsychopharmacol. 20(9):747-757 (Sep. 2017) (38 pages).
Pokorny et al., "Modulatory effect of the 5-HT1A agonist buspirone and the mixed non-hallucinogenic 5-HT1A/2A agonist ergotamine on psilocybin-induced psychedelic experience," Eur Neuropsychopharmacol. 26(4):756-66 (Apr. 2016) (30 pages).
Pompeiano et al., "Distribution and cellular localization of mRNA coding for 5-HT1A receptor in the rat brain: correlation with receptor binding," J Neurosci. 12(2):440-53 (Feb. 1992) (14 pages).
Prakash et al., "Fatal serotonin syndrome: a systematic review of 56 cases in the literature," Clin Toxicol (Phila). 59(2):89-100 (Feb. 2021) (13 pages).
Probst-Schendzielorz et al., "Effect of Cytochrome P450 polymorphism on the action and metabolism of selective serotonin reuptake inhibitors," Expert Opin Drug Metab Toxicol. 11(8):1219-32 (Jun. 2015) (14 pages).
Prochazkova et al., "Exploring the effect of microdosing psychedelics on creativity in an open-label natural setting," Psychopharmacology (Berl). 235(12):3401-3413 (Dec. 2018) (13 pages).
Raff et al., "Renal failure after eating "magic" mushrooms," CMAJ. 147(9):1339-41 (Nov. 1992) (3 pages).
Raison et al., "Single-Dose Psilocybin Treatment for Major Depressive Disorder: A Randomized Clinical Trial," JAMA. 330(9):843-853 (Aug. 2023).
Ramage et al., "5-hydroxytryptamine and cardiovascular regulation," Trends Pharmacol Sci. 29(9):472-81 (Sep. 2008).
Rambousek et al., "The effect of psilocin on memory acquisition, retrieval, and consolidation in the rat," Front Behav Neurosci. 8(180) (May 2014) (7 pages).
Raval et al., "A Single Dose of Psilocybin Increases Synaptic Density and Decreases 5-HT2A Receptor Density in the Pig Brain," Int J Mol Sci. 22(835) (Jan. 2021) (14 pages).
Ray, "Psychedelics and the human receptorome," PLoS One. 5(2):e9019 (Feb. 2010) (17 pages).
Reckweg et al., "The clinical pharmacology and potential therapeutic applications of 5-methoxy- N,N-dimethyltryptamine (5-MeO-DMT)," Journal of Neurochemistry. 162(1):128-46 (Feb. 2022).
Richards et al., "LSD-assisted psychotherapy and the human encounter with death," Journal of Transpersonal Psychology, 4(2):121-150 (1972).
Richards et al., "The peak experience variable in DPT-assisted psychotherapy with cancer patients," Journal of Psychedelic Drugs, 9(1):1-10 (Jan.-Mar. 1977) (11 pages).
Richards, "Psychedelic drug-assisted psychotherapy with persons suffering from terminal cancer," J Altered States of Consciousness. 5(4):309-319 (1980).
Rickli et al., "Receptor interaction profiles of novel psychoactive tryptamines compared with classic hallucinogens," Eur Neuropsychopharmacol. 26(8):1327-37 (Aug. 2016) (33 pages).
Riga et al., "The natural hallucinogen 5-MeO-DMT, component of Ayahuasca, disrupts cortical function in rats: reversal by antipsychotic drugs," Int J Neuropsychopharmacol. 17(8):1269-82 (Aug. 2014) (14 pages).
Riga et al., "The serotonergic hallucinogen 5-methoxy-N,N-dimethyltryptamine disrupts cortical activity in a regionally-selective manner via 5-HT(1A) and 5-HT(2A) receptors," Neuropharmacology. 101:370-8 (Feb. 2016) (26 pages).
Riga et al., "The serotonin hallucinogen 5-MeO-DMT alters corticothalamic activity in freely moving mice: Regionally-selective involvement of 5-HT1A and 5-HT2A receptors," Neuropharmacology. 142:219-230 (Dec. 2017) (34 pages).
Robert et al., "Paraventricular hypothalamic regulation of trigeminovascular mechanisms involved in headaches," J Neurosci. 33(20):8827-40 (May 2013) (14 pages).
Roberts et al. "Rapid antidepressant effect of intranasal BPL-003 (5-methoxy-N,N-dimethyltryptamine) in treatment-resistant patients: a Phase 2a open-label study," (Sep. 2024) (2 pages).
Roseman et al., "Emotional breakthrough and psychedelics: Validation of the Emotional Breakthrough Inventory," J Psychopharmacol. 33(9):1076-1087 (Sep. 2019).
Roseman et al., "Quality of Acute Psychedelic Experience Predicts Therapeutic Efficacy of Psilocybin for Treatment-Resistant Depression," Front Pharmacol. 8:974 (Jan. 2018) (10 pages).
Ross et al., "Rapid and sustained symptom reduction following psilocybin treatment for anxiety and depression in patients with life-threatening cancer: a randomized controlled trial," J Psychopharmacol. 30(12):1165-1180 (Dec. 2016).
Rossi et al., "Serotonin-1A receptor function in the dorsal raphe nucleus following chronic administration of the selective serotonin reuptake inhibitor sertraline," J Neurochem. 105(4):1091-9 (May 2008).
Roth et al., "High-affinity agonist binding is not sufficient for agonist efficacy at 5-hydroxytryptamine2A receptors: evidence in favor of a modified ternary complex model," J Pharmacol Exp Ther. 280(2):576-83 (Feb. 1997).
Roth et al., "The Multiplicity of Serotonin Receptors: Uselessly Diverse Molecules or an Embarrassment of Riches?" 6(4):252-262 (Aug. 2000).
Rothman et al. "Evidence for possible involvement of 5-HT(2B) receptors in the cardiac valvulopathy associated with fenfluramine and other serotonergic medications," Circulation. 102(23):2836-2841 (Dec. 2000) (7 pages).
Rucker et al. "Psychiatry & the psychedelic drugs. Past, present & future," Neuropharmacology. 142:200-218 (Nov. 2018) (19 pages).
Rucker et al., "Low-dose psilocybin in short-lasting unilateral neuralgiform headache attacks: results from an open-label phase Ib ascending dose study," Headache. 64:1309-1317 (Sep. 2024).
Rucker, James J.H. "Psychedelic drugs should be legally reclassified so that researchers can investigate their therapeutic potential," BMJ. 350:h2902 (May 2015) (2 pages).

(56) References Cited

OTHER PUBLICATIONS

Rush et al., "Acute and longer-term outcomes in depressed outpatients requiring one or several treatment steps: a STAR*D report," Am J Psychiatry. 163(11):1905-17 (Nov. 2006).
Rush et al., "The 16-Item Quick Inventory of Depressive Symptomatology (QIDS), clinician rating (QIDS-C), and self-report (QIDS-SR): a psychometric evaluation in patients with chronic major depression," Biol Psychiatry. 54(5):573-83 (Sep. 2003).
Russ et al., "States and traits related to the quality and consequences of psychedelic experiences," Psychology of Consciousness: Theory, Research, and Practice, 6(1):1-21 (Dec. 2018).
Sager et al., "Fluoxetine and norfluoxetine-mediated complex drug-drug interactions: in vitro to in vivo correlation of effects on CYP2D6, CYP2C19, and CYP3A4," Clin Pharmacol Ther. 95(6):653-62 (Jun. 2014) (25 pages).
Sakashita et al. "Effect of psilocin on extracellular dopamine and serotonin levels in the mesoaccumbens and mesocortical pathway in awake rats," Biol Pharm Bull. 38(1):134-138 (2015).
Sakloth et al. "Effects of acute and repeated treatment with serotonin 5-HT2A receptor agonist hallucinogens on intracranial self-stimulation in rats," Exp Clin Psychopharmacol. 27(3):215-226 (Jun. 2019) (23 pages).
Salmi et al. "Evidence for functional interactions between 5-HT1A and 5-HT2A receptors in rat thermoregulatory mechanisms," Pharmacol Toxicol. 82(3):122-127 (Mar. 1998).
Sampedro et al., "Assessing the Psychedelic "After-Glow" in Ayahuasca Users: Post-Acute Neurometabolic and Functional Connectivity Changes Are Associated with Enhanced Mindfulness Capacities," Int J Neuropsychopharmacol. 20(9):698-711 (Sep. 2017) (55 pages).
Sanches et al. "Antidepressant Effects of a Single Dose of Ayahuasca in Patients With Recurrent Depression: A Spect Study," J Clin Psychopharmacol. 36(1):77-81 (Feb. 2016).
Sanchez et al. "Assessment of relative efficacies of 5-HT1A receptor ligands by means of in vivo animal models," Eur J Pharmacol. 315(3):245-254 (Nov. 1996).
Sanders-Bush et al. "Metabolism of bufotenine-2'-14C in human volunteers," Life Sci. 19(9):1407-1411 (Nov. 1976) (5 pages).
Santana et al. "Expression of serotonin1A and serotonin2A receptors in pyramidal and GABAergic neurons of the rat prefrontal cortex," Cereb Cortex. 14(10):1100-1109 (Oct. 2004).
Santini et al., "The association between social relationships and depression: a systematic review," J Affect Disord. 175:53-65 (Apr. 2015).
Schindler et al. "Indoleamine Hallucinogens in Cluster Headache: Results of the Clusterbusters Medication Use Survey," J Psychoactive Drugs. 47(5):372-381 (Nov.-Dec. 2015) (11 pages).
Schindler et al. "Neuroendocrine Associations Underlying the Persistent Therapeutic Effects of Classic Serotonergic Psychedelics," Front Pharmacol. 9(177) (Mar. 2018) (16 pages).
Schlemmer et al., "A primate model for the study of hallucinogens," Pharmacol Biochem Behav. 24(2):381-92 (Feb. 1986).
Schlemmer et al., "Evidence for dopamine mediation of submissive gestures in the stumptail macaque monkey," Pharmacol Biochem Behav. 14 Suppl 1:95-102 (1981).
Schlemmer et al., "The effect of a hallucinogen, 5-methoxy N,N-dimethyltryptamine, on primate social behavior," Commun Psychopharmacol. 1(2):105-18 (1977).
Schmid et al., "Long-lasting subjective effects of LSD in normal subjects," Psychopharmacology (Berl). 235(2):535-545 (Feb. 2018).
Schreiber et al. "Neuronal circuits involved in the anxiolytic effects of the 5-HT1A receptor agonists 8-OH-DPAT ipsapirone and buspirone in the rat," Eur J Pharmacol. 249(3):341-351 (Nov. 1993).
Schultes et al., "Plants of the Gods: Their Sacred, Healing, and Hallucinogenic Powers," Healing Arts Press (2001) (208 pages).
Schultes, "Fifteen years of study of psychoactive snuffs of South America: 1967-1982—a review," J Ethnopharmacol. 11(1):17-32 (Jun. 1984).
Scott et al. "Illicit substance use in pregnancy—a review," Obstet Med. 3(3):94-100 (Sep. 2010).

Scotton et al., "Serotonin Syndrome: Pathophysiology, Clinical Features, Management, and Potential Future Directions," Int J Tryptophan Res. 12:1178646919873925 (Sep. 2019) (14 pages).
Sepeda et al. "Inhaled 5-methoxy-N,N-dimethyltryptamine: Supportive context associated with positive acute and enduring effects," Journal of Psychedelic Studies. 4(2):114-122 (Jun. 2020).
Sewell et al. "Response of cluster headache to psilocybin and LSD," Neurology. 66(12):1920-1922 (Jun. 2006) (5 pages).
Sexton et al. "Population Survey Data Informing the Therapeutic Potential of Classic and Novel Phenethylamine, Tryptamine, and Lysergamide Psychedelics," Front Psychiatry. 10:896 (Feb. 2020) (9 pages) (27 pages).
Sexton et al., "Prevalence and epidemiological associates of novel psychedelic use in the United States adult population," J Psychopharmacol. 33(9):1058-1067 (Sep. 2019) (10 pages).
Sheehan et al., "The Mini-International Neuropsychiatric Interview (M.I.N.I.): the development and validation of a structured diagnostic psychiatric interview for DSM-IV and ICD-10," J Clin Psychiatry. 59 Suppl 20:22-33 (1998).
Shelton et al., "Olanzapine/fluoxetine combination for treatment-resistant depression: a controlled study of SSRI and nortriptyline resistance," J Clin Psychiatry. 66(10):1289-97 (Oct. 2005).
Shen et al. "Effects of monoamine oxidase inhibitor and cytochrome P450 2D6 status on 5-methoxy-N,N-dimethyltryptamine metabolism and pharmacokinetics," Biochem Pharmacol. 80(1):122-128 (Jul. 2010).
Shen et al. "Nonlinear pharmacokinetics of 5-methoxy-N,N-dimethyltryptamine in mice." Drug Metab Dispos. 39(7):1227-34 (Jul. 2011).
Shen et al., "Development of a LC-MS/MS method to analyze 5-methoxy-N,N-dimethyltryptamine and bufotenine, and application to pharmacokinetic study," Bioanalysis. 1(1):87-95 (Apr. 2009).
Shen et al., "Psychedelic 5-methoxy-N,N-dimethyltryptamine: metabolism, pharmacokinetics, drug interactions, and pharmacological actions," Curr Drug Metab. 11(8):659-66 (Oct. 2010) (18 pages).
Sherwood et al. "An Improved, Practical, and Scalable Five-Step Synthesis of Psilocybin," Synthesis. 52(5):688-694 (Jan. 2020) (7 pages).
Shulgin, "Bufotenine," J Psychoactive Drugs. 13(4):389 (Jul. 1981) (2 pages).
Shulgin, "Psilocybin," J Psychedelic Drugs. 12(1):79 (Jan.-Mar. 1980) (2 pages).
Sills et al. "Development of selective tolerance to the serotonin behavioral syndrome and suppression of locomotor activity after repeated administration of either 5-MeODMT or mCPP," Life Sciences. 36(26):2463-2469 (Jul. 1985).
Silva et al., "Facilitatory role of serotonin (5-HT) in the control of thyrotropin releasing hormone/thyrotropin (TRH/TSH) secretion in rats," Brazilian Journal of Medical and Biological Research. 29(5):677-83 (1996).
Sitaram et al., "In vivo metabolism of 5-methoxy-N,N-dimethyltryptamine and N,N-dimethyltryptamine in the rat," Biochem Pharmacol. 36(9):1509-12 (May 1987).
Sitaram et al., "Observations on the metabolism of the psychotomimetic indolealkylamines: implications for future clinical studies," Biol Psychiatry. 28(10):841-8 (Nov. 1990).
Sjaastad et al. "The rare, unilateral headaches. Vågå study of headache epidemiology," J Headache Pain. 8(1):19-27 (Feb. 2007).
Sklerov et al. "A fatal intoxication following the ingestion of 5-methoxy-N,N-dimethyltryptamine in an ayahuasca preparation," J Anal Toxicol. 29(8):838-41 (Nov./Dec. 2005).
Sloshower et al., "Psilocybin-assisted therapy for major depressive disorder: An exploratory placebo-controlled, fixed-order trial," J Psychopharmacol. 37(7):698-706 (Jul. 2023).
Small Pharma Reports Positive Top-line Data from SPL026 (DMT)-SSRI Drug Interaction Study in Patients with Major Depressive Disorder [Press release]. Sep. 26, 2023. https://www.biospace.com/small-pharma-reports-positive-top-line-results-from-phase-iia-trial-of-spl026-in-major-depressive-disorder.
Smith et al., "Differential effects of 5-hydroxytryptamine1a selective drugs on the 5-HT behavioral syndrome," Pharmacol Biochem Behav. 24(6):1513-9 (Jun. 1986).

(56) References Cited

OTHER PUBLICATIONS

Snaith et al., "A scale for the assessment of hedonic tone the Snaith-Hamilton Pleasure Scale," Br J Psychiatry. 167(1):99-103 (Jul. 1995).
Sohlberg et al. "The impact of the site of blood sampling on pharmacokinetic parameters following sublingual dosing to dogs," J Pharmacol Toxicol Methods. 67(1):1-4 (Jan.-Feb. 2013) (6 pages).
Soler et al., "Exploring the therapeutic potential of Ayahuasca: acute intake increases mindfulness-related capacities," Psychopharmacology (Berl). 233(5):823-9 (Nov. 2015).
Spain et al. "Neurovascular and neuroimaging effects of the hallucinogenic serotonin receptor agonist psilocin in the rat brain," Neuropharmacology. 99:210-20 (Jul. 2015).
Spencer et al., "Serotonin receptor subtype mediation of the interoceptive discriminative stimuli induced by 5-methoxy-N,N-dimethyltryptamine," Psychopharmacology (Berl). 93(2):158-66 (1987).
Spindelegger et al., "Influence of escitalopram treatment on 5-HT 1A receptor binding in limbic regions in patients with anxiety disorders," Mol Psychiatry. 14(11):1040-50 (Nov. 2009) (12 pages).
Sprenger et al. "Specific hypothalamic activation during a spontaneous cluster headache attack," Neurology. 62(3):516-7 (Feb. 2004) (3 pages).
Squires, "Evidence that 5-methoxy-N, N-dimethyl tryptamine is a specific substrate for MAO-A in the rat: implications for the indoleamine dependent behavioural syndrome," J Neurochem. 24(1):47-50 (Jan. 1975).
Sternbach, "The serotonin syndrome," Am J Psychiatry. 148(6):705-13 (Jun. 1991).
Strassman et al., "Dose-response study of N,N-dimethyltryptamine in humans. I. Neuroendocrine, autonomic, and cardiovascular effects," Arch Gen Psychiatry. 51(2):85-97 (Feb. 1994).
Strassman, "Human hallucinogen interactions with drugs affecting serotonergic neurotransmission," Neuropsychopharmacology. 7(3):241-3 (Nov. 1992) (4 pages).
Studerus et al. "Acute, subacute and long-term subjective effects of psilocybin in healthy humans: a pooled analysis of experimental studies," J Psychopharmacol. 25(11):1434-1452 (Nov. 2011) (20 pages).
Studerus et al. "Prediction of psilocybin response in healthy volunteers," PLoS One. 7(2):e30800 (Feb. 2012) (12 pages).
Sugrue, M.F. "A study of the role of noradrenaline in behavioral changes produced in the rat by psychotomimetic drugs," Br J Pharmacol. 35(2):243-252 (Feb. 1969).
Suzuki et al., "Characterization of eight biogenic indoleamines as substrates for type A and type B monoamine oxidase," Biochem Pharmacol. 30(11):1353-8 (Jun. 1981).
Swainson et al. "Esketamine for treatment resistant depression," Expert Rev Neurother. 19(10):899-911 (Oct. 2019) (14 pages).
Tao et al. "Changes in intensity of serotonin syndrome caused by adverse interaction between monoamine oxidase inhibitors and serotonin reuptake blockers," Neuropsychopharmacology. 39(8):1996-2007 (Jul. 2014).
Thundiyil et al. "Evolving epidemiology of drug-induced seizures reported to a Poison Control Center System," J Med Toxicol. 3(1):15-19 (Mar. 2007).
Tittarelli et al. "Recreational use, analysis and toxicity of tryptamines," Curr Neuropharmacol. 13(1):26-46 (Jan. 2015).
Todd et al., "A Monoclonal Antibody TrkB Receptor Agonist as a Potential Therapeutic for Huntington's Disease," PLoS ONE. 9(2):e87923 (Feb. 2014) (13 pages).
Trauninger et al. "Methylprednisolone therapy for short-term prevention of SUNCT syndrome," Cephalalgia. 30(6):735-739 (Jun. 2010).
Tricklebank et al., "Subtypes of the 5-HT receptor mediating the behavioural responses to 5-methoxy-N,N-dimethyltryptamine in the rat," Eur J Pharmacol. 117(1):15-24 (Oct. 1985).
Trulson et al. "Development of tolerance to repeated administration of 5-methoxy-N,N-dimethyltryptamine in rats," Eur J Pharmacol. 108(1):33-37 (Jan. 1985).

Turner et al. "Effect of some indolealkylamines on man," AMA Arch Neurol Psychiatry. 81(1):121-129 (Jan. 1959).
Ullmer et al., "Expression of serotonin receptor mRNAs in blood vessels," FEBS Lett. 370(3):215-21 (Aug. 1995).
Uthaug et al. "A comparison of reactivation experiences following vaporization and intramuscular injection (IM) of synthetic 5-methoxy-N,N-dimethyltryptamine (5-MeO-DMT) in a naturalistic setting," Journal of Psychedelic Studies. 4(2): 104-13 (Mar. 2020).
Uthaug et al., "A single inhalation of vapor from dried toad secretion containing 5-methoxy-N,N-dimethyltryptamine (5-MeO-DMT) in a naturalistic setting is related to sustained enhancement of satisfaction with life, mindfulness-related capacities, and a decrement of psychopathological symptoms," Psychopharmacology (Berl). 236(9):2653-2666 (Apr. 2019) (14 pages).
Van de Kar et al. "5-HT2A receptors stimulate ACTH, corticosterone, oxytocin, renin, and prolactin release and activate hypothalamic CRF and oxytocin-expressing cells," J Neurosci. 21(10):3572-3579 (May 2001).
Van Went, G.F. "Mutagenicity testing of 3 hallucinogens: LSD, psilocybin and delta9-THC, using the micronucleus test," Experientia. 34(3):324-325 (Mar. 1978).
Vaupel et al. "The inhibition of food intake in the dog by LDS, mescaline, psilocin, d-amphetamine and phenylisopropylamine derivatives," Life Sci. 24(26):2427-2431 (Jun. 1979).
Vigerelli et al. "Biological Effects and Biodistribution of Bufotenine on Mice," Biomed Res Int. 2018:1032638 (May 2018) (11 pages).
Vizeli et al., "Genetic influence of CYP2D6 on pharmacokinetics and acute subjective effects of LSD in a pooled analysis," Sci Rep. 11(1):10851 (May 2021) (9 pages).
Vogel et al. "Structure-activity-relationships of certain hallucinogenic substances based on brain levels," Life Sci. 20(10):1629-1635 (May 1977).
Vollenweider et al. "5-HT modulation of dopamine release in basal ganglia in psilocybin-induced psychosis in man—a PET study with [11C]raclopride," Neuropsychopharmacology. 20(5):424-433 (May 1999).
Vollenweider et al. "Positron emission tomography and fluorodeoxyglucose studies of metabolic hyperfrontality and psychopathology in the psilocybin model of psychosis," Neuropsychopharmacology. 16(5):357-372 (May 1997).
Vollenweider et al. "Psilocybin induces schizophrenia-like psychosis in humans via a serotonin-2 agonist action," Neuroreport. 9(17):3897-3902 (Dec. 1998).
Vollenweider et al. "Psychedelic drugs: neurobiology and potential for treatment of psychiatric disorders," Nat Rev Neurosci. 21(11):611-624 (Sep. 2020) (14 pages).
Von Rotz et al., "Single-dose psilocybin-assisted therapy in major depressive disorder: A placebo-controlled, double-blind, randomised clinical trial," EClinicalMedicine. 56:101809 (Feb. 2023) (11 pages).
Wallach, "Endogenous hallucinogens as ligands of the trace amine receptors: a possible role in sensory perception," Med Hypotheses. 72(1):91-4 (Jan. 2009).
Watts et al., "Patients' accounts of increased "connectedness" and "acceptance" after psilocybin for treatment-resistant depression," Journal of Humanistic Psychology, 57(5):520-564 (2017) (45 pages).
Williams et al. "Depression and pain: an overview," Acta Neuropsychiatr. 18(2):79-87 (Apr. 2006).
Williams et al. "Microvascular decompression of the trigeminal nerve in the treatment of SUNCT and SUNA," J Neurol Neurosurg Psychiatry. 81(9):992-996 (May 2010) (5 pages).
Williams et al. "SUNCT and SUNA: clinical features and medical treatment," J Clin Neurosci. 15(5):526-534 (May 2008).
Willins et al. "Direct injection of 5-HT2A receptor agonists into the medial prefrontal cortex produces a head-twitch response in rats," J Pharmacol Exp Ther. 282(2):699-706 (Aug. 1997).
Winne et al., "Anxiety-like behavior induced by salicylate depends on age and can be prevented by a single dose of 5-MeO-DMT," Exp Neurol. 326:113175 (Jan. 2020) (1 page).
Winter et al. "The paradox of 5-methoxy-N,N-dimethyltryptamine: an indoleamine hallucinogen that induces stimulus control via 5-HT1A receptors," Pharmacol Biochem Behav. 65(1):75-82 (Jan. 2000).

(56) References Cited

OTHER PUBLICATIONS

World Health Organization, "Depression," Jan. 30, 2020. Available <https://www.who.int/news-room/fact-sheets/detail/depression> (3 pages).
Wyler et al. "Serotonergic Control of Metabolic Homeostasis," Front Cell Neurosci. 11:277 (Sep. 2017) (9 pages).
Yaden et al. "The Subjective Effects of Psychedelics Are Necessary for Their Enduring Therapeutic Effects," ACS Pharmacol Transl Sci. 4(2):568-572 (Dec. 2020).
Yang et al., "Effect of clinically relevant doses of vortioxetine and citalopram on serotonergic PET markers in the nonhuman primate brain," Neuropsychopharmacology. 44(10):1706-1713 (Sep. 2019).
Young et al., "Discriminative stimulus properties of the hallucinogenic agent DOM," Communications in Psychopharmacology. 4:510-6 (1980).
Younger et al., "Development of the Stanford Expectations of Treatment Scale (SETS): a tool for measuring patient outcome expectancy in clinical trials," Clin Trials. 9(6):767-76 (Dec. 2012).
Yu et al. "Serotonin 5-hydroxytryptamine(2A) receptor activation suppresses tumor necrosis factor-alpha-induced inflammation with extraordinary potency," J Pharmacol Exp Ther. 327(2):316-323 (Nov. 2008).
Yu et al., "Screening for endogenous substrates reveals that CYP2D6 is a 5-methoxyindolethylamine O-demethylase," Pharmacogenetics. 13(6):307-19 (Jun. 2003).
Yu, Ai-Ming. "Indolealkylamines: biotransformations and potential drug-drug interactions," AAPS J. 10(2):242-253 (Jun. 2008).
Zanardi et al., "Increased 5-hydroxytryptamine-2 receptor binding in the frontal cortex of depressed patients responding to paroxetine treatment: a positron emission tomography scan study," J Clin Psychopharmacol. 21(1):53-8 (Feb. 2001).
Zhuk et al. "Research on acute toxicity and the behavioral effects of methanolic extract from psilocybin mushrooms and psilocin in mice," Toxins (Basel). 7(4):1018-1029 (Mar. 2015).
"atai Life Sciences Announces First Patient Dosed in Phase 2 Study of EMP-01 for the Treatment of Social Anxiety Disorder," May 13, 2025 https://ir.atai.life/news-releases/news-release-details/atai-life-sciences-announces-first-patient-dosed-phase-2-study (2 pages).
"atai Life Sciences Reports First Quarter 2025 Financial Results and Recent Corporate Updates," May 14, 2025 https://ir.atai.life/news-releases/news-release-details/atai-life-sciences-reports-first-quarter-2025-financial-results (4 pages).
"atai Life Sciences Announces Positive Topline Data from Part 2 of Beckley Psytech's Phase 2a Study of BPL-003 in Combination with SSRIs for Treatment-Resistant Depression," May 20, 2025 https://ir.atai.life/news-releases/news-release-details/atai-life-sciences-announces-positive-topline-data-part-2 (2 pages).
"atai Life Sciences and Beckley Psytech to Combine Creating a Global Leader in Psychedelic Mental Health Therapies," Jun. 2, 2025 https://ir.atai.life/news-releases/news-release-details/atai-life-sciences-and-beckley-psytech-combine-creating-global (4 pages).
"atai Life Sciences and Beckley Psytech Announce Positive Topline Results from the Phase 2b Study of BPL-003 in Patients with Treatment-Resistant Depression," Jul. 1, 2025 https://www.beckleypsytech.com/posts/atai-life-sciences-and-beckley-psytech-announce-positive-topline-results-from-the-phase-2b-study-of-bpl-003-in-patients-with-treatment-resistant-depression (16 pages).
"atai Life Sciences Announces $50 Million Private Placement Financing," Jul. 1, 2025 https://ir.atai.life/news-releases/news-release-details/atai-life-sciences-announces-50-million-private-placement (2 pages).
"Beckley Psytech announces positive topline data from Part 2 of its Phase lla study of BPL-003 (intranasal 5-MeO-DMT benzoate) in combination with SSRIs for treatment resistant depression," May 20, 2025 https://www.beckleypsytech.com/posts/positive-data-from-phase-2a-study-of-bpl-003-with-ssris-for-treatment-resistant-depression (8 pages).
"atai Life Sciences and Beckley Psytech to Combine Creating a Global Leader in Psychedelic Mental Health Therapies," Jun. 2, 2025 https://www.beckleypsytech.com/posts/atai-life-sciences-and-beckley-psytech-to-combine-creating-a-global-leader-in-psychedelic-mental-health-therapies (14 pages).
"Results from Beckley Psytech's Phase lla study of BPL-003 (intranasal 5-MeO-DMT benzoate) for Alcohol Use Disorder to be presented at CPDD 2025," Jun. 12, 2025 https://www.beckleypsytech.com/posts/results-from-phase-iia-study-of-bpl-003-for-aud-to-be-presented-at-cpdd-2025 (6 pages).
"atai Life Sciences and Beckley Psytech Announce Positive Topline Results from the Phase 2b Study of BPL-003 in Patients with Treatment-Resistant Depression," Jul. 1, 2025 https://ir.atai.life/news-releases/news-release-details/atai-life-sciences-and-beckley-psytech-announce-positive-topline (4 pages).
Gillin JC et al., "Evidence for and against the involvement of N, N-dimethyl-tryptamine (DMT) and 5-methoxy-N,N-dimethyltryptamine (5-MeO-DMT) in schizophrenia." 12(4):12-13 (1976).
Glennon et al., "The electronic and serotonin receptor binding affinity properties of N,N-dimethyltryptamine analogs," 18(3):453-465 (1977) (Abstract only).

\* cited by examiner

PHARMACEUTICALLY ACCEPTABLE SALTS OF PSILOCIN AND USES THEREOF

BACKGROUND

Significant interest in the therapeutic application of psilocin has developed, based upon evidence of possible therapeutic effects in a wide array of clinical applications, including psychiatric conditions, pain disorders, and neurological conditions. However, due to the physical properties of psilocin in the solid state, e.g., poor crystallinity with limited enhancement of bulk purity upon crystallization, susceptibility to auto catalyzed oxidation upon handling and prolonged storage, and low water solubility, there exists a need for psilocin salts and formulations with improved stability, physical properties, and handling characteristics.

SUMMARY OF THE INVENTION

The invention features a pharmaceutically acceptable salt of psilocin, wherein the pharmaceutically acceptable salt is a 1:1 benzoate salt.

In another aspect, the invention features a pharmaceutically acceptable salt of psilocin, wherein the pharmaceutically acceptable salt is a 1:1 tartrate salt.

In a further aspect, the invention features a pharmaceutically acceptable salt of psilocin, wherein the pharmaceutically acceptable salt is a 2:1 succinate salt.

In another aspect, the invention features a pharmaceutically acceptable salt of psilocin, wherein the pharmaceutically acceptable salt is a 2:1 salt of 1,5-naphthalenedisulfonic acid, a 1:1 salt of 1,5-20 naphthalenedisulfonic acid, or a mixture thereof.

In a related aspect, the invention features a pharmaceutical composition including a psilocin salt of the invention and a pharmaceutically acceptable excipient. The pharmaceutically acceptable excipient can be any pharmaceutically acceptable excipient described herein.

In another aspect, the invention features a pharmaceutical composition including (i) an aqueous solution having a pH of between about 3 and about 9 (e.g., 3±1, 4±1, 5±1, 6±1, 7±1, 8±1, and 9±1) and (ii) between about 0.1 mg/mL and about 50 mg/mL (e.g., 0.1±0.1 mg/mL, 0.2±0.1 mg/mL, 0.3±0.1 mg/mL, 0.4±0.1 mg/mL, 0.5±0.5 mg/mL, 1±0.5 mg/mL, 2±1 mg/mL, 3±1 mg/mL, 4±1 mg/mL, 5±1 mg/mL, 6±1 mg/mL, 7±1 mg/mL, 8±1 mg/mL, 9±1 mg/mL, 10±1 mg/mL, 11±1 mg/mL, 12±1 mg/mL, 13±1 mg/mL, 14±1 mg/mL, 15±1 mg/mL, 16±1 mg/mL, 17±1 mg/mL, 18±1 mg/mL, 19±1 mg/mL, 25±5 mg/mL, 30±5 mg/mL, 35±5 mg/mL, 40±5 mg/mL, 45±5 mg/mL, and 50±5 mg/mL) of any one of pharmaceutically acceptable salts of psilocin described herein. The aqueous pharmaceutical composition can be suitable for infusion into a subject for treating a disease or condition described herein.

In some embodiments, the aqueous solution has between about 1 mg/mL and about 15 mg/mL (e.g., 2±1 mg/mL, 3±1 mg/mL, 4±1 mg/mL, 5±1 mg/mL, 6±1 mg/mL, 7±1 mg/mL, 8±1 mg/mL, 9±1 mg/mL, 10±1 mg/mL, 11±1 mg/mL, 12±1 mg/mL, 13±1 mg/mL, 14±1 mg/mL, and 15±1 mg/mL) of any one of pharmaceutically acceptable salts of psilocin described herein.

In another aspect, the invention features a crystal form of a 2:1 succinate salt of psilocin having at least four, five, six, or seven peaks at diffraction angle $2\theta(°)$ as provided in FIG. 4 (SUC Pattern 4) as measured by X-ray powder diffractometry.

In a related aspect, the invention features a crystal form of a 1,5-naphthalenedisulfonic acid salt of psilocin having at least four, five, six, or seven peaks at diffraction angle $2\theta(°)$ as provided in FIG. 7 or FIG. 14 (NAP Pattern 1) as measured by X-ray powder diffractometry.

In a further aspect, the invention features a crystal form of a 1:1 tartrate salt of psilocin having at least four, five, six, or seven peaks at diffraction angle $2\theta(°)$ as provided in FIG. 9 or FIG. 12 (TAR Pattern 3) as measured by X-ray powder diffractometry.

In another aspect, the invention features a crystal form of a 1:1 tartrate salt of psilocin having at least four, five, six, or seven peaks at diffraction angle $2\theta(°)$ as provided in FIG. 10 (TAR Pattern 4) as measured by X-ray powder diffractometry.

In a related aspect, the invention features a crystal form of a 1:1 tartrate salt of psilocin having at least four, five, six, or seven peaks at diffraction angle $2\theta(°)$ selected from 6.7±0.5, 12.6±0.5, 13.4±0.5, 14.7±0.5, 15.8±0.5, 16.2±0.5, 17.2±0.5, 18.8±0.5, 19.9±0.5, 20.8±0.5, 21.8±0.5, 22.5±0.5, 23.4±0.5, 23.7±0.5, 24.7±0.5, 25.5±0.5, 26.5±0.5, 27.0±0.5, 28.5±0.5, and 29.4±0.5 (TAR Pattern 1) as measured by X-ray powder diffractometry.

In a further aspect, the invention features a crystal form of a 2:1 succinate salt of psilocin having at least four, five, six, or seven peaks at diffraction angle $2\theta(°)$ selected from 9.7±0.5, 11.2±0.5, 12.3±0.5, 13.8±0.5, 15.9±0.5, 16.4±0.5, 19.4±0.5, 20.0±0.5, 21.3±0.5, 22.6±0.5, 23.3±0.5, 23.5±0.5, 23.8±0.5, 24.5±0.5, 24.7±0.5, 25.0±0.5, 28.0±0.5, 28.3±0.5, 29.0±0.5, and 29.4±0.5 (SUC Pattern 3) as measured by X-ray powder diffractometry.

In a related aspect, the invention features a crystal form of a 1:1 benzoate salt of psilocin having at least four, five, six, or seven peaks at diffraction angle $2\theta(°)$ 9.4±0.5, 10.9±0.5, 12.3±0.5, 13.3±0.5, 14.5±0.5, 15.3±0.5, 16.3±0.5, 16.4±0.5, 18.2±0.5, 18.9±0.5, 19.3±0.5, 19.7±0.5, 20.0±0.5, 20.8±0.5, 21.3±0.5, 21.9±0.5, 22.6±0.5, 22.9±0.5, 23.8±0.5, 24.1±0.5, 24.9±0.5, 25.6±0.5, 26.0±0.5, 26.3±0.5, 26.5±0.5, 26.9±0.5, 27.5±0.5, and 28.5±0.5 (BEN Pattern 1) as measured by X-ray powder diffractometry.

In a related aspect, the invention features a pharmaceutical composition including a crystal form of the invention and a pharmaceutically acceptable excipient. The pharmaceutically acceptable excipient can be any pharmaceutically acceptable excipient described herein. In some embodiments, any one of the pharmaceutical compositions described herein is stored in a container that shields the pharmaceutical composition from exposure to light, such as an amber glass bottle, or an ambient light impermeable container.

In a related aspect, the invention features a method of treating a disease or condition in a subject in need thereof, the method including administering to the subject a psilocin salt of the invention in an amount sufficient to treat the disease or condition. The disease or condition can be a neurological injury, neurodegenerative disease, an inflammatory condition, chronic pain, or a psychological condition. In certain embodiments, the disease or condition is an inflammatory condition (e.g., lung inflammation, neuroinflammation, rheumatoid arthritis, atherosclerosis, psoriasis, type II diabetes, inflammatory bowel disease, Crohn's disease, multiple sclerosis, and/or septicemia). In particular embodiments, the inflammatory condition is chronic obstructive pulmonary disease (COPD), or Alzheimer's disease. In certain embodiments, the disease or condition is a neurological injury (e.g., a stroke, a traumatic brain injury, or a spinal cord injury). In some embodiments, the disease or condition is chronic pain (e.g., pain resulting from postoperative pain, tension headaches, chronic lower back pain, fibromyalgia, nephropathy, multiple sclerosis, shingles, complex regional pain syndrome, cephalic pain, or sciatica). In particular embodiments, the chronic pain condition results from trigeminal autonomic cephalalgia (e.g., episodic and chronic cluster headache (CH), episodic and chronic paroxysmal hemicrania (PH), and short-lasting unilateral neuralgiform headache attacks with conjunctival injection and tearing (SUNCT)). In some embodiments, the trigeminal autonomic cephalalgia is episodic or chronic CH. In certain embodiments, the condition is a psychological condition (e.g., depression, anxiety, addiction, post-traumatic stress disorder, an eating disorder, or compulsive behavior). In particular embodiments, the psychological condition is depression or anxiety.

Definitions

To facilitate the understanding of this invention, a number of terms are defined below and throughout the disclosure. Unless otherwise defined, all technical and scientific terms used herein have the same meaning as commonly understood by one of ordinary skill in the art to which this invention belongs. The terminology herein is used to describe specific embodiments of the invention, but their usage does not limit the invention, except as outlined in the claims.

Terms such as "a", "an," and "the" are not intended to refer to only a singular entity but include the general class of which a specific example may be used for illustration.

As used herein, the term "about" refers to a value that is within 10% above or below the value being described.

The term "administration" or "administering" refers to a method of giving a dosage of a compound or pharmaceutical composition to a subject.

As used herein, the terms "pharmacologically effective amount," "therapeutically effective amount," and the like, when used in reference to a therapeutic composition, refer to a quantity sufficient to, when administered to the subject, including a mammal, for example a human, effect beneficial or desired results, such as clinical results. For example, in the context of treating depression, described herein, these terms refer to an amount of the composition sufficient to achieve a treatment response as compared to the response obtained without administration of the composition. The quantity of a given composition described herein that will correspond to such an amount may vary depending upon various factors, such as the given agent, the pharmaceutical formulation, the route of administration, the type of disease or disorder, the identity of the subject (e.g., age, sex, weight) or host being treated, and the like. An "effective amount," "pharmacologically effective amount," or the like, of a composition of the present disclosure, also include an amount that results in a beneficial or desired result in a subject as compared to a control.

As used herein, the terms "treat," "treating," or "treatment" refer to administration of a compound or pharmaceutical composition for a therapeutic purpose. To "treat a disorder" or use for "therapeutic treatment" refers to administering treatment to a patient already suffering from a disease to ameliorate the disease or one or more symptoms thereof to improve the patient's condition (e.g., by reducing one or more symptoms of inflammation). The term "therapeutic" includes the effect of mitigating deleterious clinical effects of certain inflammatory processes (i.e., consequences of the inflammation, rather than the symptoms of inflammation). The methods of the invention can be used as a primary prevention measure, i.e., to prevent a condition or to reduce the risk of developing a condition. Prevention refers to prophylactic treatment of a patient who may not have fully developed a condition or disorder, but who is susceptible to, or otherwise at risk of, the condition. Thus, in the claims and embodiments, the methods of the invention can be used either for therapeutic or prophylactic purposes.

Other features and advantages of the invention will be apparent from the following Detailed Description, Examples, Figure, and Claims.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Figure 1:
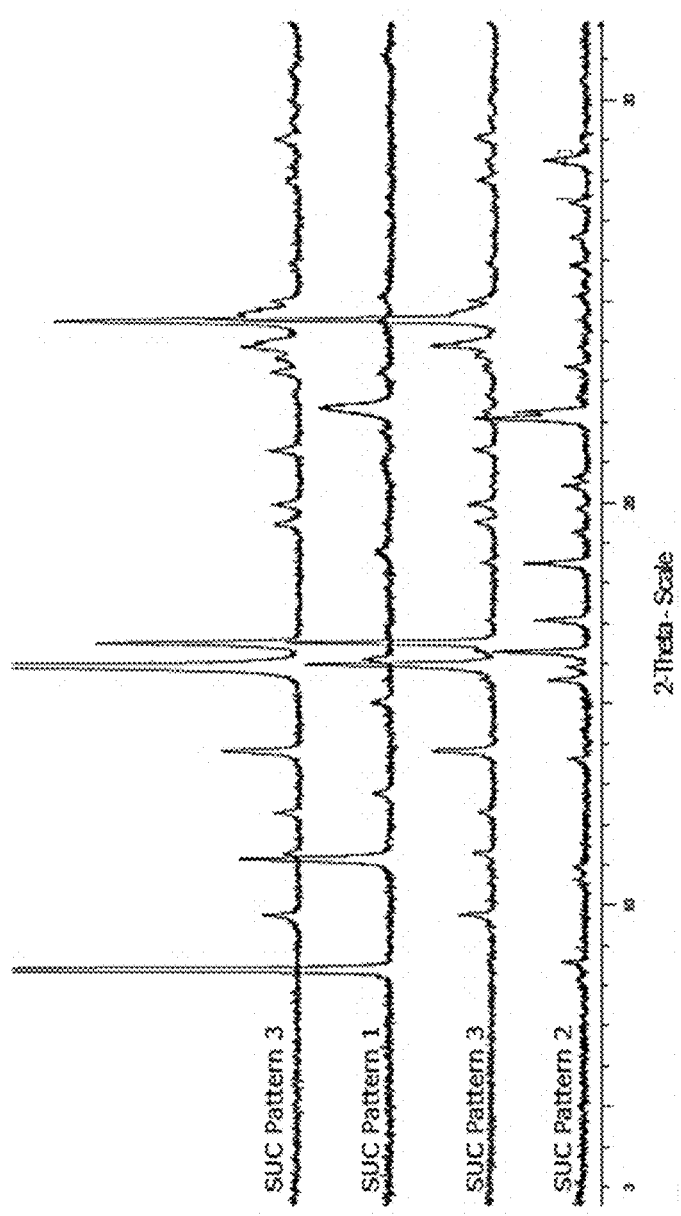
FIG. 1 shows the XRPD patterns of succinic acid psilocin salts having SUC Pattern 1, SUC Pattern 2, or SUC Pattern 3.

To identify psilocin salts with improved properties, a salt screen was performed with 24 different counterions and 3 different solvent systems. Crystalline material with a novel XRPD pattern was isolated from experiments with 13 of the counterions and their properties assessed. Following identification of preferred salts with optimal properties, polymorph screening of these salts was conducted.

Psilocin has the structure:

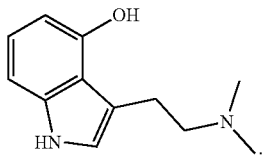

Psilocybin is a phosphate prodrug for psilocin, and when administered to a subject, psilocybin is metabolized to form psilocin. Psilocybin undergoes an enzymatic dephosphorylation reaction resulting in a loss of the phosphate group revealing psilocin's hydroxy group. Psilocybin exists as a zwitterion in which the phosphate and amine ionize each other. The existence of a zwitterion limits the solubility of psilocybin and also curtails its ability to make a salt with an alternate acid that could exist under physiologically tolerated conditions. Removing the phosphate group allows the formation of alternate acid salt forms of psilocin's dimethylamine that are not possible to be prepared with psilocybin. Being able to exist in a non-ionized form, Psilocin is much more lipid soluble in comparison to psilocybin, and therefore is capable of crossing the blood brain barrier more effectively to elicit a response. Psilocin has a high affinity for and is able to activate the 5-HT2A receptor, which plays a key role in regulating mood, sexual behavior, aggression, impulsivity, cognitive function, appetite, pain, sleep, and memory along with other behaviors. As result, psilocin has effects at 5-HT2A receptor that mimic the action of the endogenous neurotransmitter serotonin. This disclosure provides methods for new stable and soluble salt forms of psilocin that are useful in therapy, such as in the treatment of a patient having a psychological condition or a neurological injury.

Treatment Methods

The disclosure provides psilocin salt forms useful for treating psychological conditions, neurological injuries, pain, cephalic pain (e.g., headache), inflammatory conditions, and anxiety.

Psychological Conditions

The psilocin salt forms of the invention can be used to treat psychological conditions. The psychological condition may be any psychological condition described herein. In some embodiments the psychological condition is depression, anxiety, addiction, post-traumatic stress disorder (PTSD), an eating disorder, or compulsive behavior. In some embodiments, the psychological condition may be depression. The psychological condition may also be anxiety. The anxiety may be experienced by a subject who is receiving palliative care or is enrolled in a hospice program. In certain embodiments, the subject who is experiencing anxiety has symptoms such as hypervigilance, fatigue, racing thoughts, irritability, excessive worry, and/or fear.

The subject diagnosed with a psychological condition may be diagnosed by evaluation of the subject's symptoms by a physician, clinician, or therapist based on a physical examination. For example, a blood test may be used to evaluate blood concentration levels of certain biomarkers such as hormones, calcium, vitamin D, electrolytes, and iron in diagnosing depression. Additionally, or alternatively, for patients with a possible depression condition a depression screening test may be performed by the physician, clinician, or therapist to aid in the diagnosis of depression. In some embodiments, the methods described herein may be used to treat psychosomatic pain conditions. In some embodiments, the psychosomatic pain condition may be fibromyalgia, chronic fatigue, migraines, or back pain.

Neurological Injuries

The psilocin salt forms of the invention can be used to treat a neurological injury. The neurological injury may be any neurological injury. In some embodiments, the neurological injury is a stroke, a traumatic brain injury, or a spinal cord injury. The methods of treating a neurological injury described herein may reduce acute inflammation. In certain embodiments, hippocampal hyperactivity is reduced. In particular embodiments, the methods of the invention are used to treat a neurological injury, e.g., stroke, traumatic brain injury, and spinal cord injury, by administering the psilocin salt as needed to pain, inflammation, and/or other symptoms associated with the neurological injury.

Neurodegenerative Conditions

The psilocin salt forms of the invention can be used to treat neurodegenerative conditions. The neurodegenerative condition to be treated can be Alzheimer's disease, Huntington's disease, or Parkinson's disease, among others.

Inflammatory Conditions

The psilocin salt forms of the invention can be used to treat inflammatory conditions. The inflammatory condition to be treated can be a lung inflammation (e.g., chronic obstructive pulmonary disease (COPD)), neuroinflammation (e.g., inflammation associated with Alzheimer's disease), 10 chronic inflammation, rheumatoid arthritis, atherosclerosis, psoriasis, type II diabetes, inflammatory bowel disease, Crohn's disease, multiple sclerosis, and/or septicemia.

Chronic Pain

The psilocin salt forms of the invention can be used to treat conditions associated with chronic pain. The chronic pain may result from post-operative pain, tension headaches, chronic lower back pain, fibromyalgia, nephropathy, multiple sclerosis, shingles, complex regional pain syndrome, cephalic pain, or sciatica. The chronic pain may arise from an operation. The chronic pain may also be pain associated with a particular disease or condition such as nephropathy, multiple sclerosis, shingles, or complex regional pain syndrome. As used herein, a disorder or condition associated with cephalic pain is a disorder or condition which has as one of its symptoms cephalic/head pain (e.g., headache). Examples of such disorders or conditions include trigeminal autonomic cephalalgias such as episodic and chronic cluster headache (CH), episodic and chronic paroxysmal hemicrania (PH), and short-lasting unilateral neuralgiform headache attacks with conjunctival injection and tearing (SUNCT). Other examples of disorders or conditions which can be treated according to the present invention include vascular headaches (e.g., migraine headaches), tension headaches, headaches associated with the use of a substance (e.g., triptans such as sumatriptan, benzodiazepines such as alprazolam, analgesics such as ibuprofen, ergots such as ergotamine, opioids such as morphine, recreational drugs such as caffeine, nicotine, alcohol, and hormone replacement therapy containing, for example, estrogen) or its withdrawal. Yet additional examples of disorders or conditions associated with cephalic pain include miscellaneous headache unassociated with a structural lesion, headache associated with a nonvascular intracranial disorder, headache associated with a non-cephalic infection, headache associated with a metabolic disorder, headache associated with a disorder of the cranium, neck, eyes, nose, sinuses, teeth, mouth, or other facial or cranial structure, nerve trunk pain and deafferentation pain.

Compositions

The invention features pharmaceutical compositions including a psilocin salt form of the invention and a pharmaceutically acceptable excipient. Examples of a pharmaceutically acceptable excipients include, but are not limited to, biocompatible vehicles, adjuvants, additives, and diluents to achieve a composition usable as a dosage form. Examples of other excipients include colloidal silicon oxide, magnesium stearate, cellulose, sodium lauryl sulfate, and D&C Yellow #10.

The pharmaceutical compositions of the invention can include one or more solvents, diluents, or other liquid vehicle, dispersion or suspension aids, surface active agents, isotonic agents, thickening or emulsifying agents, preservatives, solid binders, and lubricants, as suited to the particular dosage form desired. Remington's Pharmaceutical Sciences, Eighteenth Edition, E. W. Martin (Mack Publishing Co., Easton, Pa., 1990) discloses various excipients used in formulating pharmaceutical compositions and known techniques for the preparation thereof. Except insofar as any conventional excipient medium is incompatible with the compounds of the invention, such as by producing any undesirable biological effect or otherwise interacting in a deleterious manner with any other component(s) of the pharmaceutical composition, its use is contemplated to be within the scope of this invention. Some examples of materials which can serve as pharmaceutically acceptable excipients include, but are not limited to, sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil, sesame oil; olive oil; corn oil and soybean oil; glycols; such as propylene glycol; esters such as ethyl oleate and ethyl laurate; agar; natural and synthetic phospholipids, such as soybean and egg yolk phosphatides, lecithin, hydrogenated soy lecithin, dimyristoyl lecithin, dipalmitoyl lecithin, distearoyl lecithin, dioleoyl lecithin, hydroxylated lecithin, lysophosphatidylcholine, cardiolipin, sphingomyelin, phosphatidylcholine, phosphatidyl ethanolamine, diastearoyl phosphatidylethanolamine (DSPE) and its pegylated esters, such as DSPE-PEG750 and, DSPE-PEG2000, phosphatidic acid, phosphatidyl glycerol and phosphatidyl serine; and hydroxypropyl-beta-cyclodextrin and sulfonic acid substituted cyclodextrin (e.g., CAPTISOL™). Commercial grades of lecithin which are preferred include those which are available under the trade name Phosal® or Phospholipon® and include Phosal 53 MCT, Phosal 50 PG, Phosal 75 SA, Phospholipon 90H, Phospholipon 90G and Phospholipon 90 NG; soy-phosphatidylcholine (SoyPC) and DSPE-PEG2000 are particularly preferred; buffering agents such as magnesium hydroxide and aluminum hydroxide; alginic acid; pyrogen-free water; isotonic saline; Ringer's solution; 5% dextrose solution and combinations with the foregoing aqueous solutions; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

The above-described compositions, in any of the forms described above, can be used for treating a disease or condition described herein. An effective amount refers to the amount of an active compound/agent that is required to confer a therapeutic effect on a treated subject. Effective doses will vary, as recognized by those skilled in the art, depending on the types of diseases treated, route of administration, excipient usage, and the possibility of co-usage with other therapeutic treatment. A pharmaceutical composition of this invention can be administered parenterally, orally, nasally, rectally, topically, or buccally. The term "parenteral" as used herein refers to subcutaneous, intracutaneous, intravenous, intramuscular, intraarticular, intraarterial, intrasynovial, intrasternal, intrathecal, intralesional, or intracranial injection, as well as any suitable infusion technique.

For use in the methods and compositions of the invention, the pharmaceutically acceptable psilocin salt, may be contained in any appropriate amount in any suitable carrier substance formulated for intravenous infusion and is generally present in an amount of 0.01-95% by weight of the total weight of the composition. In particular embodiments, the pharmaceutically acceptable psilocin salt is present in an amount of 0.01-5% by weight of the of the total weight of the composition. In some embodiments, an aqueous solution suitable for intravenous infusion including the pharmaceutically acceptable psilocin salt may be formulated in a saline solution. The formulation of infusions is well known to those skilled in the art of pharmaceutical formulation. Formulations can be found in Remington: The Science and Practice of Pharmacy ($23^{rd}$ ed.), ed. A. R. Gennaro, Lippincott Williams & Wilkins, 2000 and Encyclopedia of Pharmaceutical Technology, eds. J. Swarbrick and J. C. Boylan, 1988-1999, Marcel Dekker, New York). Compositions for infusion use may be provided in unit dosage forms (e.g., in single-dose ampoules), or in vials containing several doses and in which a suitable preservative may be added. The solution of the pharmaceutically acceptable psilocin salt suitable for intravenous infusion may have a pH of about 3 and about 9 (e.g., $3\pm1$, $4\pm1$, $5\pm1$, $6\pm1$, $7\pm1$, $8\pm1$, and $9\pm1$). Furthermore, the solution of the pharmaceutically acceptable psilocin salt suitable for intravenous infusion may include a concentration of the pharmaceutically acceptable psilocin salt between about 0.1 mg/mL and about 50 mg/mL (e.g., $0.1\pm0.1$ mg/mL, $0.2\pm0.1$ mg/mL, $0.3\pm0.1$ mg/mL, $0.4\pm0.1$ mg/mL, $0.5\pm0.5$ mg/mL, $1\pm0.5$ mg/mL, $2\pm1$ mg/mL, $3\pm1$ mg/mL, $4\pm1$ mg/mL, $5\pm1$ mg/mL, $6\pm1$ mg/mL, $7\pm1$ mg/mL, $8\pm1$ mg/mL, $9\pm1$ mg/mL, $10\pm1$ mg/mL, $11\pm1$ mg/mL, $12\pm1$ mg/mL, $13\pm1$ mg/mL, $14\pm1$ mg/mL, $15\pm1$ mg/mL, $16\pm1$ mg/mL, $17\pm1$ mg/mL, $18\pm1$ mg/mL, $19\pm1$ mg/mL, $25\pm5$ mg/mL, $30\pm5$ mg/mL, $35\pm5$ mg/mL, $40\pm5$ mg/mL, $45\pm5$ mg/mL, and $50\pm5$ mg/mL). In some embodiments, the aqueous solution has between about 1 mg/mL and about 15 mg/mL (e.g., $1\pm1$ mg/mL, $2\pm1$ mg/mL, $3\pm1$ mg/mL, $4\pm1$ mg/mL, $5\pm1$ mg/mL, $6\pm1$ mg/mL, $7\pm1$ mg/mL, $8\pm1$ mg/mL, $9\pm1$ mg/mL, $10\pm1$ mg/mL, $11\pm1$ mg/mL, $12\pm1$ mg/mL, $13\pm1$ mg/mL, $14\pm1$ mg/mL, and $15\pm1$ mg/mL) of any one of pharmaceutically acceptable salts of psilocin described herein. In particular embodiments, the aqueous solution has between about 0.1 mg/mL and about 1 mg/mL (e.g., $0.1\pm0.1$ mg/mL, $0.2\pm0.1$ mg/mL, $0.3\pm0.1$ mg/mL, $0.4\pm0.1$ mg/mL, $0.5\pm0.1$ mg/mL, $0.6\pm0.1$ mg/mL, $0.7\pm0.1$ mg/mL, $0.8\pm0.1$ mg/mL, $0.9\pm0.1$ mg/mL, and $1\pm0.1$ mg/mL) of any one of pharmaceutically acceptable salts of psilocin described herein.

A sterile injectable composition can be a solution or suspension in a non-toxic parenterally acceptable diluent or solvent. Such solutions include, but are not limited to, 1,3-butanediol, mannitol, water, Ringer's solution, and isotonic sodium chloride solution. In addition, fixed oils are conventionally employed as a solvent or suspending medium (e.g., synthetic mono- or diglycerides). Fatty acids, such as, but not limited to, oleic acid and its glyceride derivatives, are useful in the preparation of injectables, as are natural pharmaceutically acceptable oils, such as, but not limited to, olive oil or castor oil, or polyoxyethylated versions thereof. These oil solutions or suspensions also can contain a long chain alcohol diluent or dispersant such as, but not limited to, carboxymethyl cellulose, or similar dispersing agents. Other commonly used surfactants, such as, but not limited to, Tweens or Spans or other similar emulsifying agents or bioavailability enhancers, which are commonly used in the manufacture of pharmaceutically acceptable solid, liquid, or other dosage forms also can be used for the purpose of formulation.

A composition for oral administration can be any orally acceptable dosage form including capsules, tablets, emulsions and aqueous suspensions, dispersions, and solutions. In the case of tablets, commonly used excipients include, but are not limited to, lactose and corn starch. Lubricating agents, such as, but not limited to, magnesium stearate, also are typically added. For oral administration in a capsule form, useful diluents include, but are not limited to, lactose and dried corn starch. When aqueous suspensions or emulsions are administered orally, the active ingredient can be suspended or dissolved in an oily phase combined with emulsifying or suspending agents. If desired, certain sweetening, flavoring, or coloring agents can be added.

The above-described compositions, in any of the forms described above, may be stored in a light impenetrable container. For the example, the compositions described herein may be contained in an amber bottle.

EXAMPLES

The following examples are put forth so as to provide those of ordinary skill in the art with a complete disclosure and description of how the methods and compounds claimed herein are performed, made, and evaluated, and are intended to be purely exemplary of the invention and are not intended to limit the scope of what the inventors regard as their invention.

Example 1. Salt Screens

In three solvent systems, dissolved psilocin was separately combined with 24 organic and inorganic acids, see Table 1.

TABLE 1

List of acids used in psilocin salt screen

| # | Acid |
|---|------|
| 1 | Hydrobromic acid |
| 2 | Hydrochloric acid |
| 3 | 1-5-Naphthalene disulphonic acid |
| 4 | Sulphuric acid |
| 5 | p-Toluene sulphonic acid |
| 6 | Methane sulphonic acid |
| 7 | Oxalic acid |
| 8 | Maleic acid |
| 9 | Phosphoric acid |
| 10 | Ketoglutaric acid |
| 11 | L-Tartaric acid |
| 12 | Fumaric acid |
| 13 | Citric acid |
| 14 | L-Malic acid |
| 15 | D-Gluconic acid, 50% in water |
| 16 | Benzoic acid |
| 17 | Succinic acid |
| 18 | Acetic acid |
| 19 | Nicotinic acid |
| 20 | Propionic acid |
| 21 | Pamoic Acid |
| 22 | Adipic Acid |
| 23 | Oleic Acid |
| 24 | Salicylic Acid |

Some combinations did not afford a solid product even after cooling or counter solvent addition. Other combinations produced crystals which were analyzed by X-Ray Powder Diffraction (XPRD). XRPD diffractograms were collected on a Bruker D8 diffractometer using Cu Kα radiation (π=1.54° A, 40 kV, 40 mA) and a θ-2θ goniometer fitted with a Ge monochromator. The incident beam passes through a 2.0 mm divergence slit followed by a 0.2 mm anti-scatter slit and knife edge. The diffracted beam passes through an 8.0 mm receiving slit with 2.5° Soller slits followed by the Lynxeye Detector. The software used for data collection and analysis was Diffrac Plus XRD Commander and Diffrac Plus EVA respectively. Samples were run under ambient conditions as flat plate specimens using powder as received. The sample was prepared on a polished, zero-background (510) silicon wafer by gently pressing onto the flat surface or packed into a cut cavity. The sample was rotated in its own plane. The details of the standard data collection methods are: (i) angular range: 2 to 42° 2θ; (ii) step size: 0.05° 2θ; and (iii) collection time: 0.5 s/step (total collection time: 6.40 min).

Crystalline material with a novel XRPD pattern was isolated from experiments with 13 of the counterions and their properties assessed. Psilocin acetate (ACE) Pattern 2, psilocin adipate (ADI) Pattern 1, ADI Pattern 2, psilocin fumarate (FUM) Pattern 1, FUM Pattern 2, psilocin 1,5-napthalenedisulfonate (NAP Pattern 2), psilocin oxalate (OX) Pattern 1, OX Pattern 2, psilocin phosphonate (PHO) Pattern 1, PHO Pattern 2, psilocin propionate (PRO) Pattern 1, psilocin succinate (SUC) Pattern 1, SUC Pattern 2, psilocin salicylate (SAL) Pattern 1, SAL Pattern 2 were shown to convert or partially convert to a new XRPD pattern after storage at 40° C./75% relative humidity for 7 days, indicating that these salt forms are not stable. For this reason, these patterns were dismissed. The thermal data for psilocin pamoate (PAM) Pattern 1 showed large mass losses in the TGA and a number of endothermic events in the DSC, making it undesirable to take forward. A limited number of combinations did provide a solid product, which were evaluated further for stability (HPLC), crystallinity (XRPD), and counter ion stoichiometry (NMR) and polymorphic forms and stability (XRPD). From this screening only three psilocin/acid combinations were deemed worthy of scale up and more detailed evaluation.

Screens of various psilocin salts were completed in acetone, 2-methyltetrahydrofuran and ethanol:H$_2$O (9:1) generating 22 crystalline forms which were characterized using X-ray Powder Diffraction (XRPD), high pressure liquid chromatography (HPLC), 1H-NMR, Thermogravimetric analysis/Differential scanning calorimetry (TGA/

DSC), and were also assessed after static storage for 7 days at 40° C. and 75% relative humidity using XRPD and HPLC, the results of which are summarized in Table 2. The samples that were stored at 40° C. and 75% relative humidity were denoted with the numbers 40-75 after the sample number. Solid state stability, enhancement of purity upon crystallization, minimum polymorphic forms, lack of hydrates, alcoholates or solvent inclusion as well as solubility of the salt in physiological saline were identified as a key parameters for selection of the most preferred salt forms; as such, small scale-up experiments on 7 salts were carried out to allow for the collection of solubility data, see Example 2.

The salt screen was performed by adding the appropriate counterion, either as a solution or as a solid, to a solution of psilocin free base in the appropriate solvent system at room temperature. This was then stirred at room temperature for 1 hour before cooling to 5° C. and stirring at 5° C. overnight. If a solid was isolated at this point, then in was separated by filtration. If a solution or gum was isolated at this point, further treatment was carried out as required by addition of a further 0.5 molar equivalents of the counterion, temperature cycling between 5 and 25° C., and/or addition of an antisolvent.

TABLE 2

Characteristics of Isolated Solids of Psilocin Salts

Figure 2:
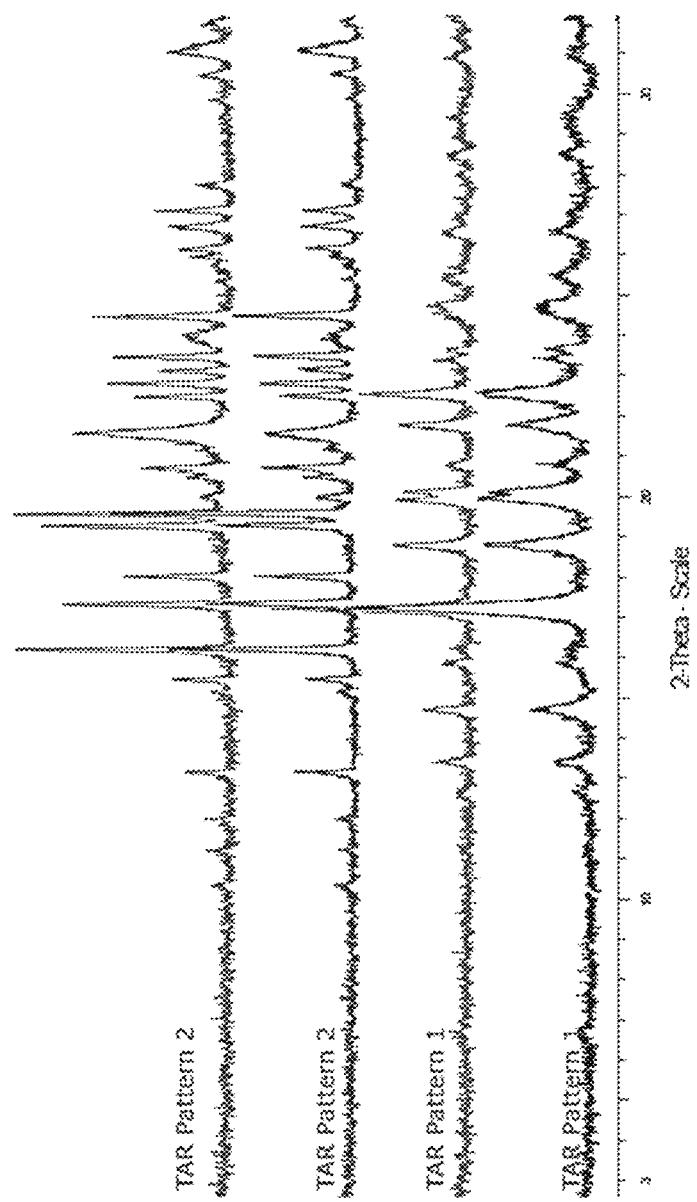
FIG. 2 shows the XRPD patterns of L-tartaric acid psilocin salts having TAR Pattern 1 or TAR Pattern 2.
Figure 3:
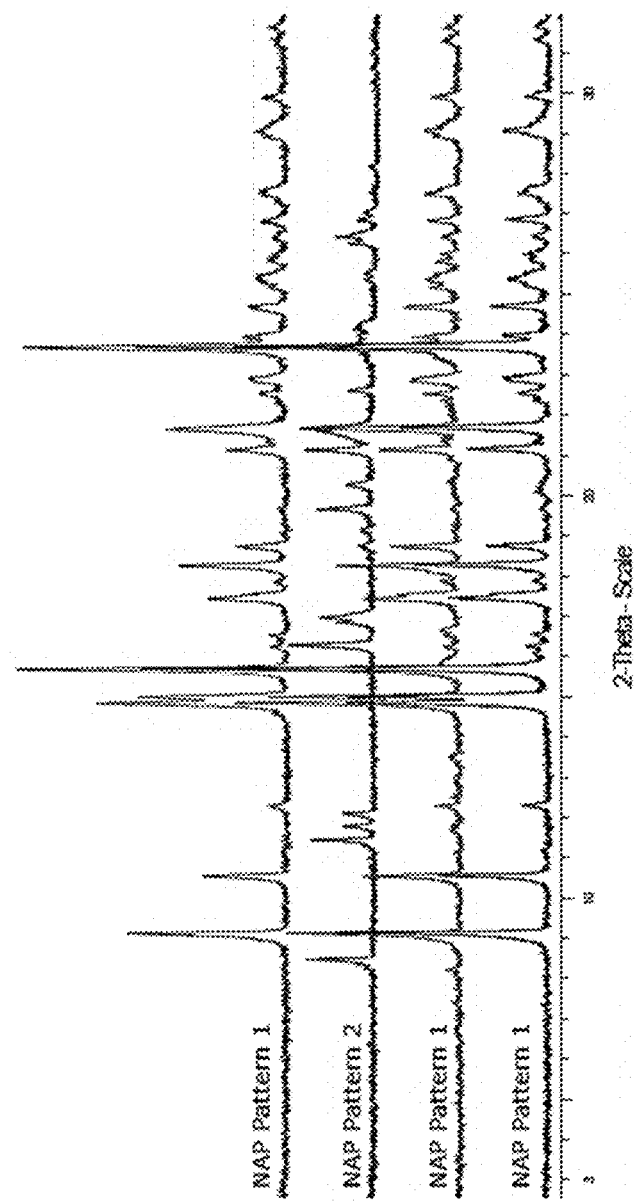
FIG. 3 shows the XRPD patterns of 1,5-naphthalenedisulfonic acid psilocin salts having NAP Pattern 1 or NAP Pattern 2.

| Sample | XRPD | HPLC | $^1$H-NMR | Thermal (TGA/DSC) | Static Storage 40° C./75% RH |
|---|---|---|---|---|---|
| Psilocin succinate | SUC Pattern 1 (FIG. 1) | 99.5% | 0.5 mole eq. of succinate, i.e., dicarboxylate. 0.16 mole eq. of acetone. | 0.8% mass loss from 40-85° C. A second mass loss event from 85-115° C. equating to 6.6% mass lost. This event is concurrent with an endotherm in the DSC, onset 93.8° C. (26 J/g). Large sharp endotherm, onset 183.5° C. (125 J/g) 7.4% mass loss may be 0.16 mol eq. acetone and 0.65 mole eq. water | XRPD - SUC Pattern 3 HPLC - 99.3% |
| Psilocin acetate | ACE Pattern 1 | 98.5% | Poor spectrum (not enough sample). Ca. 1 mol eq. of acetic acid. Ca. 0.3 mol eq. of acetone. Extra peak at 6.51 ppm. | Insufficient Sample | XRPD - ACE Pattern 1 + extra peaks (small amount of sample). HPLC - 75.2% |
| Psilocin phosphate | PHO Pattern 1 (poorly crystalline) | 96.9% | Consistent with structure. 0.17 mol eq. of 2-MeTHF. | Gradual mass loss of 10.8% from 45-200° C. DSC contains a number of endotherms, onset 74.7° C. (2 J/g), broad event between 105-140° C. (32 J/g). There are two sharp endotherms at 100° C. and 206° C. that resemble artifacts. (small sample size) 10.8% mass loss = 0.17 mol eq. 2-MeTHF and 1.22 mol eq. of water | XRPD - PHO Pattern 2 (possible preferred orientation) HPLC - 93.9% |
| Psilocin tartrate | TAR Pattern 1 (FIG. 2) | 98.5% | 1.07 mol eq. of tartrate. 0.17 mol eq. 2-MeTHF and possibly 0.09 mol eq. of THF | 0.6% mass loss between 30-95° C. An additional 4.4% is lost from 95-160° C. and is followed by a endotherm in the DSC, onset 161.9° C. (90 J/g). 5.0% mass loss may be loss of 0.17 mol eq. 2-MeTHF and 0.06 mol eq. THF | XRPD - TAR Pattern 1 HPLC - 96.3% |
| Psilocin 1,5-napthalene-disulfonate | NAP Pattern 2 (FIG. 3) | 99.4% | Consistent with structure (one psilocin CH$_2$ signal possibly overlapping with water peak). 0.5 mol eq. of counterion. 0.73 mol eq. ethanol. | 0.8% mass lost between 25-75° C. and a second event between 75-110° C. equating to 7.1% mass lost. Endotherm in the DSC, onset 82.4° C. (73 J/g). Endotherm onset 124.3° C. (17 J/g). Small broad endotherm, onset 197.1° C. (2 J/g). Finally, there is a large sharp endotherm with an onset at 252.7° C. (72 J/g). 7.9% mass loss may be loss of 0.73 mol eq. ethanol and, 0.48 mol eq. water. | XRPD - NAP Pattern 1 (FIG. 3) HPLC - 99.2% |
| Psilocin tartrate | TAR Pattern 2 (FIG. 2, second scan from top) | 97.9% | Consistent with structure. 1.1 mol eq. of tartrate. 0.03 mole eq. ethanol | Mass loss of 4.1% from 40-95° C. accompanied by a broad endotherm in the DSC, onset 41.2° C. (85 J/g). There is a small endotherm at 125.6° C. (9 J/g) and a large sharp endotherm at 165.9° C. (72 J/g). 4.1% mass loss may be loss of 0.84 mol eq. of water | XRPD - TAR Pattern 2 (FIG. 2) HPLC - 98.0% |
| Psilocin oxalate | OX Pattern 1 | 96.8% | 0.3 mol eq. Acetone. 0.1 mol eq. THF. 0.7 mole eq. oxalate by IC | Insufficient Sample | XRPD OX Pattern 3 HPLC- 94.4% |
| Psilocin oxalate | OX Pattern 2 | 95.5% | 0.26 mol eq. 2-MeTHF. 0.95 mole eq. oxalate by IC. | 8.4% mass loss over two events. May be loss of 2-MeTHF and water. A number of events in DSC. | XRPD- OX Pattern 3 + extra peaks HPLC- 97.1% |

TABLE 2-continued

Characteristics of Isolated Solids of Psilocin Salts

| Sample | XRPD | HPLC | ¹H-NMR | Thermal (TGA/DSC) | Static Storage 40° C./75% RH |
|---|---|---|---|---|---|
| Psilocin tartrate | TAR Pattern 1 + TAR Pattern 2 | 96.4% | 1.1 mol eq. of tartrate. 0.03 mole eq. ethanol | 1.2% mass loss between room temperature and 170° C. Small endotherm 125° C. (2 J/g). Sharp endotherm onset 150° C. | XRPD- TAR Pattern 1 + TAR Pattern 2 HPLC- 97.0% |
| Psilocin fumarate | FUM Pattern 1 | 98.9% | 0.5 mol eq. fumarate. 0.26 mol eq. acetone | 8.3% mass loss between 100 and 140° C., Endotherm onset 119.9° C. (69 J/g). | XRPD- FUM Pattern 3 HPLC- 99.3% |
| Psilocin fumarate | FUM Pattern 1 | 98.3% | 0.5 mol eq. fumarate. 0.52 mol eq. of 2-MeTHF. | 13.2% mass loss from 80-165° C. which may be loss of 2-MeTHF | XRPD- FUM Pattern 4 HPLC- 98.3% |
| Psilocin benzoate | BEN Pattern 1 | 98.8% | 1 mol eq. of benzoate. 0.03 mol eq. of acetone | 1.0% mass loss 125-180° C. Small endotherm, onset 126.4° C. (9 J/g). | XRPD- BEN Pattern 1 HPLC- 99.0% |
| Psilocin succinate | SUC Pattern 2 (FIG. 1) | 98.7% | 0.5 mol eq. of succinate (dicarboxylate). 0.46 mol eq. of 2-MeTHF. | 13.7% mass loss over two events. Number of events in DSC | XRPD- SUC Pattern 3 HPLC- 98.8% |
| Psilocin propionate | PRO Pattern 1 | 99.4% | 1 mol eq. propionate | Insufficient Sample | XRPD- PRO Pattern 1 + very small amount of PRO Pattern 3 HPLC- 99.4% |
| Psilocin pamoate | PAM Pattern 1 | 99.2% | 1 mol eq. pamoate. 2.5 mol eq. of DMSO | 15.8% mass loss from 25-140° C. 17.8% mass loss from 150-260° C. Both with associated endotherms in the DSC. | XRPD- PAM Pattern 1 HPLC- 99.6% |
| Psilocin adipate | ADI Pattern 1 | 98.6% | 0.55 mol eq. of adipate. 0.32 mol eq. of THF. 0.07 mol eq. of acetone | 4.5% mass loss from 70-125° C. 4.7% mass loss from 145-180° C. Decomp onset at ca. 215° C. A number of endothermic events in DSC. | XRPD- ADI Pattern 1 + extra peaks. HPLC- 98.4% |
| Psilocin adipate | ADI Pattern 2 | 98.1% | 0.54 mol eq. of adipate. 0.27 mol eq. 2-MeTHF. 0.17 mol eq. THF. | 10.1% mass loss attributed to the THF and 2-MeTHF. A number of endothermic events in DSC. | XRPD- ADI Pattern 3 HPLC- 98.1% |
| Psilocin salicylate | SAL Pattern 1 | 98.9% | 1 mol eq. of salicylic acid. 0.01 mol eq. of acetone. | 1.5% mass loss from 110-185° C., leading into degradation. The DSC contains three endotherms. Onsets at 124.4° C., 153.7° C. and 178.5° C. with energies of 27 J/g, 24 J/g, and 64 J/g respectively. | XRPD- SAL Pattern 1 + extra peak (21.5°) HPLC- 99.1% |
| Psilocin salicylate | SAL Pattern 2 | 99.4% | 0.87 mol eq. salicylate. | No mass loss until degradation | XRPD- SAL Pattern 2 + extra peak 21.5° HPLC- 99.8% |
| Psilocin 1,5-napthalene-disulfonate | NAP Pattern 1 (FIG. 3) | 97.2% | Consistent with structure. 0.6 mole eq. of counterion | Total 2.4% mass loss, 0.5 mol eq. water. A number of endothermic events in DSC. | XRPD- NAP Pattern 1 HPLC- 97.2% |
| Psilocin acetate | ACE Pattern 2 | 98.8% | 1 mol eq. of acetate | Insufficient Sample | XRPD- ACE Pattern 3 HPLC- 83.4% |

The psilocin benzoate, psilocin succinate, and psilocin tartrate salts were all investigated in their anhydrous forms.

The psilocin benzoate salt having the BEN Pattern 1 exhibited the lowest solubility and intrinsic dissolution rate (IDR) of the three forms but was still significant and pharmaceutically consistent. The psilocin benzoate salt having the BEN Pattern 1 also had a substantial increase with respect to solubility and IDR over the free base form. The psilocin benzoate having the BEN Pattern 1 was shown to be stable, exhibited no polymorphism, and was non-hygroscopic (Table 3).

The psilocin succinate salt having the SUC Pattern 3 the highest IDR as well as high solubility. This form was a hemi-salt and was stable to static storage. The material was hygroscopic (2.1% reversible mass change between 0-90% RH), however, this did not appear to result in a change of form and most of the water uptake occurred between 80% and 90% RH.

The psilocin tartrate salt having the TAR Pattern 1 contained some residual solvent which was removed by storage at 40° C./75% RH. It had a high solubility and the second highest IDR. It converted to TAR Pattern 3 under storage at 25° C./97%.

A summary of the characteristics of the psilocin salts is provided in Table 4.

TABLE 3

Stability of Psilocin Salts over time

|  | As Synthesized | 1 Weeks | 3 Weeks |
|---|---|---|---|
| Static Storage 40° C./75% RH | | | |
| TAR Pattern 1 | 97.2% | 96.6% | 96.6% |
| SUC Pattern 3 | 99.3% | 98.8% | 96.2% (material is brown) |
| BEN Pattern 1 | 99.3% | 99.3% | 99.3% |
| Static Storage 25° C./97% RH | | | |
| TAR Pattern 1 | 97.2% | 96.7% (form changed to TAR Pattern 3) | 95.9% (form changed to TAR Pattern 3) |
| SUC Pattern 3 | 99.3% | 98.7% | 91.7% (material is brown) |
| BEN Pattern 1 | 99.3% | 99.3% | 99.3% |

TABLE 4

Summary Characterization of Psilocin Salts

| Characterization | TAR Pattern 1 | SUC Pattern 3 | BEN Pattern 1 |
|---|---|---|---|
| Polymorphism | 4 Observed Patterns | 5 Observed Patterns | 1 Observed patter |
| Solubility in Saline | 64 mg/mL | >27 mg/mL | 5.0 mg/mL |
| IDR (mg/min/cm2) [Freeform = 0.09] | 6.9 | 12.4 | 0.4 |
| $^1$H-NMR | 1 mole equivalent of tartrate. 0.1 mole equivalents of residual 2-MeTHF and ca. 0.02 of THF. | 0.5 mole equivalents of succinate. <0.01 mole equivalents of acetone | 1 mole equivalents of benzoate. 0.07 mole equivalents of 2-MeTHF and 0.015 mole equivalents of IPA |
| Thermal Data | 2.4% mass loss between 110-165° C. attributed to loss of trapped solvent upon melting of the material, decomposition onset after 165° C. (0.1 mole equivalent of 2-MeTHF = 2.4% mass loss). Large melt endotherm, onset 162.3° C. (103 J/g) | No mass loss until decomposition. sharp endotherm, onset 186.9° C. (123 J/) | No mass loss until Large decomposition, starting from 200° C. DSC contains one large endotherm, onset 238.4° C. (178 J/g), likely melt based on HSM data |
| GVS | Reversible 1.4% mass change between 0-90% RH with no hysteresis. Slightly Hygroscopic | A reversible 2.1% mass change between 0 90% RH with no hysteresis. Only 1.0% mass change between 0 and 80% RH. | Reversible 0.25% mass change between 0-90% RH. Non-hygroscopic. |
| HPLC Purity | 97.2% | 99.3% | 99.3% |
| Static Storage | Converted to TAR Pattern 3 at 25° C., 97% RH. Slight drop in purity at 25° C./97% RH. | Form is stable. HPLC shows substantial drop in purity after 3 weeks, particularly at 25° C./97% RH | Form is stable. No drop in purity. |
| Further Comments | Residual solvent can be removed by storage at 40° C., 75% RH with some water being picked up as well. | | Small endotherm seen in DSC on initial analysis is no longer present. |

Example 2. 100 mg Scale Up for Solubility Assessment

Procedures were adapted from the small scale screen from which each target solid was obtained and characterized using XRPD, $^1$H-NMR, and HPLC as shown in Table 5. The solvents used were purged with $N_2$ for at least 30 minutes prior to use. Obtained solids were dried in a vacuum oven at room temperature for 2 hours.

Psilocin salicylate was made by combining a 100 mg of psilocin free base in a 4 mL vial with 30 volumes of acetone at 25° C. To this solution, 1.1 molar equivalents of salicylic acid (1 M in THF) was added. The crystallization was performed by cooling the solution to 5° C. at a rate of 0.25° C./min and held 5° C. for 2 hours at which point an additional 0.5 mole equivalents of salicylic acid was added. The crystallization solution was held at 5° C. for another 10 hours, after which, 10 volumes of heptane were added to the clear solution and stirring was continued for a further 24 hours. The white suspension was isolated using positive pressure using a fritted filter cartridge and resulted in a yield of 86.38 mg.

Psilocin succinate was made by combining 100 mg of psilocin free base in a 4 mL vial and with 30 volumes of acetone at 25° C. To this solution, 1.1 molar equivalents of succinic acid (1 M in methanol) was added. The crystallization was performed by cooling the solution to 5° C. at a rate of 0.25° C./min and holding at this temperature for 12 hours. The white suspension was isolated using positive pressure using a fritted filter cartridge and resulted in a yield of 89.96 mg.

Psilocin tartrate was made by combining 100 mg of psilocin free base in a 4 mL vial with 30 volumes of 2-methyltetrahydrofuran at 25° C. To this solution, 1.1 molar equivalents of L-tartaric acid (1 M in THF) was added. The crystallization was performed by cooling the solution to 5° C. at a rate of 0.25° C./min and holding at this temperature for 12 hours. The off-white suspension was isolated using positive pressure using a fritted filter cartridge and resulted in a yield of 160.30 mg Psilocin 1,5-napthalenedisulfonate was made by combining 100 mg of psilocin free base in a 4 mL vial with 30 volumes of 2-methyltetrahydrofuran at 25° C. To this solution, 1.1 molar equivalents of 1,5-naphthalenedisulfonic acid (1 M in THF) was added. The crystallization was performed by cooling the solution to 5° C. at a rate of 0.25° C./min and holding at this temperature for 12 hours. The white suspension was isolated using positive pressure using a fritted filter cartridge and resulted in a yield of 154.37 mg.

Psilocin salicylate was made by combining 100 mg of psilocin free base in a 4 mL vial with 30 volumes of 2-methyltetrahydrofuran at 25° C. To this solution, 1.1 molar equivalents of salicylic acid (1 M in THF) was added. The crystallization was performed by cooling the solution to 5° C. at a rate of 0.25° C./min, after which crystallization had occurred so no further salicylic acid was added. The crystallization was held further at 5° C. for 12 hours. The white suspension was isolated using positive pressure using a fritted filter cartridge and resulted in a yield of 101.99 mg.

Psilocin benzoate was made by combining 100 mg of psilocin free base in a 20 mL vial with 30 volumes of 2-methylhydrofuran at 25° C. To this solution, 1.1 molar equivalents of benzoic acid (0.5M in isopropyl alcohol) was added. The crystallization was then performed by cooling the solution to 5° C. at 0.25° C./min and holding at this temperature for 12 hours. The white suspension was isolated using positive pressure using a fritted filter cartridge and resulted in a yield of 135.81 mg.

Psilocin tartrate was made by combining 100 mg psilocin free base in a 20 mL vial with 40 volumes of EtOH:water (9:1) at 25° C. To this solution, 1.1 molar equivalents of L-tartaric acid (1 M in tetrahydrofuran). The crystallization was performed by cooling the solution to 5° C. at a rate of 0.25° C./min and holding at this temperature for 12 hours. The white suspension was isolated using positive pressure using a fritted filter cartridge and resulted in a yield of 103.67 mg.

Psilocin hydrochloride was made by combining 100 mg of psilocin free base in a 20 mL vial with 40 volumes of acetonitrile at 25° C. To this solution, 1.1 molar equivalents of hydrochloride (1 M in tetrahydrofuran) was added. The crystallization was performed by cooling the solution to 5° C. at a rate of 0.25° C./min at which point 10 volumes of methyl tert-butyl ether was added and the reaction was stirred for a further 12 hours at 5° C. There was only a small amount of brown material on vial wall so a further 5 volumes of methyl tert-butyl ether were added and the crystallization solution and stirred at 5° C. for 72 hours. The off-white material crystallized on the vial-solvent interface and was knocked off before being isolated using positive pressure using a fritted filter cartridge and resulted in a yield of 32.51 mg.

A second crop of light tan material was obtained by adding 25 volumes of methyl tert-butyl ether, a small amount of seed material, and 0.55 molar equivalents of hydrochloride (1M in tetrahydrofuran) and stirred at 5° C. for 72 hours and resulted in a yield of 20-30 mg. The results of which are summarized in Table 6.

TABLE 5

Salt characterization of psilocin salts after 100 mg scale up

Figure 4:
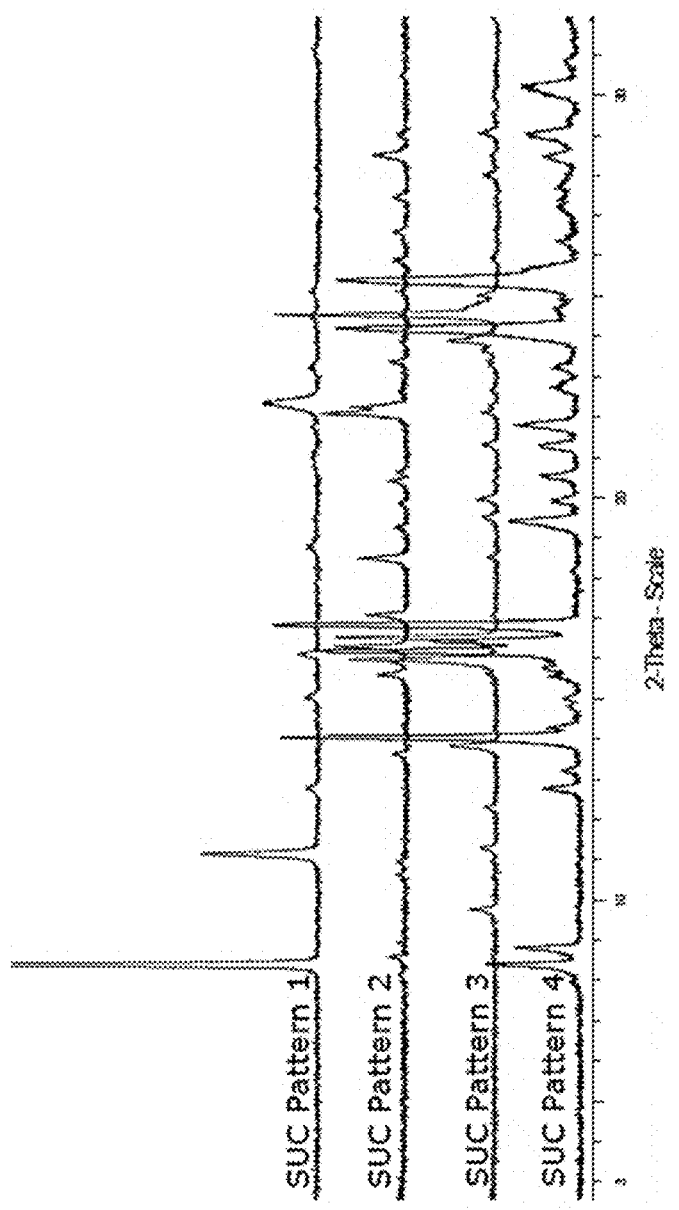
FIG. 4 shows the XRPD pattern of psilocin succinate having SUC Pattern 4 (bottom scan).
Figure 6:
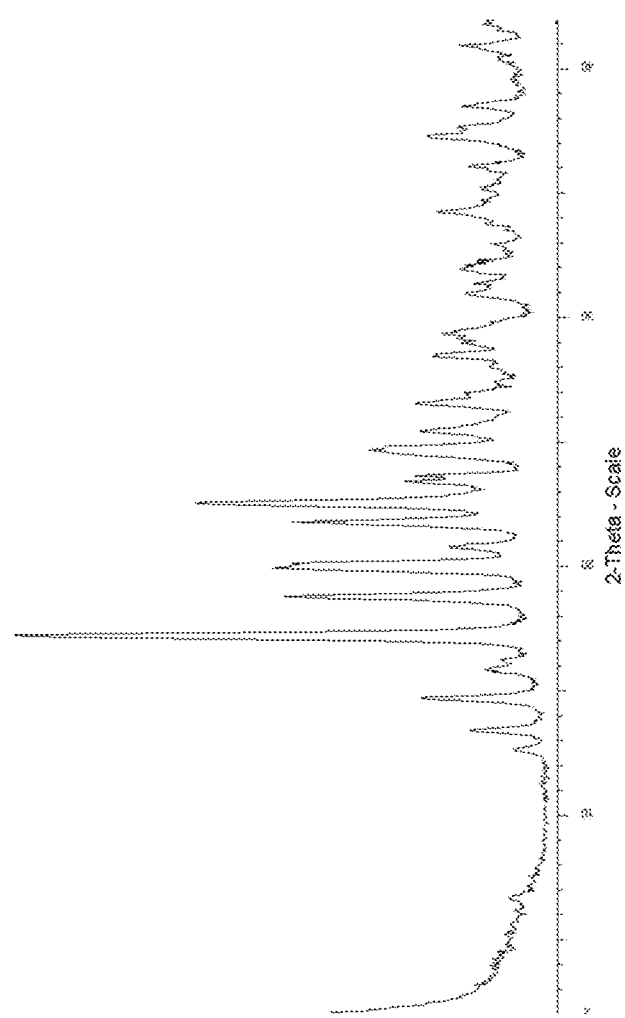
FIG. 6 shows the XRPD of the TAR Pattern 1 from psilocin tartrate crystalline solid.
Figure 7:
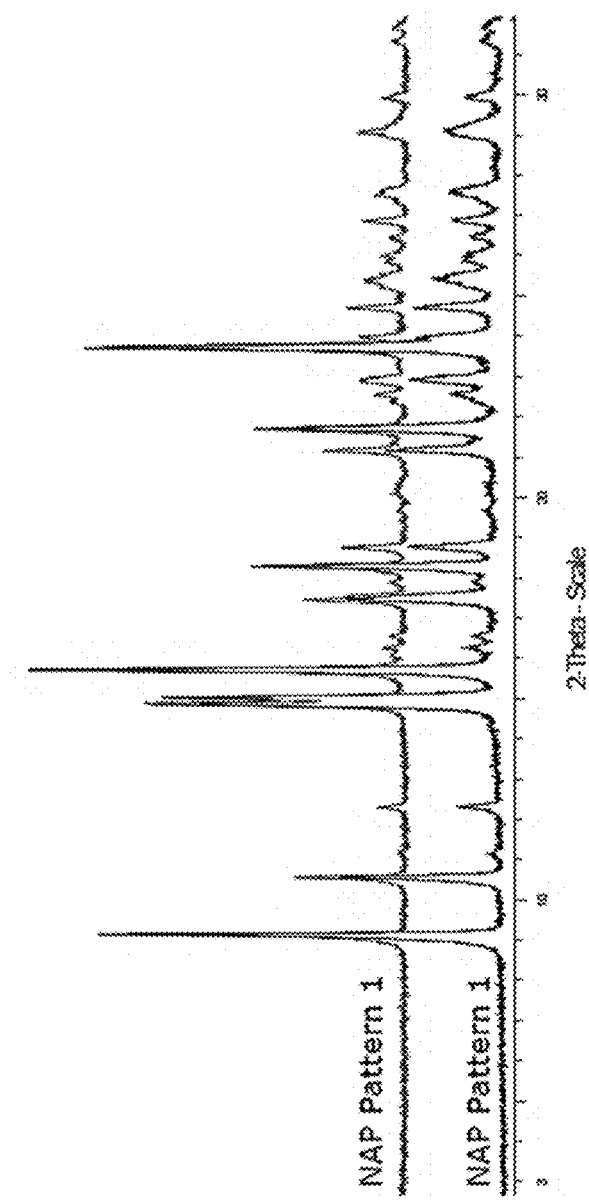
FIG. 7 shows the XRPD pattern of NAP Pattern 1 from psilocin 1,5-naphthalenedisulfonate (bottom scan).
Figure 8:
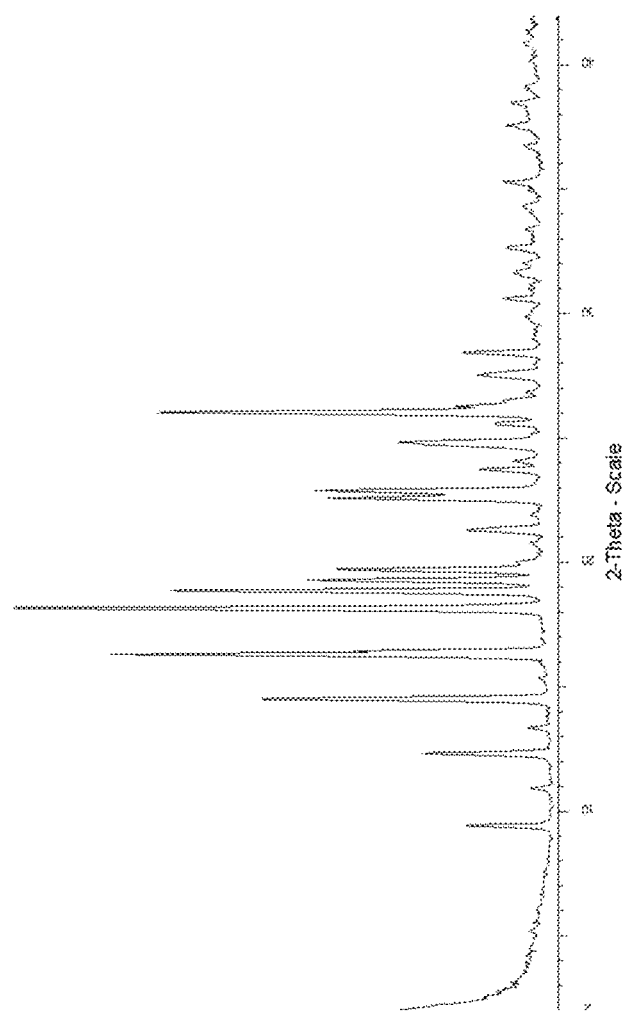
FIG. 8 shows the XRPD of the BEN Pattern 1 from psilocin benzoate crystalline solid.
Figure 9:
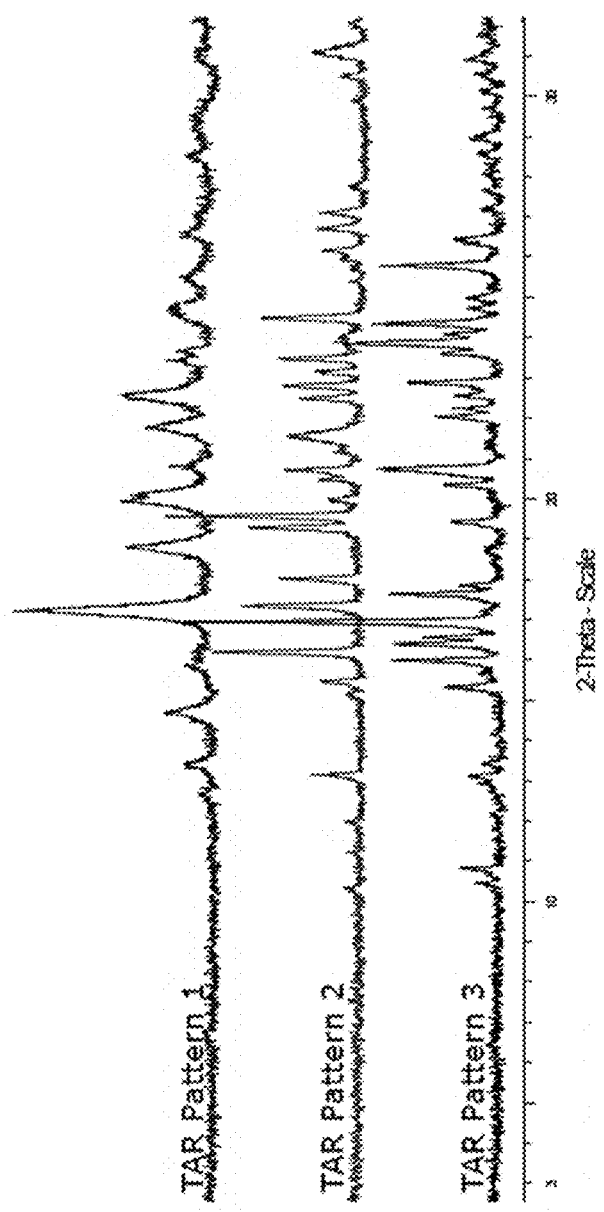
FIG. 9 shows the XRPD pattern of TAR Pattern 3 from psilocin tartrate (bottom scan).

| Salt | Target | XRPD | ¹H-NMR | HPLC Purity |
|---|---|---|---|---|
| Psilocin salicylate | SAL Pattern 1 | SAL Pattern 1*** | Consistent with structure. 1 mol eq. salicylic acid. 0.02 mol eq. acetone | 99.2% |
| Psilocin succinate | SUC Pattern 1 | SUC Pattern 4** (FIG. 4) | Consistent with structure. 0.5 mol eq. of succinate. 0.41 mol eq. of acetone | 99.1% |
| Psilocin tartrate | TAR Pattern 1 | TAR Pattern 1*** (FIG. 6) | Consistent with structure. 1 mol eq. L-tartrate. 0.04 mol eq. 2-MeTHF | 96.7% |
| Psilocin 1,5-napthalene-disulfonate | NAP Pattern 1 | NAP Pattern 1*** (FIG. 7) | Consistent with structure. 0.7 mol eq. of counter ion. 0.12 mol eq. 2-MeTHF. | 97.4% |
| Psilocin salicylate | SAL Pattern 2 | SAL Pattern 1* | Consistent with structure. 1 mol eq. salicylic acid. | 99.0% |
| Psilocin benzoate | BEN Pattern 1 | BEN Pattern 1*** (FIG. 8) | Consistent with structure. 1 mol eq. benzoic acid. 0.07 and 0.02 mol eq. 2-MeTHF and IPA respectively | 99.4% |
| Psilocin tartrate | TAR Pattern 2 | TAR Pattern 3** (FIG. 9) | Consistent with structure. 1 mol eq. of tartrate. 0.03 mol eq. of ethanol | 98.3% |

*Previously characterized form
**Uncharacterized form
***Target form crystallized

TABLE 6

Characterization of psilocin salt solids

| | Psilocin succinate | Psilocin tartrate |
|---|---|---|
| XRPD | SUC Pattern 4 (FIG. 4) | TAR Pattern 3 (FIG. 9) |
| HPLC | 99.1% | 98.3% |
| ¹H-NMR | Consistent with structure. 0.5 mol eq. of succinate. 0.61 mol eq. of acetone | Consistent with structure. 1 mol eq. of tartrate. 0.03 mol eq. of ethanol |
| Thermal (TGA/DSC) | 8.9% mass loss over 2 events. (8.9% = 0.61 mol eq. acetone). DSC contains two endotherms associated with the | Mass loss of 4.4 wt. % (0.91 mol eq. water) associated with a broad endotherm in the DSC, onset 56.6° C. |

TABLE 6-continued

Characterization of psilocin salt solids

Figure 5:
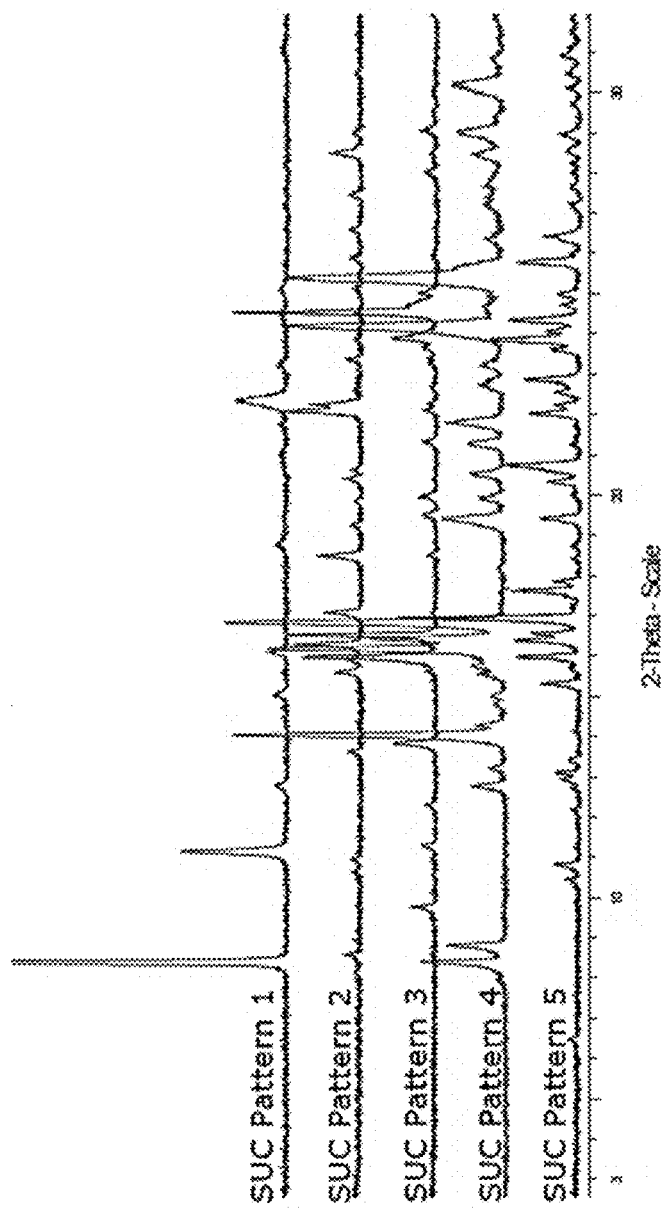
FIG. 5 shows the XRPD pattern of psilocin succinate after 7 days of static storage at 40° C. and 75% relative humidity having SUC Pattern 5 (bottom scan).
Figure 10:
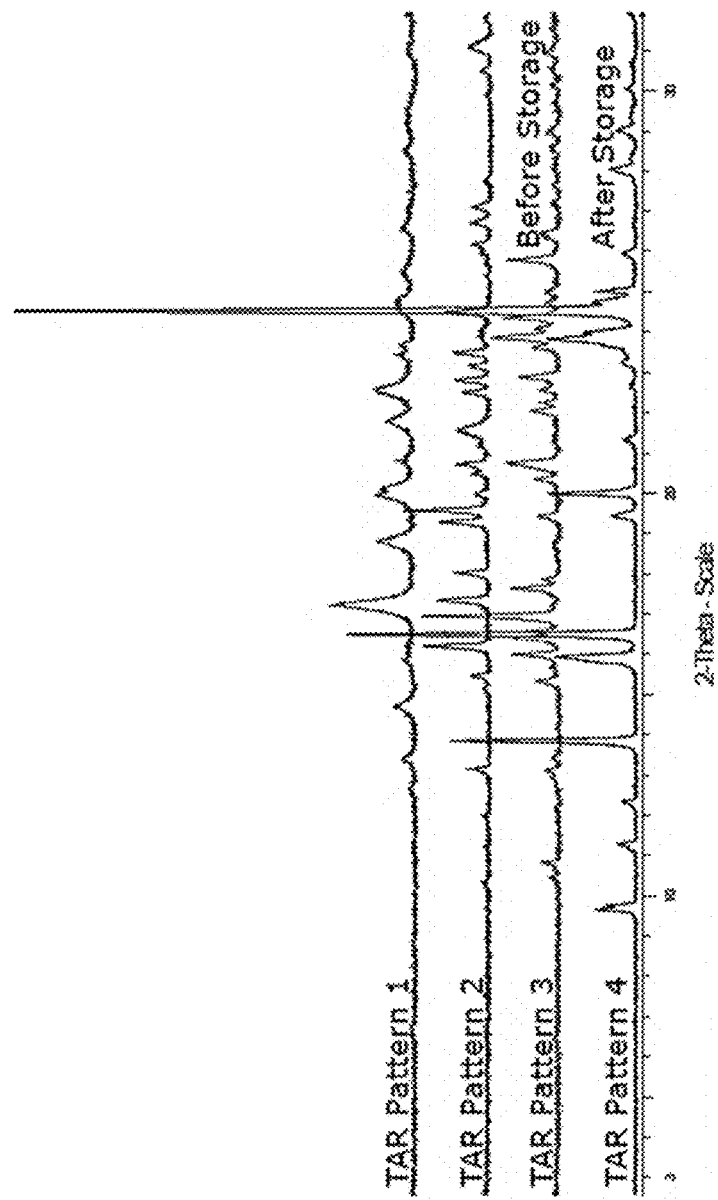
FIG. 10 shows the XRPD pattern of TAR Pattern 4 from psilocin tartrate (bottom scan) after static storage at 40° C. and a relative humidity of 75%.

| | Psilocin succinate | Psilocin tartrate |
|---|---|---|
| | mass loss events, onset 89.3° C. (26 J/g) and 112.7° C. (56 J/g) respectively. There is a third large sharp endotherm, onset 181.3° C. (81 J/g) after which decomposition starts. | (106 J/g). Large sharp endotherm, onset 168.0° C. (125 J/g). |
| Static Storage 40° C./75% RH | XRPD - SUC Pattern 5 (FIG. 5) HPLC - 99.4% | XRPD - TAR Pattern 4 (FIG. 10) HPLC - 99.3% |

A second attempt at 100 mg scale-up for the solubility assessment was made; the results of which are summarized in Tables 7 and 8. These attempts were made as the first attempt did not give the target form (Table 5). Psilocin succinate was made in a 20 mL vial using 100 mg of psilocin free base which was dissolved in 30 volumes of acetone at 25° C. To this solution, 1.1 molar equivalents of succinic acid (1M in THF) was added. The crystallization solution was then cooled to 5° C. at a rate of 0.25° C./min giving a white suspension. To this suspension, a further 0.55 molar equivalents of succinic acid was added. The suspension was stirred for 12 hours at 5° C. The resulting white suspension was isolated using positive pressure using a fritted filter cartridge resulting in a yield of 65.8 mg.

Psilocin salicylate was made in a 20 mL vial by adding 100 mg of psilocin free base was dissolved in 30 volumes of 2-MeTHF at 25° C. To this solution, 1.1 molar equivalents of salicylic acid (1 M in THF) was added. The crystallization solution was then cooled to 5° C. at a rate of 0.25° C./min. At 23° C., the crystallization started to look hazy, and about 2 mg of seed material was added. Desupersaturation to a thick white suspension was observed. At 5° C. an additional 0.55 molar equivalent of salicylic acid was added, and the crystallization solution was held at 5° C. for 12 hours. The white suspension was isolated using positive pressure using a fritted filter cartridge, which resulted in a yield of 90.35 mg.

Psilocin tartrate was made in a 20 mL vial by adding 100 mg of psilocin free base which was dissolved in 40 volumes of EtOH:water (9:1) at 25° C. To this solution, 1.1 molar equivalents of L-tartaric acid (1M in THF) was added. About 2 mg of seed material was added, sustained along with mild desupersaturation. The crystallization solution was cooled to 5° C. at a rate of 0.25° C./min and held there for 12 hours. The white suspension was isolated using positive pressure using a fritted filter cartridge, and resulted in a yield of 107.18 mg.

TABLE 7

Characterization of psilocin salts after 100 mg scale up 2$^{nd}$ attempt

Figure 12:
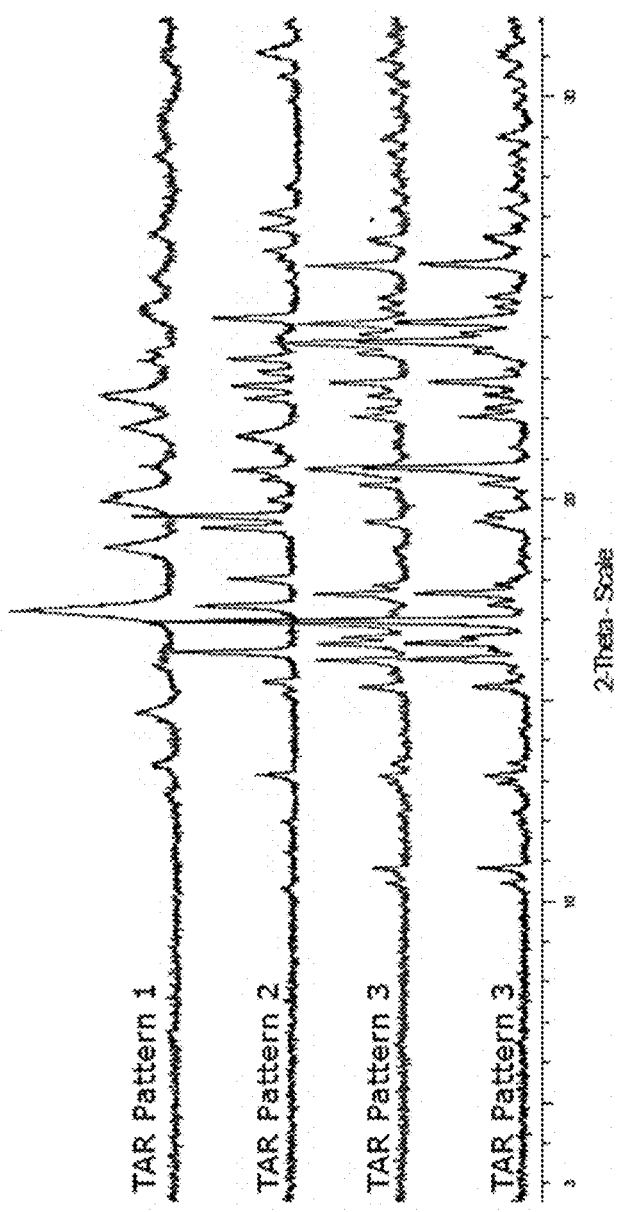
FIG. 12 shows the XRPD of psilocin tartrate with TAR Pattern 3 made using seed material from a psilocin salt having TAR Pattern 2 (bottom scan).

| | Target | XRPD | $^1$H-NMR | HPLC Purity |
|---|---|---|---|---|
| Psilocin succinate | SUC Pattern 1 | SUC Pattern 3** (Also obtained from static storage of SUC Pattern 1 and Pattern 2) | Consistent with structure. 0.5 mol eq. of succinate. Trace acetone | 99.4% |
| Psilocin salicylate | SAL Pattern 2 | SAL Pattern 1* | Consistent with structure. 1 mol eq. of salicylate. Trace THF and 2-MeTHF. | 98.9% |
| Psilocin tartrate | TAR Pattern 2 | TAR Pattern 3* (FIG. 12) | Consistent with structure. 1 mol eq. of tartrate. Trace ethanol. | 98.4% |

*Previously characterized form
**Uncharacterized form

TABLE 8

Characterization of the isolated solid after 100 mg scale up 2$^{nd}$ attempt

Figure 11:
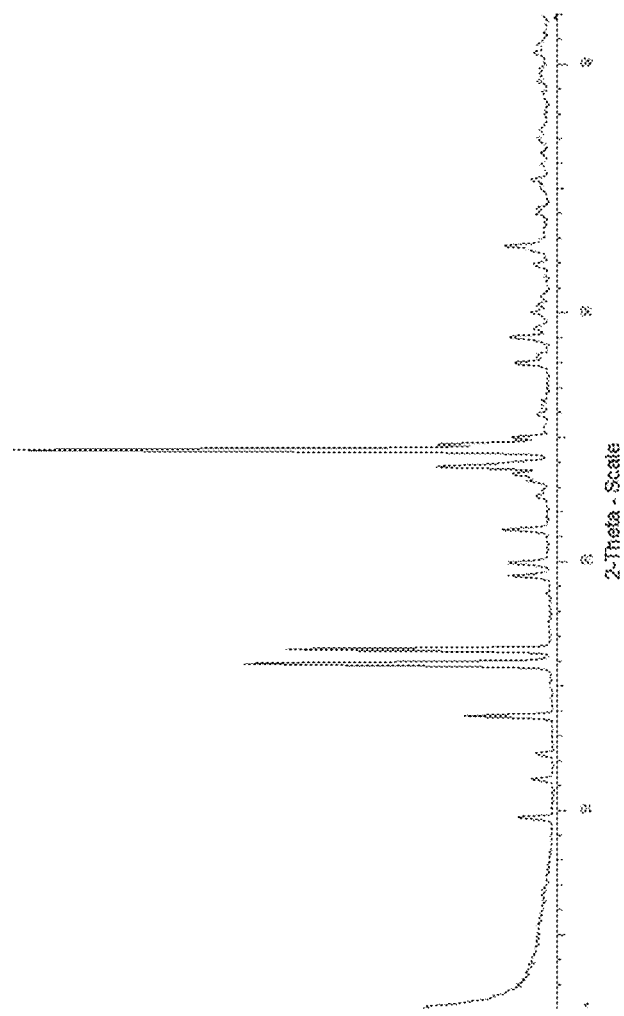
FIG. 11 shows the XRPD of the SUC Pattern 3 from psilocin succinate crystalline solid.

| | Psilocin succinate |
|---|---|
| XRPD | SUC Pattern 3 (FIG. 11) |
| HPLC | 99.4% |
| $^1$H-NMR | Consistent with structure. 0.5 mol eq. of succinate. Trace acetone |
| Thermal (TGA/DSC) | No mass loss up until decomposition at 190° C. Sharp endotherm, onset 187.2° C. (125 J/g). This endotherm is present, at slightly lower temperatures, in the DSC data for the other three succinate patterns (two solvates and a hydrate) and suggests that the other succinate forms are dehydrating to this one. This is further supported by the static storage conversion of SUC Pattern 1 and P2 to SUC Pattern 3. |

Example 3. Solubility of psilocin salts in saline

A sufficient amount of sample was suspended in 0.5 mL of media for a maximum anticipated concentration of 10 mg/mL of psilocin free base. The resulting suspensions were then shaken at 25° C. and 750 rpm for 5 hours. After equilibration, the appearance was noted, and the pH of the saturated solution was measured. Samples were then centrifuged for 2 min at 13,400 rpm, before dilution with buffer as appropriate.

Quantitation was performed by HPLC with reference to a standard solution of approximately 0.15 mg/mL. Different volumes of the standard, diluted, and undiluted sample solutions were injected. The solubility was calculated using the peak areas determined by integration of the peak found at the same retention time as the principal peak in the standard injection.

Solid residue from samples that did not fully dissolve were analyzed by XRPD to assess whether they changed form. The appearance of each sample, pH after 5 hours, XRPD of any residue, the solubility, and the averages solubility were assessed for each salt and summarized in Tables 9 and 10.

TAR Pattern 1 was obtained from acetone for psilocin tartrate. The $^1$H-NMR spectroscopy suggests that TAR Pattern 1 is a mono-L-tartrate salt. The form was stable to storage at 40° C./75% RH. The solubility in saline is >10 mg/mL. The purity uplift for psilocin from the formation of TAR Pattern 1 is the lowest of the scaled-up salt forms.

SUC Pattern 3 was obtained from acetone for psilocin succinate, using a total of 1.65 mole equivalents of succinic acid. However, from $^1$H-NMR spectroscopy the solid-form only contains 0.5 mole equivalents of succinate. The thermal data suggest the form is anhydrous. SUC Pattern 1 and SUC Pattern 2 have both been observed to convert to SUC Pattern 3 at elevated temperature and humidity static storage conditions as well as possible conversion to SUC Pattern 3 at elevated temperatures observed in the DSC data, evidenced

TABLE 9

Summary of solubility of psilocin and psilocin salts in saline

Figure 13:
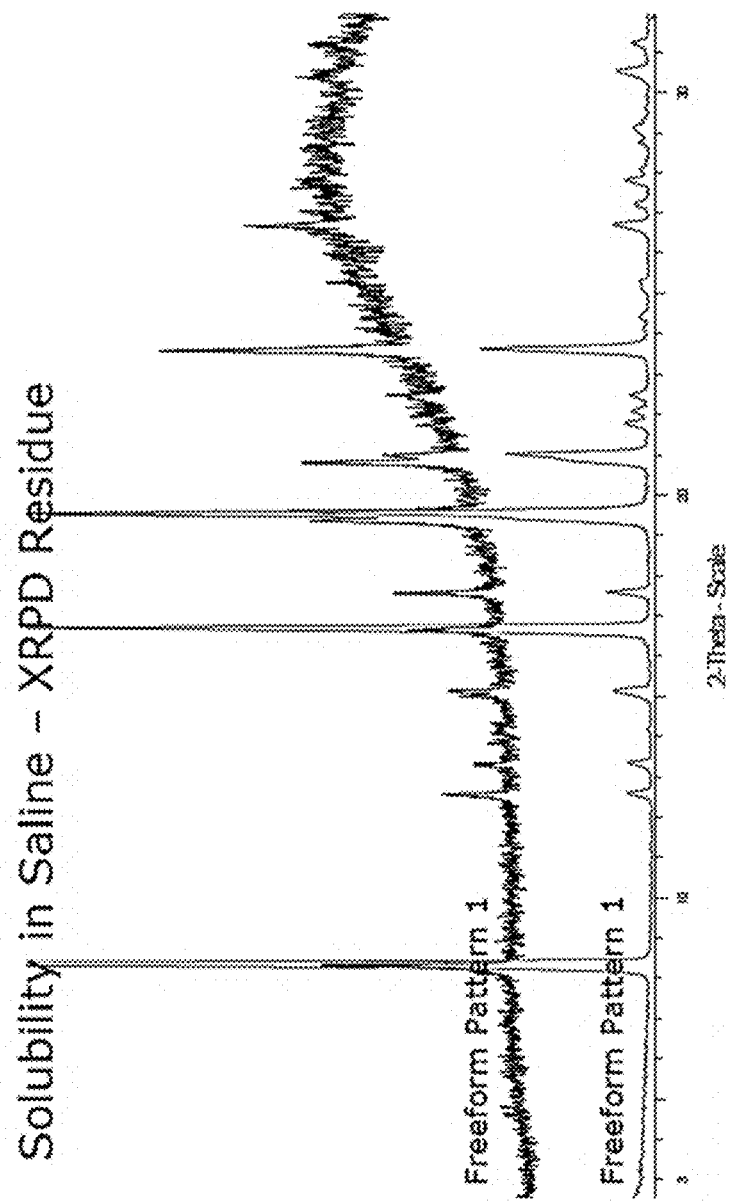
FIG. 13 shows the XRPD of the Free base Psilocin Pattern 1 from the crystalline solid remaining after dissolution in saline solution.
Figure 14:
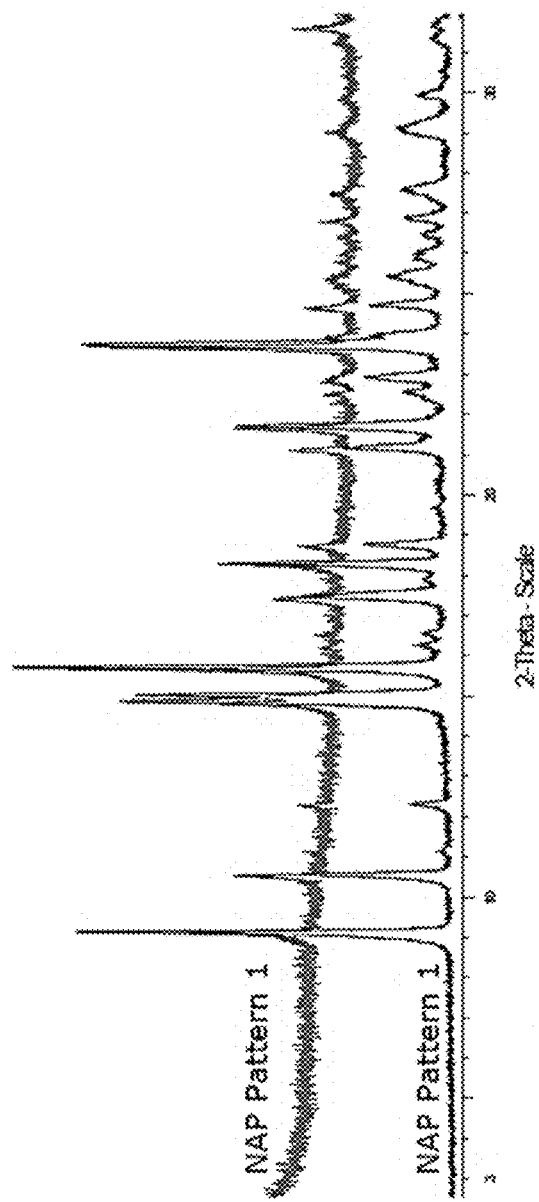
FIG. 14 shows the XRPD of the NAP Pattern 1 from the crystalline solid remaining after dissolution in saline solution.
Figure 15:
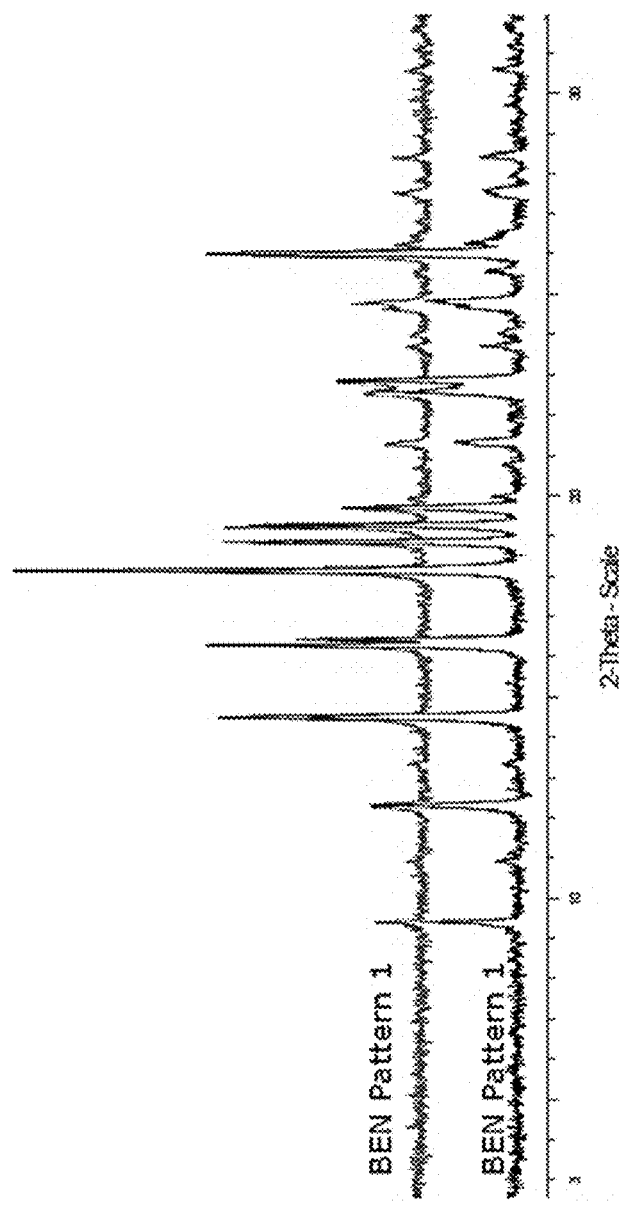
FIG. 15 shows the XRPD of the BEN Pattern 1 from the crystalline solid remaining after dissolution in saline solution.

| Sample | Form | Appearance at 5 hrs | pH at 5 hrs | XRPD of Residue | Solubility (mg/mL) | Average Solubility (mg/mL) |
|---|---|---|---|---|---|---|
| Psilocin free base | Freeform | Grey suspension | 9.8 | Freeform Pattern 1 (FIG. 13) | 0.78 | 0.76 |
| Psilocin free base | Pattern 1 | Grey suspension | 9.9 | | 0.74 | |
| Psilocin salicylate | SAL Pattern 1 | Grey suspension | 4.2 | SAL Pattern 1 | 6.0 | 5.8 |
| Psilocin salicylate | | Grey/blue suspension | 4.2 | | 5.5 | |
| Psilocin tartrate | TAR Pattern 1 | Clear solution | 3.4 | — | >10 | >10 |
| Psilocin tartrate | | Clear solution | 3.4 | | >10 | |
| Psilocin 1,5-napthalenedisulfonate | NAP Pattern 1 | Grey/green suspension | 2.0 | NAP Pattern 1 (FIG. 14) | 7.0 | 7.1 |
| Psilocin 1,5-napthalenedisulfonate | | Grey/green suspension | 2.0 | | 7.1 | |
| Psilocin benzoate | BEN Pattern 1 | Grey suspension | 6.8 | BEN Pattern 1 (FIG. 15) | 5.0 | 5.0 |
| Psilocin benzoate | | Grey suspension | 6.9 | | 4.9 | |
| Psilocin tartrate | TAR Pattern 3 | Clear solution | 3.4 | — | >10 | >10 |
| Psilocin tartrate | | Clear solution | 3.4 | | >10 | |
| Psilocin hydrochloride | HCl Pattern 1 | Clear solution | 6.0 | — | >10 | >10 |
| Psilocin hydrochloride | | Clear solution | 6.1 | | >10 | |
| Psilocin succinate | SUC Pattern 3 | Clear solution | 6.5 | — | >10 | >10 |
| Psilocin succinate | | Clear solution | 6.4 | | >10 | |

TABLE 10

Updated summary of solubility of psilocin and psilocin salts in saline

| Sample | Form | Media | Appearance at 5 hrs | pH at 5 hrs | Solubility (mg/mL) | Average Solubility (mg/mL) |
|---|---|---|---|---|---|---|
| Psilocin free base | Freeform psilocin | Saline | Grey suspension | 9.8 | 0.78 | 0.76 |
| Psilocin free base | | | Grey suspension | 9.9 | 0.74 | |
| Psilocin salicylate | SAL Pattern 1 | | Grey suspension | 4.2 | 6.0 | 5.8 |
| Psilocin salicylate | | | Grey/blue suspension | 4.2 | 5.5 | |
| Psilocin tartrate | TAR Pattern 1 | | Fine suspension- almost clear | 3.5 | 62 | 64 |
| Psilocin tartrate | | | Fine suspension- almost clear | 3.5 | 65 | |
| Psilocin 1,5-napthalenedisulfonate | | | Grey/blue suspension | 2.0 | 7.0 | 7.1 |
| Psilocin 1,5-napthalenedisulfonate | NAP Pattern 1 | | Grey/blue suspension | 2.0 | 7.1 | |
| Psilocin benzoate | BEN Pattern 1 | | Grey suspension | 6.8 | 5.0 | 5.0 |
| Psilocin benzoate | | | Grey suspension | 6.9 | 4.9 | |
| Psilocin tartrate | TAR Pattern 3 | | Clear solution | 3.5 | 32 | Approx. 35 |
| Psilocin tartrate | | | Clear solution | 3.5 | 33 | |
| Psilocin hydrochloride | HCl Pattern 1 | | Fine suspension- almost clear | 4.0 | 36 | Approx. 36 |
| Psilocin hydrochloride | | | Fine suspension- almost clear | 5.4 | 35 | |
| Psilocin succinate | SUC Pattern 3 | | Clear solution | 6.4 | >28 | >27 |
| Psilocin succinate | | | Clear solution | 6.5 | >25 | | by an endotherm common to all three forms at ca. 185° C. The solubility of SUC Pattern 3 was shown to be >10 mg/mL in saline.

Although showing high solubilities (>10 mg/mL) TAR Pattern 3 and HCl Pattern 1 were not stable when stored at 40° C./75% RH, thus are not recommended to take forward. SAL Pattern 1, NAP Pattern 1 and BEN Pattern 1 all have substantial increases in solubility compared with the free-form but lower solubilities than the other salt forms. They are all stable at high temperature and humidity and have good HPLC purity uplifts.

SAL Pattern 1 and BEN Pattern 1 are anhydrous whilst NAP Pattern 1 is a likely hemihydrate. Only one benzoate salt solid form has been identified throughout this screen (two for NAP and two for SAL).

The peaks observed from XRPD for TAR Pattern 1 from psilocin tartrate (FIG. 6), SUC Pattern 3 from psilocin succinate (FIG. 11), and BEN Pattern 1 from psilocin benzoate (FIG. 8) are summarized in Table 11.

TABLE 11

Summary of XRPD Peaks

| Psilocin tartrate: TAR Pattern 1 | | Psilocin succinate: SUC Pattern 3 | | Psilocin benzoate: BEN Pattern 1 | |
|---|---|---|---|---|---|
| Angle/°2θ | Intensity/% | Angle/°2θ | Intensity/% | Angle/°2θ | Intensity/% |
| 6.7 | 8.8 | 9.7 | 7.1 | 9.4 | 17.0 |
| 12.6 | 7.9 | 11.2 | 4.7 | 10.9 | 4.9 |
| 13.4 | 15.9 | 12.3 | 3.7 | 12.3 | 24.7 |
| 14.7 | 25.0 | 13.8 | 16.9 | 13.3 | 5.6 |
| 15.8 | 13.1 | 15.9 | 57.4 | 14.5 | 54.3 |
| 16.2 | 10.5 | 16.4 | 49.6 | 15.3 | 3.4 |
| 17.2 | 100.0 | 19.4 | 8.9 | 16.3 | 82.7 |
| 18.8 | 50.5 | 20.0 | 9.0 | 16.4 | 37.8 |
| 19.9 | 52.0 | 21.3 | 10.0 | 18.2 | 100.0 |
| 20.8 | 20.1 | 22.6 | 3.5 | 18.9 | 71.1 |
| 21.8 | 49.1 | 23.3 | 5.3 | 19.3 | 46.1 |
| 22.5 | 66.6 | 23.5 | 8.0 | 19.7 | 40.7 |
| 23.4 | 28.0 | 23.8 | 22.1 | 20.0 | 7.9 |
| 23.7 | 26.0 | 24.5 | 100.0 | 20.8 | 5.0 |
| 24.7 | 34.6 | 24.7 | 22.1 | 21.3 | 16.7 |
| 25.5 | 25.1 | 25.0 | 9.0 | 21.9 | 4.9 |
| 26.5 | 26.0 | 28.0 | 7.7 | 22.6 | 42.2 |
| 27.0 | 16.9 | 28.3 | 3.4 | 22.9 | 45.3 |
| 27.4 | 11.6 | 29.0 | 8.7 | 23.8 | 14.2 |
| 28.5 | 23.0 | 29.4 | 4.1 | 24.1 | 8.2 |
| 29.4 | 20.9 | | | 24.9 | 29.3 |
| | | | | 25.6 | 11.4 |
| | | | | 26.0 | 74.3 |
| | | | | 26.3 | 19.2 |
| | | | | 26.5 | 9.8 |
| | | | | 26.9 | 5.6 |
| | | | | 27.5 | 14.7 |
| | | | | 28.5 | 17.6 |

Example 4 Photostability of psilocin salts

Photostability experiments were performed on approximately 3 mm depth of the solid psilocin salt material, including psilocin tartrate, psilocin benzoate, and psilocin succinate, and a solution of 0.2 mg/mL of the free base in water. Before dissolution the water was purged with nitrogen for 30 minutes to prevent oxidative degradation. Duplicate vials were prepared for each sample, where one was exposed to light and the other to act as a control, which was wrapped in foil for the duration of the experiment. The light stability test was performed using an Atlas Suntest CPS+. The sample were exposed at an iridescence level of 500 W/m$^2$ (300-800 nm) for the equivalent of 1 week of Miami sunlight, which was a total of 6.9 hours of exposure. Observations were made before and after the exposure for the free base psilocin salt, psilocin tartrate salt, psilocin succinate salt, and psilocin benzoate salt (Table 12). The purity analysis was performed post exposure for all samples at 0.2 mg/mL of the free base using an Agilent 1260 series HPLC with OpenLab software. The X-ray powder diffraction was performed on the solid psilocin salt samples before and after exposure.

The purity and stability of the solid samples after light exposure did not change when compared to pre-exposure. The XRPD analysis also found that all the samples did not change crystal form after the photostability experiments.

The psilocin benzoate salt, psilocin tartrate salt, and psilocin succinate salt when tested after dissolving in solution, all showed a greater stability in the presence of light in comparison to free base psilocin. The psilocin salt solutions were observed to change color upon exposure to light. Additionally, the purity of the free base in solution post exposure was 34.1% by HPLC, while the salt forms retained purity >75% by HPLC after light exposure. The L-tartaric acid salt form in solution was the most light-stable psilocin salt in solution with a purity of 93.2% by HPLC after exposure. The tartaric acid salt performed the best with respect to light stability as a solution, with the psilocin benzoate and psilocin succinate performing better than the free base.

Example 5. Forced Degradation of Psilocin Salts

A test was created to assess the stability of the psilocin salts and free base psilocin to oxidative degradation. Forced degradation of the psilocin salts was performed in 0.3% $H_2O_2$ to test the oxidative stability of each salt form. The appropriate volume of 0.3% $H_2O_2$ was added to the pre-weighed sample of psilocin salt in an amber vial to give a maximum concentration of 0.2 mg/mL of psilocin (free base equivalent). The samples were stored at 25° C. and the purity of each sample was assessed at 0, 1, 6, and 24 hours (Table 12). The purity analysis was performed using an Agilent 1260 series HPLC with OpenLab software.

TABLE 12

Purity Analysis of Forced Degradation of Psilocin Salts with $H_2O_2$

| | | | Water - Purity (%) | | | | Difference |
|---|---|---|---|---|---|---|---|
| Sample Id | Form | Solvent | T = 0 Hr | T = 1 Hr | T = 6 Hr | T = 24 Hr | between T 0 and T 24 (%) |
| ALB-1969-16 | Free Base | 0.3% $H_2O_2$ | 95.0 | 88.3 | 73.4 | N/A* | — |
| DR-1968-73-01 | L-Tartaric Acid | 0.3% $H_2O_2$ | 95.8 | 95.3 | 75.6 | 31.0 | 64.8 |
| DR-1968-73-02 | Succinic Acid | 0.3% $H_2O_2$ | 98.8 | 98.6 | 96.3 | 84.0 | 14.8 |
| DR-1968-78-01 | Benzoic Acid | 0.3% $H_2O_2$ | 99.0 | 98.6 | 98.5 | 85.1 | 13.9 |

In 0.3% (v/v) $H_2O_2$ the rate of degradation was slowed for the psilocin salt forms compared to free base psilocin. Of the three psilocin salts tested, the L-tartaric acid salt degraded faster than the succinic acid and benzoic acid salts. Following 6 hours of exposure to oxidizing conditions, the benzoate salt exhibited the highest stability to oxidative degradation.

These data suggest that the psilocin benzoate and psilocin succinate salts are preferred salt forms for producing a pharmaceutical composition with superior shelf-life stability, and resistance to oxidative degradation.

What is claimed is:

1. A crystal form of a 2:1 succinate salt of psilocin having at least four, five, six, or seven peaks at diffraction angle 2θ(°) as provided in FIG. 4 (SUC Pattern 4) as measured by X-ray powder diffractometry.

2. A crystal form of a 1,5-naphthalenedisulfonic acid salt of psilocin having at least four, five, six, or seven peaks at diffraction angle 2θ (°) as provided in FIG. 7 or FIG. 14 (NAP Pattern 1) as measured by X-ray powder diffractometry.

3. A crystal form of a 1:1 tartrate salt of psilocin having at least four, five, six, or seven peaks at diffraction angle 2θ (°) as provided in FIG. 9 or FIG. 12 (TAR Pattern 3) as measured by X-ray powder diffractometry.

4. A crystal form of a 1:1 tartrate salt of psilocin having at least four, five, six, or seven peaks at diffraction angle 2θ (°) as provided in FIG. 10 (TAR Pattern 4) as measured by X-ray powder diffractometry.

5. A crystal form of a 1:1 tartrate salt of psilocin having at least four, five, six, or seven peaks at diffraction angle 2θ (°) selected from 6.7±0.5, 12.6±0.5, 13.4±0.5, 14.7±0.5, 15.8±0.5, 16.2±0.5, 17.2±0.5, 18.8±0.5, 19.9±0.5, 20.8±0.5, 21.8±0.5, 22.5±0.5, 23.4±0.5, 23.7±0.5, 24.7±0.5, 25.5±0.5, 26.5±0.5, 27.0±0.5, 28.5±0.5, and 29.4±0.5 (TAR Pattern 1) as measured by X-ray powder diffractometry.

6. A crystal form of a 2:1 succinate salt of psilocin having at least four, five, six, or seven peaks at diffraction angle 2θ (°) selected from 9.7±0.5, 11.2±0.5, 12.3±0.5, 13.8±0.5, 15.9±0.5, 16.4±0.5, 19.4±0.5, 20.0±0.5, 21.3±0.5, 22.6±0.5, 23.3±0.5, 23.5±0.5, 23.8±0.5, 24.5±0.5, 24.7±0.5, 25.0±0.5, 28.0±0.5, 28.3±0.5, 29.0±0.5, and 29.4±0.5 (SUC Pattern 3) as measured by X-ray powder diffractometry.

7. A pharmaceutical composition comprising (i) an aqueous solution having a pH of between about 3 and about 9 and (ii) between about 0.1 mg/ml and about 50 mg/ml of a pharmaceutically acceptable salt of psilocin, wherein said pharmaceutically acceptable salt is a 2:1 succinate salt, wherein the pharmaceutical composition is suitable for infusion.

8. The pharmaceutical composition of claim 7, wherein the aqueous solution has between about 1 mg/ml and about 15 mg/ml of the pharmaceutically acceptable salt of psilocin.

9. A method of treating a disease or condition in a subject in need thereof, the method comprising administering to the subject a pharmaceutical composition of claim 7 in an amount sufficient to treat the disease or condition, wherein the disease or condition is lung inflammation, neuroinflammation, rheumatoid arthritis, atherosclerosis, psoriasis, type II diabetes, inflammatory bowel disease, Crohn's disease, multiple sclerosis, septicemia, chronic obstructive pulmonary disease (COPD), stroke, a traumatic brain injury, a spinal cord injury, chronic pain, depression, anxiety, addiction, post-traumatic stress disorder, an eating disorder, compulsive behavior, Huntington's disease, or Parkinson's disease.

10. A pharmaceutical composition comprising (i) an aqueous solution having a pH of between about 3 and about 9 and (ii) between about 0.1 mg/mL and about 50 mg/mL of a pharmaceutically acceptable salt of psilocin, wherein said pharmaceutically acceptable salt is a 1:1 tartrate salt, wherein the pharmaceutical composition is suitable for infusion.

11. A method of treating a disease or condition in a subject in need thereof, the method comprising administering to the subject a pharmaceutical composition of claim 10 in an amount sufficient to treat the disease or condition, wherein the disease or condition is lung inflammation, neuroinflammation, rheumatoid arthritis, atherosclerosis, psoriasis, type II diabetes, inflammatory bowel disease, Crohn's disease, multiple sclerosis, septicemia, chronic obstructive pulmonary disease (COPD), stroke, a traumatic brain injury, a spinal cord injury, chronic pain, depression, anxiety, addiction, post-traumatic stress disorder, an eating disorder, compulsive behavior, Huntington's disease, or Parkinson's disease.

12. A pharmaceutical composition comprising (i) an aqueous solution having a pH of between about 3 and about 9 and (ii) between about 0.1 mg/ml and about 50 mg/ml of a pharmaceutically acceptable salt of psilocin, wherein said pharmaceutically acceptable salt is a 2:1 salt of 1,5-naphthalenedisulfonic acid, a 1:1 salt of 1,5-naphthalenedisulfonic acid, or a mixture thereof, wherein the pharmaceutical composition is suitable for infusion.

13. A method of treating a disease or condition in a subject in need thereof, the method comprising administering to the subject a pharmaceutical composition of claim 12 in an amount sufficient to treat the disease or condition, wherein the disease or condition is lung inflammation, neuroinflammation, rheumatoid arthritis, atherosclerosis, psoriasis, type II diabetes, inflammatory bowel disease, Crohn's disease, multiple sclerosis, septicemia, chronic obstructive pulmonary disease (COPD), stroke, a traumatic brain injury, a spinal cord injury, chronic pain, depression, anxiety, addiction, post-traumatic stress disorder, an eating disorder, compulsive behavior, Huntington's disease, or Parkinson's disease.

* * * * *